US011971862B1

(12) United States Patent
Han et al.

(10) Patent No.: US 11,971,862 B1
(45) Date of Patent: Apr. 30, 2024

(54) PROCESSING TRANSACTIONS WITH IDEMPOTENCY IN REAL-TIME LEDGERS

(71) Applicant: Lithic, Inc., New York, NY (US)

(72) Inventors: Yi Lun Han, New York, NY (US); Ian Boynton, Denver, CO (US); Xiaojing Yang, Bellmore, NY (US)

(73) Assignee: Lithic, Inc., New York, NY (US)

( * ) Notice: Subject to any disclaimer, the term of this patent is extended or adjusted under 35 U.S.C. 154(b) by 0 days.

(21) Appl. No.: 17/949,012

(22) Filed: Sep. 20, 2022

(51) Int. Cl.
*G06F 16/00* (2019.01)
*G06F 16/18* (2019.01)

(52) U.S. Cl.
CPC .................. *G06F 16/18* (2019.01)

(58) Field of Classification Search
CPC ...... G06F 16/18; G06F 11/079; G06F 1/1402; G06F 11/1402; G06Q 20/401; G06Q 20/023; G06Q 20/389; G06Q 20/42; G06Q 20/3829; G06Q 20/4093; G06Q 20/425; G06Q 20/10
See application file for complete search history.

(56) References Cited

U.S. PATENT DOCUMENTS

| | | | |
|---|---|---|---|
| 6,029,890 A | 2/2000 | Austin | |
| 6,315,193 B1 | 11/2001 | Hogan | |
| 6,636,833 B1 | 10/2003 | Flitcroft | |
| 6,793,131 B2 | 9/2004 | Hogan | |
| 7,136,835 B1 | 11/2006 | Flitcroft | |
| 7,359,880 B2 | 4/2008 | Abel | |
| 7,379,919 B2 | 5/2008 | Hogan | |
| 7,433,845 B1 | 10/2008 | Flitcroft | |
| 7,567,934 B2 | 7/2009 | Flitcroft | |
| 7,571,142 B1 | 8/2009 | Flitcroft | |

(Continued)

FOREIGN PATENT DOCUMENTS

| | | |
|---|---|---|
| WO | WO 2014/080167 A1 | 5/2014 |
| WO | WO 2014/184771 A1 | 11/2014 |
| WO | WO 2016050990 A1 | 4/2016 |

OTHER PUBLICATIONS

U.S. Appl. No. 17/689,561, filed Mar. 8, 2022, Jason Kruse.

(Continued)

*Primary Examiner* — Tony Mahmoudi
*Assistant Examiner* — Suman Rajaputra
(74) *Attorney, Agent, or Firm* — Baker Botts L.L.P.

(57) ABSTRACT

In one embodiment, a method includes receiving a first network event corresponding to a first transaction, the first network event being assigned a unique transaction group identifier, authorizing the first transaction based on a balance value of a ledger account recorded in an account ledger, recording a first update in the account ledger, comprising recording the unique transaction group identifier in association with the first update and the ledger account and modifying the balance value of the ledger account, receiving a second network event corresponding to a second transaction, determining that a unique transaction group identifier assigned to the second network event matches the unique transaction group identifier associated with the first update and the ledger account, and recording a second update in the account ledger, comprising recording the unique transaction group identifier in association with the second update without modifying the balance value of the ledger account.

21 Claims, 25 Drawing Sheets

(56) References Cited

U.S. PATENT DOCUMENTS

| | | | |
|---|---|---|---|
| 7,593,896 | B1 | 9/2009 | Flitcroft |
| 7,783,569 | B2 | 8/2010 | Abel |
| 7,895,122 | B2 | 2/2011 | Flitcroft |
| 8,229,854 | B2 | 7/2012 | Kavanagh |
| 8,321,315 | B2 | 11/2012 | Abel |
| 8,510,218 | B2 | 8/2013 | Abel |
| 8,527,416 | B2 * | 9/2013 | Flitcroft ............... G06Q 20/04 705/44 |
| 8,548,926 | B2 | 10/2013 | Balistierri |
| 8,639,623 | B2 | 1/2014 | Kavanagh |
| 8,676,707 | B2 | 3/2014 | Flitcroft |
| 8,751,381 | B2 | 6/2014 | Musser |
| 8,756,150 | B2 | 6/2014 | Flitcroft |
| 8,775,318 | B2 | 7/2014 | Lee |
| 8,799,153 | B2 | 8/2014 | White |
| 8,812,402 | B2 | 8/2014 | Evans |
| 8,965,811 | B2 | 2/2015 | Wankmueller |
| 10,614,454 | B1 | 4/2020 | Brooks |
| 10,692,156 | B2 | 6/2020 | Skala |
| 11,100,511 | B1 | 8/2021 | Rule |
| 11,257,085 | B1 | 2/2022 | Barkas |
| 11,405,189 | B1 | 8/2022 | Bennison |
| 11,423,374 | B2 | 8/2022 | Hardin |
| 11,423,400 | B1 | 8/2022 | Hutchison |
| 11,546,345 | B2 | 1/2023 | D'Agostino |
| 11,568,406 | B2 | 1/2023 | Kruse |
| 11,699,154 | B2 | 7/2023 | Kruse |
| 11,741,468 | B2 | 8/2023 | Kruse |
| 11,741,469 | B2 | 8/2023 | Kruse |
| 2003/0028481 | A1 | 2/2003 | Flitcroft |
| 2005/0038721 | A1 * | 2/2005 | Goeckel ............... G06Q 10/10 705/30 |
| 2006/0124756 | A1 | 6/2006 | Brown |
| 2006/0249574 | A1 | 11/2006 | Brown |
| 2007/0156579 | A1 | 7/2007 | Manesh |
| 2008/0120238 | A1 | 5/2008 | Flitcroft |
| 2008/0177660 | A1 | 7/2008 | Abel |
| 2008/0249926 | A1 * | 10/2008 | Sgaraglio ............... G06Q 40/00 705/30 |
| 2008/0288405 | A1 | 11/2008 | John |
| 2009/0030747 | A1 | 1/2009 | Smith |
| 2009/0119190 | A1 * | 5/2009 | Realini ............... G06Q 20/3265 705/37 |
| 2010/0088237 | A1 | 4/2010 | Wankmueller |
| 2011/0125642 | A1 | 5/2011 | Kamal |
| 2012/0011063 | A1 | 1/2012 | Killian |
| 2012/0215688 | A1 | 8/2012 | Musser |
| 2013/0218769 | A1 | 8/2013 | Pourfallah |
| 2013/0232035 | A1 | 9/2013 | Stijen |
| 2013/0290121 | A1 | 10/2013 | Simakov |
| 2013/0339167 | A1 | 12/2013 | Taylor |
| 2013/0346302 | A1 | 12/2013 | Purves |
| 2013/0346305 | A1 | 12/2013 | Mendes |
| 2014/0058855 | A1 | 2/2014 | Hussein |
| 2014/0074637 | A1 | 3/2014 | Hammad |
| 2014/0108172 | A1 | 4/2014 | Weber |
| 2014/0297533 | A1 | 10/2014 | Mittal |
| 2014/0379562 | A1 | 12/2014 | Olson |
| 2015/0012430 | A1 | 1/2015 | Chisholm |
| 2015/0254672 | A1 | 9/2015 | Huesch |
| 2016/0071069 | A1 | 3/2016 | Skala |
| 2016/0071074 | A1 | 3/2016 | Baird |
| 2016/0260169 | A1 * | 9/2016 | Arnold ............... G06Q 20/381 |
| 2017/0061531 | A1 * | 3/2017 | Smith ............... G06Q 50/01 |
| 2017/0070484 | A1 | 3/2017 | Kruse |
| 2018/0075525 | A1 | 3/2018 | Qin |
| 2018/0108008 | A1 | 4/2018 | Chumbley |
| 2018/0121891 | A1 | 5/2018 | Hosny |
| 2018/0121895 | A1 | 5/2018 | Mohrlock |
| 2018/0124596 | A1 | 5/2018 | Iannace |
| 2018/0174137 | A1 * | 6/2018 | Subbarayan ......... G06Q 20/409 |
| 2018/0253727 | A1 | 9/2018 | Ortiz |
| 2018/0268461 | A1 | 9/2018 | Hoag |
| 2018/0300730 | A1 | 10/2018 | Telford-Reed |
| 2019/0065585 | A1 | 2/2019 | Goenka |
| 2019/0068608 | A1 | 2/2019 | Boland |
| 2019/0095989 | A1 | 3/2019 | Archer |
| 2020/0005290 | A1 | 1/2020 | Madisetti |
| 2020/0019964 | A1 | 1/2020 | Miller |
| 2020/0058032 | A1 | 2/2020 | Lad |
| 2020/0058068 | A1 | 2/2020 | Gandhi |
| 2020/0112585 | A1 | 4/2020 | Keohane |
| 2020/0193443 | A1 | 6/2020 | Piel |
| 2020/0211124 | A1 | 7/2020 | Bhagat |
| 2020/0250694 | A1 | 8/2020 | Mock |
| 2020/0267153 | A1 | 8/2020 | Kang |
| 2020/0294106 | A1 | 9/2020 | Seshan |
| 2020/0311727 | A1 | 10/2020 | Loomis |
| 2020/0349573 | A1 | 11/2020 | Dong |
| 2021/0004801 | A1 | 1/2021 | Barnum |
| 2021/0004880 | A1 | 1/2021 | Benkreira |
| 2021/0012339 | A1 | 1/2021 | Rafferty |
| 2021/0133741 | A1 | 5/2021 | Spiegel |
| 2021/0201296 | A1 | 7/2021 | Rule |
| 2021/0233070 | A1 | 7/2021 | Malene |
| 2021/0304287 | A1 | 9/2021 | Hoag |
| 2021/0326818 | A1 | 10/2021 | Hogg |
| 2021/0344660 | A1 | 11/2021 | Benkreira |
| 2021/0350382 | A1 | 11/2021 | Lopes |
| 2021/0383378 | A1 | 12/2021 | McCoy |
| 2022/0005022 | A1 | 1/2022 | Tu |
| 2022/0027871 | A1 | 1/2022 | Farooq |
| 2022/0058617 | A1 | 2/2022 | Tibrewala |
| 2022/0180357 | A1 | 6/2022 | Chattopadhyay |
| 2022/0261795 | A1 | 8/2022 | Perkins |
| 2022/0261814 | A1 | 8/2022 | Smith |
| 2022/0366411 | A1 | 11/2022 | Bajwa |
| 2022/0405753 | A1 | 12/2022 | Lee |

OTHER PUBLICATIONS

U.S. Appl. No. 17/689,582, filed Mar. 8, 2022, Jason Kruse.
U.S. Appl. No. 17/689,599, filed Mar. 8, 2022, Jason Kruse.
U.S. Appl. No. 17/694,503, filed Mar. 14, 2022, Jason Kruse.
U.S. Appl. No. 17/859,943, filed Jul. 7, 2022, Jason Kruse.
U.S. Appl. No. 17/859,954, filed Jul. 7, 2022, Jason Kruse.
U.S. Appl. No. 17/859,977, filed Jul. 7, 2022, Kamil Sindi.
U.S. Appl. No. 17/859,990, filed Jul. 7, 2022, Jonathan Andrew Oei.
U.S. Appl. No. 17/948,988, filed Sep. 20, 2022, Ian Boynton.
International Search Report and Written Opinion dated Dec. 13, 2016 for International Application No. PCT/US2016/051086, 14 pages.
Marcel J. Mampaey, "Secure Remittance Transaction to Bankless Consumers in a Fragmented Applications Market", Bell Labs Technical Journal, 16(2):219-234 (2011), downloaded on Aug. 27, 2022.

* cited by examiner

| Chart of Accounts 600 | Pending | Available |
|---|---|---|
| Assets 610 | $0.00 | $0.00 |
|     RTN- 123456789 | $0.00 | $0.00 |
|         For Benefit of Lithic Customers | $0.00 | $0.00 |
|             Program A VBAN Container | $0.00 | $0.00 |
|                 Reserve VBAN | $0.00 | $0.00 |
|                 Settlement VBAN | $0.00 | $0.00 |
|                 Operating VBAN | $0.00 | $0.00 |
|                 ... | $0.00 | $0.00 |
|             ... | $0.00 | $0.00 |
|         Lithic Holding VBAN | $0.00 | $0.00 |
| Liabilities 620 | $0.00 | $0.00 |
|     Network Payables | $0.00 | $0.00 |
|         FIS Payable | $0.00 | $0.00 |
|         MCD Payable | $0.00 | $0.00 |
|     Programs Container | $0.00 | $0.00 |
|         Program A | $0.00 | $0.00 |
|             Reserve | $0.00 | $0.00 |
|             Settlement | $0.00 | $0.00 |
|             Operating | $0.00 | $0.00 |
|             Account Holders | $0.00 | $0.00 |
|                 User McUser | $0.00 | $0.00 |
|                     Card 4321 | $0.00 | $0.00 |
|                 ... | $0.00 | $0.00 |
|             ... | $0.00 | $0.00 |
|         ... | $0.00 | $0.00 |

630 — Pending
640 — Available

*FIG. 6A*

| Chart of Accounts 600 | Pending 630 | Available 640 |
|---|---|---|
| Assets 610 | $0.00 | $6,028,636.23 |
|   RTN- 123456789 | $0.00 | $6,028,636.23 |
|     For Benefit of Lithic Customers | $0.00 | $6,028,636.23 |
|       Program A VBAN Container | $0.00 | $6,028,636.23 |
|         Reserve VBAN | $0.00 | $5,000,000.00 |
|         Settlement VBAN | $0.00 | $928,402.00 |
|         Operating VBAN | $0.00 | $100,234.23 |
|         ... | $0.00 | $0.00 |
|         ... | $0.00 | $0.00 |
|     Lithic Holding VBAN | $0.00 | $0.00 |
| Liabilities 620 | $238,234.23 | $6,141,057.53 |
|   Network Payables | $0.00 | $112,421.30 |
|     FIS Payable | $0.00 | $112,421.30 |
|     MCD Payable | $0.00 | $0.00 |
|   Programs Container | $238,234.23 | $6,028,636.23 |
|     Program A | $238,234.23 | $6,028,636.23 |
|       Reserve | $0.00 | $5,000,000.00 |
|       Settlement | $238,234.23 | $928,402.00 |
|       Operating | $0.00 | $100,234.23 |
|       Account Holders | $0.00 | $0.00 |
|         User McUser | $0.00 | $0.00 |
|           Card 4321 | $0.00 | $0.00 |
|           ... | $0.00 | $0.00 |
|         ... | $0.00 | $0.00 |
|       ... | $0.00 | $0.00 |

*FIG. 6B*

| Chart of Accounts 600 | Pending 630 | Available 640 |
|---|---|---|
| Assets 610 | $1,000.00 | $0.00 |
|    RTN- 123456789 | $1,000.00 | $0.00 |
|       For Benefit of Lithic Customers | $1,000.00 | $0.00 |
|          Program A VBAN Container | $1,000.00 | $0.00 |
|             Reserve VBAN | $0.00 | $0.00 |
|             Settlement VBAN 1405 | $1,000.00 | $0.00 |
|             Liability Operating VBAN | $0.00 | $0.00 |
|             ... | $0.00 | $0.00 |
|             ... | $0.00 | $0.00 |
|          Lithic Holding VBAN | $0.00 | $0.00 |
| Liabilities 620 | $1,000.00 | $0.00 |
|    Network Payables | $0.00 | $0.00 |
|       FIS Payable | $0.00 | $0.00 |
|       MCD Payable | $0.00 | $0.00 |
|    Programs Container | $1,000.00 | $0.00 |
|       Program A | $1,000.00 | $0.00 |
|          Reserve | $0.00 | $0.00 |
|          Settlement 1410 | $1,000.00 | $0.00 |
|          Operating | $0.00 | $0.00 |
|          Account Holders | $0.00 | $0.00 |
|             User McUser | $0.00 | $0.00 |
|                Card 4321 | $0.00 | $0.00 |
|                ... | $0.00 | $0.00 |
|             ... | $0.00 | $0.00 |
|    ... | $0.00 | $0.00 |

*FIG. 14A*

| Chart of Accounts 600 | Pending 630 | Available 640 |
|---|---|---|
| Assets 610 | $0.00 | $1,000.00 |
|     RTN- 123456789 | $0.00 | $1,000.00 |
|         For Benefit of Lithic Customers | $0.00 | $1,000.00 |
|             Program A VBAN Container | $0.00 | $1,000.00 |
|                 Reserve VBAN | $0.00 | $0.00 |
|                 Settlement VBAN 1405 | $0.00 | $1,000.00 |
|                 Liability Operating VBAN | $0.00 | $0.00 |
|                 ... | $0.00 | $0.00 |
|                 ... | $0.00 | $0.00 |
|             Lithic Holding VBAN | $0.00 | $0.00 |
| Liabilities 620 | $0.00 | $1,000.00 |
|     Network Payables | $0.00 | $0.00 |
|         FIS Payable | $0.00 | $0.00 |
|         MCD Payable | $0.00 | $0.00 |
|     Programs Container | $0.00 | $1,000.00 |
|         Program A | $0.00 | $1,000.00 |
|             Reserve | $0.00 | $0.00 |
|             Settlement 1410 | $0.00 | $1,000.00 |
|             Operating | $0.00 | $0.00 |
|             Account Holders | $0.00 | $0.00 |
|                 User McUser | $0.00 | $0.00 |
|                     Card 4321 | $0.00 | $0.00 |
|                     ... | $0.00 | $0.00 |
|                 ... | $0.00 | $0.00 |
|         ... | $0.00 | $0.00 |

*FIG. 14B*

| Chart of Accounts 600 | Pending 630 | Available 640 |
|---|---|---|
| Assets 610 | $0.00 | $1,000.00 |
|    RTN- 123456789 | $0.00 | $1,000.00 |
|       For Benefit of Lithic Customers | $0.00 | $1,000.00 |
|          Program A VBAN Container | $0.00 | $1,000.00 |
|             Reserve VBAN | $0.00 | $0.00 |
|             Settlement VBAN | $0.00 | $1,000.00 |
|             Liability Operating VBAN | $0.00 | $0.00 |
|             ... | $0.00 | $0.00 |
|             ... | $0.00 | $0.00 |
|          Lithic Holding VBAN | $0.00 | $0.00 |
| Liabilities 620 | $0.00 | $1,000.00 |
|    Network Payables | $0.00 | $50.00 |
|       FIS Payable 1420 | $0.00 | $50.00 |
|       MCD Payable | $0.00 | $0.00 |
|    Programs Container | $0.00 | $950.00 |
|       Program A | $0.00 | $950.00 |
|          Reserve | $0.00 | $0.00 |
|          Settlement 1405 | $0.00 | $950.00 |
|          Operating | $0.00 | $0.00 |
|          Account Holders | $0.00 | $0.00 |
|             User McUser | $0.00 | $0.00 |
|                Card 4321 1415 | $0.00 | $0.00 |
|             ... | $0.00 | $0.00 |
|          ... | $0.00 | $0.00 |
|       ... | $0.00 | $0.00 |

FIG. 14C

| Chart of Accounts 600 | Pending 630 | Available 640 |
|---|---|---|
| Assets 610 | $0.00 | $950.00 |
|     RTN- 123456789 | $0.00 | $950.00 |
|         For Benefit of Lithic Customers | $0.00 | $950.00 |
|             Program A VBAN Container | $0.00 | $950.00 |
|                 Reserve VBAN | $0.00 | $0.00 |
|                 Settlement VBAN 1405 | $0.00 | $950.00 |
|                 Liability Operating VBAN | $0.00 | $0.00 |
|                 ... | $0.00 | $0.00 |
|             ... | $0.00 | $0.00 |
|         Lithic Holding VBAN | $0.00 | $0.00 |
| Liabilities 620 | $0.00 | $950.00 |
|     Network Payables | $0.00 | $0.00 |
|     FIS Payable 1420 | $0.00 | $0.00 |
|     MCD Payable | $0.00 | $0.00 |
|     Programs Container | $0.00 | $950.00 |
|         Program A | $0.00 | $950.00 |
|             Reserve | $0.00 | $0.00 |
|             Settlement | $0.00 | $950.00 |
|             Operating | $0.00 | $0.00 |
|             Account Holders | $0.00 | $0.00 |
|                 User McUser | $0.00 | $0.00 |
|                     Card 4321 | $0.00 | $0.00 |
|                 ... | $0.00 | $0.00 |
|             ... | $0.00 | $0.00 |
|     ... | $0.00 | $0.00 |

*FIG. 14D*

| Chart of Accounts 600 | Pending | Available |
|---|---|---|
| Assets 610 | $1,000.00 | $0.00 |
|     RTN- 123456789 | $1,000.00 | $0.00 |
|         For Benefit of Lithic Customers | $1,000.00 | $0.00 |
|             Program A VBAN Container | $1,000.00 | $0.00 |
|                 Reserve VBAN | $0.00 | $0.00 |
|                 Settlement VBAN 1520 | $1,000.00 | $0.00 |
|                 Liability Operating VBAN | $0.00 | $0.00 |
|                 ... | $0.00 | $0.00 |
|                 ... | $0.00 | $0.00 |
|         Lithic Holding VBAN | $0.00 | $0.00 |
| Liabilities 620 | $1,000.00 | $0.00 |
|     Network Payables | $0.00 | $0.00 |
|         FIS Payable | $0.00 | $0.00 |
|         MCD Payable | $0.00 | $0.00 |
|     Programs Container | $1,000.00 | $0.00 |
|         Program A 1510 | $1,000.00 | $0.00 |
|             Reserve | $0.00 | $0.00 |
|             Settlement 1515 | $1,000.00 | $0.00 |
|             Operating | $0.00 | $0.00 |
|             Account Holders | $0.00 | $0.00 |
|                 User McUser | $0.00 | $0.00 |
|                     Card 4321 | $0.00 | $0.00 |
|                 ... | $0.00 | $0.00 |
|             ... | $0.00 | $0.00 |
|         ... | $0.00 | $0.00 |

630 — Pending
640 — Available

*FIG. 15A*

| Chart of Accounts 600 | Pending 630 | Available 640 |
|---|---|---|
| Assets 610 | $0.00 | $1,000.00 |
|     RTN- 123456789 | $0.00 | $1,000.00 |
|         For Benefit of Lithic Customers | $0.00 | $1,000.00 |
|             Program A VBAN Container | $0.00 | $1,000.00 |
|                 Reserve VBAN | $0.00 | $0.00 |
|                 Settlement VBAN 1520 | $0.00 | $1,000.00 |
|                 Liability Operating VBAN | $0.00 | $0.00 |
|                 ... | $0.00 | $0.00 |
|                 ... | $0.00 | $0.00 |
|            Lithic Holding VBAN | $0.00 | $0.00 |
| Liabilities 620 | $0.00 | $1,000.00 |
|     Network Payables | $0.00 | $0.00 |
|     FIS Payable | $0.00 | $0.00 |
|     MCD Payable | $0.00 | $0.00 |
|     Programs Container | $0.00 | $1,000.00 |
|         Program A 1510 | $0.00 | $1,000.00 |
|             Reserve | $0.00 | $0.00 |
|             Settlement 1515 | $0.00 | $1,000.00 |
|             Operating | $0.00 | $0.00 |
|             Account Holders | $0.00 | $0.00 |
|                 User McUser | $0.00 | $0.00 |
|                     Card 4321 | $0.00 | $0.00 |
|                     ... | $0.00 | $0.00 |
|                     ... | $0.00 | $0.00 |
|                     ... | $0.00 | $0.00 |

*FIG. 15B*

| Chart of Accounts 600 | Pending 630 | Available 640 |
|---|---|---|
| Assets 610 | $0.00 | $1,000.00 |
|     RTN- 123456789 | $0.00 | $1,000.00 |
|         For Benefit of Lithic Customers | $0.00 | $1,000.00 |
|             Program A VBAN Container | $0.00 | $1,000.00 |
|                 Reserve VBAN | $0.00 | $0.00 |
|                 Settlement VBAN | $0.00 | $1,000.00 |
|                 Liability Operating VBAN | $0.00 | $0.00 |
|                 ... | $0.00 | $0.00 |
|                 ... | $0.00 | $0.00 |
|             Lithic Holding VBAN | $0.00 | $0.00 |
| Liabilities 620 | $1,000.00 | $0.00 |
|     Network Payables | $50.00 | $0.00 |
|         FIS Payable 1530 | $50.00 | $0.00 |
|         MCD Payable | $0.00 | $0.00 |
|     Programs Container | $950.00 | $0.00 |
|         Program A 1510 | $950.00 | $0.00 |
|             Reserve | $0.00 | $0.00 |
|             Settlement 1515 | $950.00 | $0.00 |
|             Operating | $0.00 | $0.00 |
|             Account Holders | $0.00 | $0.00 |
|                 User McUser | $0.00 | $0.00 |
|                     Card 4321 1525 | $0.00 | $0.00 |
|                     ... | $0.00 | $0.00 |
|                 ... | $0.00 | $0.00 |
|             ... | $0.00 | $0.00 |

*FIG. 15C*

| Chart of Accounts 600 | Pending | Available |
|---|---|---|
| Assets 610 | $0.00 | $1,000.00 |
|     RTN- 123456789 | $0.00 | $1,000.00 |
|         For Benefit of Lithic Customers | $0.00 | $1,000.00 |
|             Program A VBAN Container | $0.00 | $1,000.00 |
|                 Reserve VBAN | $0.00 | $0.00 |
|                 Settlement VBAN | $0.00 | $1,000.00 |
|                 Liability Operating VBAN | $0.00 | $0.00 |
|                 ... | $0.00 | $0.00 |
|                 ... | $0.00 | $0.00 |
|         Lithic Holding VBAN | $0.00 | $0.00 |
| Liabilities 620 | $0.00 | $1,000.00 |
|     Network Payables | $0.00 | $50.00 |
|         FIS Payable 1530 | $0.00 | $50.00 |
|         MCD Payable | $0.00 | $0.00 |
|     Programs Container | $0.00 | $950.00 |
|         Program A 1510 | $0.00 | $950.00 |
|             Reserve | $0.00 | $0.00 |
|             Settlement 1515 | $0.00 | $950.00 |
|             Operating | $0.00 | $0.00 |
|             Account Holders | $0.00 | $0.00 |
|                 User McUser | $0.00 | $0.00 |
|                     Card 4321 1525 | $0.00 | $0.00 |
|                     ... | $0.00 | $0.00 |
|                     ... | $0.00 | $0.00 |
|         ... | $0.00 | $0.00 |

| Chart of Accounts 600 | Pending | Available |
|---|---|---|
| Assets 610 | $0.00 | $0.00 |
|     RTN- 123456789 | $0.00 | $0.00 |
|         For Benefit of Lithic Customers | $0.00 | $0.00 |
|             Program A VBAN Container | $0.00 | $0.00 |
|                 Reserve VBAN | $0.00 | $0.00 |
|                 Operating VBAN | $0.00 | $0.00 |
|                 ... | $0.00 | $0.00 |
|             ... | $0.00 | $0.00 |
|             Lithic Holding VBAN | $0.00 | $0.00 |
|     Accounts Receivable | $0.00 | $0.00 |
|         Programs Accounts Receivable | $0.00 | $0.00 |
|             Program A A/R Container | $0.00 | $0.00 |
|                 Program A A/R | $0.00 | $0.00 |
|                 Program A Contra A/R | $0.00 | $0.00 |
| Liabilities 620 | $0.00 | $0.00 |
|     Network Payables | $0.00 | $0.00 |
|         FIS Payable | $0.00 | $0.00 |
|         MCD Payable | $0.00 | $0.00 |
|     Programs Container | $0.00 | $0.00 |
|         Program A | $0.00 | $0.00 |
|             Reserve | $0.00 | $0.00 |
|             Operating | $0.00 | $0.00 |
|             Account Holders | $0.00 | $0.00 |
|                 User McUser | $0.00 | $0.00 |
|                     Card 4321 | $0.00 | $0.00 |
|                     ... | $0.00 | $0.00 |
|                 ... | $0.00 | $0.00 |
|         ... | $0.00 | $0.00 |

*FIG. 16*

PROCESSING TRANSACTIONS WITH IDEMPOTENCY IN REAL-TIME LEDGERS

TECHNICAL FIELD

This disclosure generally relates to databases and file management within network environments, and in particular relates to hardware and software for securing and validating multi-server electronic communications within a network environment.

BACKGROUND

Payment systems provided by banks and other financial institutions are used in lieu of tendering cash in domestic and international transactions. A payment system is any system used to transact, clear, and settle payment transactions through the transfer of currency (e.g., monetary currency, virtual currency, etc.). This includes the institutions, instruments, people, entities, services, rules, procedures, standards, and technologies that make its exchange possible. A common type of payment system is called an operational network, which links bank accounts and provides for monetary exchange using bank deposits. Some payment systems also include credit mechanisms, which are essentially agreements with financial entities to lend currency to borrowers to be repaid at a later point in time.

Traditional payment systems include negotiable instruments such as drafts (e.g., cheques) and documentary credits such as letters of credit. With the advent of computers and electronic communications, many alternative electronic payment systems have emerged. The term electronic payment refers to a payment made from one bank account to another using electronic methods, forgoing the need for bank employees to directly facilitate each transaction. In particular, the term electronic payment may refer to e-commerce, i.e., a payment for buying and selling goods or services offered through an electronic transfer of funds (e.g., through the Internet or other suitable computer network environments). In contrast to traditional payment systems, modern payment systems utilize electronic transactions based on debit cards, credit cards, electronic cards, electronic funds transfers, direct credits, direct debits, internet banking, and other forms of e-commerce payment systems.

Payment systems may be physical or electronic, and each payment system may have its own procedures and protocols. Standardization has allowed some of these systems and networks to grow to a global scale, but there are still many country-specific, platform-specific, entity-specific, and/or product-specific systems. Examples of payment systems that have become globally ubiquitous are credit cards and automated teller machine (ATM) networks. Other specific forms of payment systems are also used to settle financial transactions for products in the equity markets, bond markets, currency markets, futures markets, derivatives markets, and options markets. Additionally, various techniques exist to transfer funds between financial institutions. Domestically, this is accomplished using automated clearing house (ACH) and real-time gross settlement (RTGS) systems. Internationally, this is accomplished using the Society for Worldwide Interbank Financial Telecommunication (SWIFT) network.

SUMMARY OF PARTICULAR EMBODIMENTS

In particular embodiments, a receiver processor may automatically secure and validate multi-server electronic communications over a plurality of networks without requiring additional physical or programmatic infrastructure on the intermediary servers/entities. The receiver processor may communicate with different entities in a payment system, either directly or indirectly, to facilitate account/card generation and transaction payment processing. As an example and not by way of limitation, these entities may comprise an account holder such as an individual payer, a commerce entity such as a merchant, an enterprise client, a payment network, a receiver institution such as an issuing bank, an originator institution such as an acquiring bank, a receiver processor, an originator processor, a payment facilitator, other suitable entities, or any combination thereof. In particular embodiments, the receiver processor may utilize (and/or make available) application programming interface (API) resources, which may provide a predictable and programmatic interface to create and configure accounts/cards and facilitate electronic transactions associated with the accounts/cards. As an example and not by way of limitation, based on real-time payment data, the receiver processor may programmatically issue cards, configure card permissions, and set authorization parameters (e.g., spending limits, periodic limits, merchant locking, location matching, risk thresholds, etc.) all through an API generated by, implemented by, and/or provided by a receiver processor. As another example and not by way of limitation, during a transaction, the receiver processor may authenticate requests from individual payers or enterprise clients via the API, and return the authentication results to them via the API. As yet another example and not by way of limitation, during a transaction, the receiver processor may verify transaction requests from merchants, payment networks, acquirer processors, issuing banks, and/or acquiring banks via the API, and return the verification results to them via the API. Although this disclosure describes particular functions of particular issuer processors in a particular manner, this disclosure contemplates any suitable function of any suitable issuer processor in any suitable manner.

In particular embodiments, the receiver processor may attribute millions of transactions to a diverse set of financial accounts. Such transactions may follow different flows and affect different accounts based on customer and internal configurations. As an example and not by way of limitation, internal configurations for possible ISO8583 transactions may include pre-paid (drawing funding from a for-benefit-of account), post-paid (extending a customer a line of credit) and multi-account (multiple settlement account). The receiver processor may attribute transactions, aid in transaction processing by decisioning on balances, produce accurate balances and model all money movements. As a result, the receiver processor may automate the real-time ledgering of financial and non-financial activities from multiple sources. As an example and not by way of limitation, these sources may include, but not limited to, ACH, ISO8583 transactions, direct transfers, wires, etc. This may enable the receiver processor 140 to accurately bill customers, extend lines of credit, offer virtual bank accounts (potentially FDIC insured), offer "for the benefit of" (FBO) accounts, support complex multistage movements of money across multiple accounts and produce financial statements and other reports on top of issuing accounts/cards and processing ISO8583 transactions for those accounts/cards. In particular embodiments, the receiver processor may process a transaction by using real-time balance information to determine whether a message should be authorized, which may include assigning a transaction and group identifier, processing the authorization, and updating various ledger balances based on the transaction itself. In particular embodiments, conditional checks may be applied before the ledger is updated to ensure that no previous updates were based on events/transactions with the same identifier as the present transaction. Although this disclosure describes ledgering particular transactions by particular processors in a particular manner, this disclosure contemplates ledgering any suitable transaction by any suitable processor in any suitable manner.

In particular embodiments, the receiver processor may receive a first network event corresponding to a first transaction associated with a transfer of resources between a resource account and a third party. The first network event may be assigned a unique transaction group identifier associated with the first transaction. In particular embodiments, the receiver processor may authorize the transfer of resources based at least in part on a balance value of a ledger account recorded in an account ledger. The ledger account may represent the resource account in the account ledger. In particular embodiments, the receiver processor may record a first update in the account ledger. Recording the first update may comprise recording the unique transaction group identifier in association with the first update and the ledger account, and modifying the balance value of the ledger account in the account ledger based on a transfer value associated with the transfer of resources. In particular embodiments, the receiver processor may receive a second network event corresponding to a second transaction associated with the transfer of resources between the resource account and the third party. The receiver processor may determine that a unique transaction group identifier assigned to the second network event matches the unique transaction group identifier associated with the first update and the ledger account. In particular embodiments, the determination of a match may indicate that the balance value of the resource account has already been modified based on the transfer of resources. The receiver processor may further record a second update in the account ledger. In particular embodiments, recording the second update may comprise recording the unique transaction group identifier in association with the second update without modifying the balance value of the ledger account in the account ledger.

Certain technical challenges exist for processing transactions with idempotency in real-time ledgers. One technical challenge may include effective and efficient ledgering of all impacted accounts with respect to a transaction. The solution presented by the embodiments disclosed herein to address this challenge may be an extensible and flexible chart of accounts as it may enable the receiver processor to model a vast array of customer hierarchies. Another technical challenge may include effective and efficient ledgering of complex money movements. The solution presented by the embodiments disclosed herein to address this challenge may be supporting flows such as transaction authorization from a pre-paid balance at the program and cardholder levels, post-paid transactions at the program and cardholder levels, and real-time funding as the receiver processor may atomically and transactionally move money across multiple financial accounts.

Certain embodiments disclosed herein may provide one or more technical advantages. A technical advantage of the embodiments may include enabling the receiver processor to accurately identify outstanding account receivables and payables. Another technical advantage of the embodiments may include enabling transaction authorization from a pre-paid balance. Another technical advantage of the embodiments may include decreased financial risk as the receiver processor may allow for the holding/suspense of risky (e.g., ACH) transactions that take multiple days to settle. Another technical advantage of the embodiments may include tracking and recording an auditable trail of financial activity across all assets, liabilities and equities such as accounts receivables, virtual bank accounts, network payables and external clients, which may result in FDIC-insured bank accounts, identifying erroneous transactions, and providing accurate account statements. Another technical advantage of the embodiments may include producing accurate real-time and historical balances with transaction attribution for all accounts within the account ledger, which may further help with auditing, billing, transaction processing and customer APIs. Certain embodiments disclosed herein may provide none, some, or all of the above technical advantages. One or more other technical advantages may be readily apparent to one skilled in the art in view of the figures, descriptions, and claims of the present disclosure.

In particular embodiments, the receiver processor may attribute millions of transactions to a diverse set of financial accounts. Such transactions may follow different flows and affect different accounts based on customer and internal configurations. The receiver processor may attribute transactions, aid in transaction processing by decisioning on balances, produce accurate balances and model all money movements. In particular embodiments, the financial accounts may include virtual accounts. Because virtual accounts may contain sensitive data, and because certain real-time ledger data may be intended to be available to downstream consuming modules, the receiver processor may utilize a virtual-account table separate from the real-time ledger to permit accurate tracking of virtual accounts, virtual-account transactions, and any related containers/programs in the ledger without compromising the sensitive virtual-account data. More information on virtual accounts may be found in U.S. patent application Ser. No. 17/859,943, filed 7 Jul. 2022, and U.S. patent application Ser. No. 17/859,954, filed 7 Jul. 2022, each of which is incorporated by reference. Although this disclosure describes ledgering particular accounts by particular processors in a particular manner, this disclosure contemplates ledgering any suitable account by any suitable processor in any suitable manner.

In particular embodiments, the receiver processor may receive a request to generate a virtual bank account (VBAN) associated with a user. The receiver processor may then identify, from an account ledger, a unique container ledger account identifier associated with a VBAN container ledger account, and a unique final ledger account identifier associated with a final ledger account. In particular embodiments, the VBAN container ledger account and the final ledger account may be associated with a resource account. The receiver processor may then generate a unique VBAN account number for a first VBAN associated with the user. In particular embodiments, the first VBAN may be associated with the final ledger account and the VBAN account number may be based at least in part on the unique container ledger account identifier. The receiver processor may then record, in a privacy table separate from the account ledger, a VBAN record for the first VBAN. The VBAN record may comprise the unique container ledger account identifier, the unique final ledger account identifier, the unique VBAN account number for the first VBAN, and a routing number associated with the first VBAN. In particular embodiments, the receiver processor may further transmit, to the user, the unique VBAN account number for the first VBAN and the routing number associated with the first VBAN.

Certain technical challenges exist for dual-table ledgering. One technical challenge may include accurate mapping between a VBAN and a ledger account. The solution presented by the embodiments disclosed herein to address this challenge may be a VBAN-ledger record as this record may be a final ledger account under the program container with the same UUID as the VBAN-record in the VBAN privacy table and may be used to keep track of balances.

Certain embodiments disclosed herein may provide one or more technical advantages. A technical advantage of the embodiments may include enhancing data security as the VBAN record containing sensitive data is stored in a separate table (i.e., the privacy table), thereby preventing such data being leaked downstream. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 6A-6B illustrate example charts of accounts.

FIGS. 14A-14D illustrate example ledger events for the pre-paid program via the single message flow.

FIGS. 15A-15D illustrate example ledger events for the pre-paid program via the dual message flow.

FIG. 16 illustrates example ledger events for the post-paid program.

DESCRIPTION OF EXAMPLE EMBODIMENTS

System Overview

Figure 1:
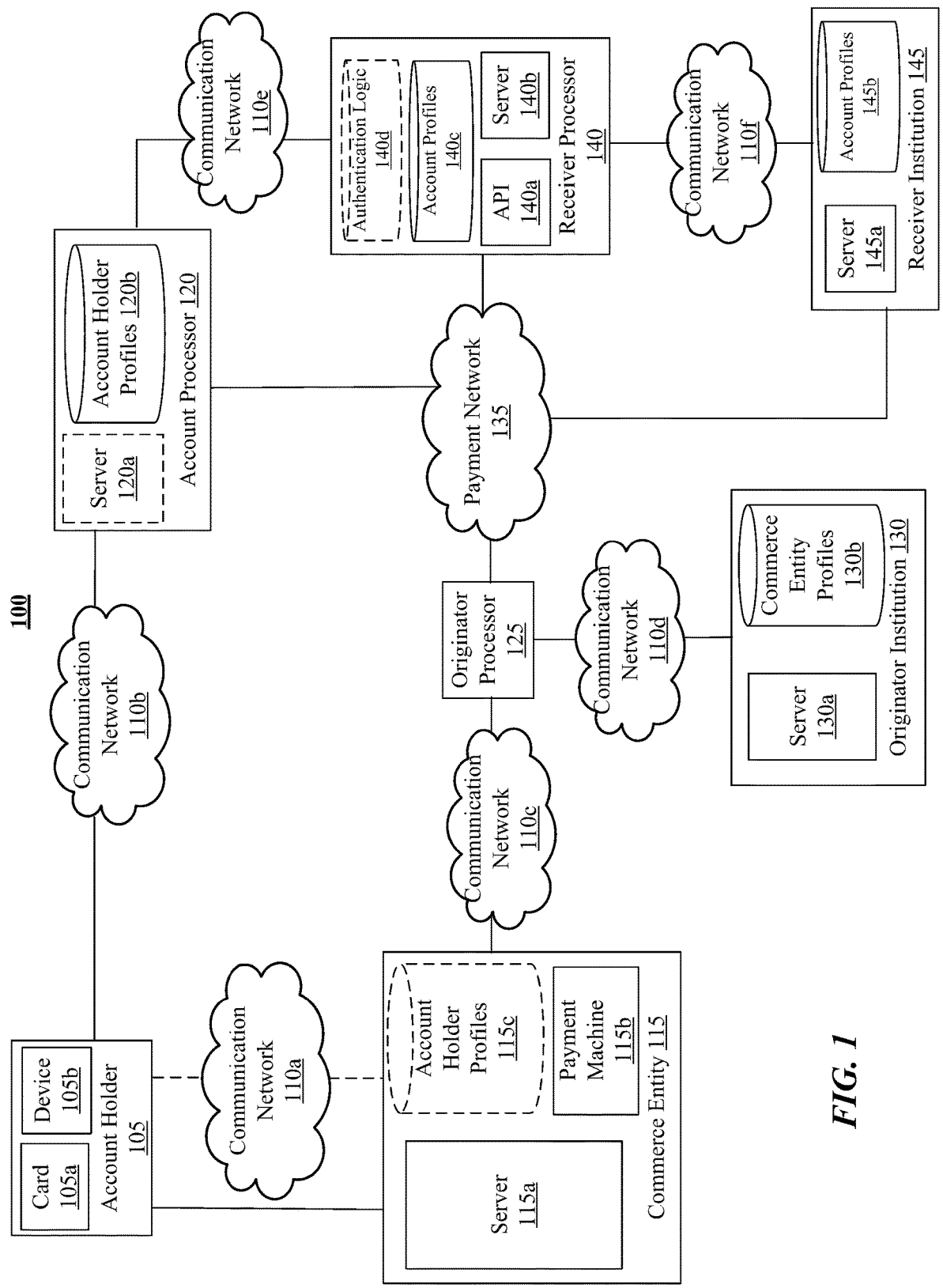
FIG. 1 illustrates an example payment system.

FIG. 1 illustrates an example payment system 100. The payment system 100 includes an account holder 105 (e.g., a payer), a commerce entity 115 (e.g., a merchant), an account processor 120, an originator processor 125, an originator institution 130 (e.g., a financial institution such as an acquiring bank), a receiver processor 140, and a receiver institution 145 (e.g., a financial institution such as an issuing bank), which may be interconnected to another through various networks, including communication networks 110 (e.g., the Internet and/or the like) and a payment network 135 (e.g., credit network, debit network, ATM network, and/or the like). Although FIG. 1 illustrates a particular arrangement of an account holder 105, communication networks 110, a commerce entity 115, an account processor 120, an originator processor 125, an originator institution 130, a payment network 135, a receiver processor 140, and a receiver institution 145, this disclosure contemplates any suitable arrangement of an account holder 105, communication networks 110, a commerce entity 115, an account processor 120, an originator processor 125, an originator institution 130, a payment network 135, a receiver processor 140, and a receiver institution 145. As an example and not by way of limitation, two or more of an account holder 105, a commerce entity 115, and an account processor 120 may be connected to or communicate with each other directly, bypassing the communication network 110. As another example, two or more of an account processor 120 and a receiver processor 140 may be physically or logically co-located with each other in whole or in part. As yet another example, two or more of a receiver processor 140 and a receiver institution 145 may be physically or logically co-located with each other in whole or in part. As yet another example, two or more of an originator institution 130 and a receiver institution 145 may be physically or logically co-located with each other in whole or in part. As yet another example, two or more of an originator processor 125 and an originator institution 130 may be physically or logically co-located with each other in whole or in part. As yet another example, two or more of a payment network 135 and a receiver institution 145 may be physically or logically co-located with each other in whole or in part. Moreover, although FIG. 1 illustrates a particular number of an account holder 105, communication networks 110, a commerce entity 115, an account processor 120, an originator processor 125, an originator institution 130, a payment network 135, a receiver processor 140, and a receiver institution 145, this disclosure contemplates any suitable number of an account holder 105, communication networks 110, a commerce entity 115, an account processor 120, an originator processor 125, an originator institution 130, a payment network 135, a receiver processor 140, and a receiver institution 145. As an example and not by way of limitation, the payment system 100 may include multiple account holders 105, commerce entities 115, account processors 120, originator processors 125, originator institutions 130, payment networks 135, receiver processors 140, and receiver institutions 145.

This disclosure contemplates any suitable communication network 110 or payment network 135. As an example and not by way of limitation, one or more portions of a communication network 110 or payment network 135 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A communication network 110 may include one or more communication networks 110 and a payment network 135 may include one or more payment networks 135.

In particular embodiments, an account holder 105 may initialize a payment to a commerce entity 115 at the commerce entity's 115 location for purchasing merchandise or services from the commerce entity 115. The payment may be an electronic payment with or without a card 105*a*. The account holder 105 may use a device 105*b* (e.g., personal computing device such as a smartphone) for such payment. As an example and not by way of limitation, the account holder 105 may use the account holder's device 105*b* to initialize the payment via a digital payment platform without having a card 105*a*. The payment may also be a card payment using a card 105*a*. In particular embodiments, the card 105*a* may be either a credit card or a debit card for the payment. The card 105*a* may be issued by the receiver processor 140 or the receiver institution 145. As an example and not by way of limitation, the card 105*a* may be a physical piece of plastic with a magnetic stripe at the top and/or a chip. As another example, the card 105*a* may be tokenized so that it is a card stored in a smartphone's digital wallet and then used to tap and pay. In alternative embodiments, the account holder 105 may initialize the payment via the communication network 110*a*, which may be part of an online transaction. The account holder 105 may use the account holder's device 105*b* for the online transaction. In particular embodiments, the device 105*b* may be any computing device comprising networking interface circuitry, such as a network interface card (NIC) or similar component, and a processor capable of accessing data over the communication network 110*a*. Non-limiting examples of the device 105*b* may include a workstation computer, a desktop computer, a laptop computer, a notebook computer, a netbook, a tablet, a smartphone, a server, a personal digital assistant (PDA), a handheld electronic device, a cellular telephone, a smartphone, a virtual reality (VR) headset, an augmented reality (AR) smart glasses, other suitable electronic device, or any suitable combination thereof.

In particular embodiments, the commerce entity 115 may comprise a server 115*a* and a payment machine 115*b*, and optionally account holder profiles 115*c*. The payment machine 115*b* may read the card that is used for payment. As an example and not by way of limitation, the payment machine 115*b* may be a card reader, a card terminal, a payment terminal, or a point-of-sale (POS) terminal. In particular embodiments, the account holder 105 may use the card 105*a* to interact with the payment machine 115*b*, e.g., by swiping the card 105*a* through the payment machine 115*b*, inserting the card 105*a* into the payment machine 115*b*, tapping the card 105*a* on the payment machine 115*b*, or tapping the payment machine 115*b* with a smartphone having a virtual card in its digital wallet. For online transactions, the payment machine 115*b* may be considered as a payment gateway, which may be not a physical machine but rather handled via software. For online transactions, the card 105*a* used for payment may be a virtual card that is just the card number shown in a software application.

In particular embodiments, the originator institution 130 may provide the payment machine 115*b* to the commerce entity 115. The originator institution 130 may go out and acquire commerce entities 115 and provide them the tools and facilities to accept and process card-based payments. The originator institution 130 may comprise a server 130*a* and commerce entity profiles 130*b*. The originator institution 130 may utilize a technology provider, e.g., the originator processor 125, that can connect with the payment network 135 to handle transactions from various channels such as credit cards and debit cards for the originator institution 130. In particular embodiments, the originator processor 125 may process the transactions from the commerce entity 115, through the originator institution 130 and then the payment network 135 (or an alternative payment method such as a digital payment platform) to ensure the receiver institution 145 that the commerce entity's 115 transactions with the account holder 105 are authorized and may be settled. In particular embodiments, the originator processor 125 may utilize hardware (e.g., network interface components at a data center) and a fast direct network connection to the payment network 135 to request approval of a payment. In particular embodiments, the originator institution 130 may build this technology in-house (e.g., via its server 130*a*) or may rely on a third-party originator processor 125 to handle this functionality.

In particular embodiments, one or more of the account holder 105, the account holder's card 105*a*, or the account holder's device 105*b* may be associated with a corporation (e.g., a company) that is an enterprise client or partner of the receiver institution 145 and/or the receiver processor 140. As an example and not by way of limitation, the account holder 105 may be an employee of the corporation. As another example and not by way of limitation, the account holder 105 may be a contractor of the corporation. The corporation may be associated with the account processor 120. In particular embodiments, the account processor 120 may comprise account holder profiles 120*b*. The account processor 120 may optionally comprise an account processor server 120*a*. In particular embodiments, the account holder 105 may use the account holder's device 105*b* to communicate with the account processor 120. As an example and not by way of limitation, the account holder 105 may send a request for account generation, card generation, funding, payment approval, etc. to the account processor 120. As another example and not by way of limitation, the account holder 105 may notify the account processor 120 of a potential payment. As yet another example and not by way of limitation, the account processor 120 or the account holder's device 105*b* may detect that the account holder 105 is physically at the commerce entity's 115 location (e.g., based on GPS signal from the personal computing device associated with the account holder 105), and upon such detection, the account processor 120 may initialize account/card generation or transaction verification.

In particular embodiments, the card 105*a* used for payment may be issued by the receiver institution 145. The receiver institution's 145 function may be to underwrite an individual person (e.g., the account holder 105) or an enterprise client or partner (e.g., a corporation) by providing them with a bank account, a debit card, and may optionally grant them access to credit facilities and a credit card. In particular embodiments, the receiver institution 145 may utilize a technology provider (i.e., the receiver processor 140) to connect with the payment network 135. In particular embodiments, the receiver processor 140 may utilize hardware (e.g., network interface components at a data center) and a fast direct network connection to the payment network 135 to approve or decline a payment. The receiver institution 145 may build this technology in-house (e.g., by providing APIs that can be called by the account processor 120 or payment network 135) or may rely on a third-party receiver processor 140 to handle this functionality.

In particular embodiments, the receiver institution 145 may comprise a server 145a that may accept requests for account/card creation from the receiver processor 140, and then generate the card/account according to the information provided from the receiver processor server 140b. It should be noted that, in some embodiments, the receiver institution 145 may issue what appears to be a full-service credit card or debit card, with no limitations on its use. Functionally, the limitations on use of the new card may be imposed by operation of the receiver processor 140. That is, when the receiver institution server 145a receives, from the payment network 135, a request to verify a transaction, the receiver institution server 145a may query the receiver processor server 140b; and the receiver processor 140 may verify only those transactions where the commerce-entity tag associated with the card/account in the receiver processor account profiles 140c (e.g., including payer and/or client profiles) matches the commerce entity 115 identified in the current transaction data. The receiver processor 140 may optionally check parameters associated with the card/account and/or compare other data associated with the transaction, as discussed in greater detail herein. In particular embodiments, the receiver institution 145 may also comprise account profiles 145b. In particular embodiments, the receiver institution 145 may be a distinct entity from the receiver processor 140. In alternative embodiments, the receiver processor 140 functionality may be implemented by the receiver institution 145. In alternative embodiments, the receiver processor 140 may be registered to operate as a receiver institution 145. In alternative embodiments, the receiver processor 140 may maintain a contractual relationship with a financial institution, whereby the receiver processor 140 may function in some respects as a receiver institution 145.

In particular embodiments, the receiver processor 140 may comprise an application programming interface (API) 140a, a server 140b, account profiles 140c (e.g., including payer and/or client profiles), and optionally authentication logic 140d. The account profiles 140c may comprise profiles of individual and enterprise clients. The API 140a may provide a programmatic interface to create and configure accounts/cards. In particular embodiments, the account processor 120 may call the API 140a to request the receiver processor 140 to provide various account/card/transaction services and the receiver processor 140 may return the relevant results to the account processor 120 via the API 140a. As an example and not by way of limitation, the account processor 120 may get real-time payment data, programmatically request issuance of new cards, configure card permissions, and set spending limits through API 140a. In particular embodiments, the receiver processor 140 may verify requests from the account processor 120 via the API 140a. The requests may be verified with an API key (e.g., cryptographic public/private keys). The receiver processor 140 may return errors via the API 140a, which may be used by the account processor 120 to diagnose failed transactions and improve its exception-handling capabilities. As an example and not by way of limitation, an error returned via API 140a may be that [query] is not a valid parameter, indicating that a query parameter in the request does not match the valid queries for the endpoint. As another example, an error returned via API 140a may be that an account holder 105 has not been authenticated, indicating an invalid or missing API key. As yet another example, an error returned via API 140a may be that the API key is not active, indicating that the API key used is no longer active. As yet another example, an error returned via API 140a may be that the receiver processor 140 could not identify the API key, indicating the API key provided is not associated with any account processor 120. As yet another example, an error returned via API 140a may be requiring an API key in authorization header, indicating the authorization header is not in the request. As yet another example, an error returned via API 140a may be that authorization header is not formatted properly. As yet another example, an error returned via API 140a may be insufficient privileges or issuing API key required, indicating write access requires an issuing API key. As yet another example, an error returned via API 140a may be insufficient privileges to create unlocked cards, indicating creating unlocked cards requires an additional privilege. As yet another example, an error returned via API 140a may be authorization failed (in simulation), indicating an authorization fails when simulating an authorization. As yet another example, an error returned via API 140a may be rate limited with too many requests per second, indicating an account processor 120 has exceeded their per second rate limit. As yet another example, an error returned via API 140a may be rate limited with daily limit reached, indicating an account processor 120 has exceeded their daily rate limit. As yet another example, an error returned via API 140a may be rate limited with too many keys tried, indicating one IP has queried too many different API keys. As yet another example, an error returned via API 140a may be an internal server error, indicating there was a processing error on the server-side.

In particular embodiments, a single API key may manage a portfolio of end-users (i.e., accounts), each with its own funding sources, cards, and transactions. End-users may be onboarded through the enrollment endpoint, which runs the candidate enrollment through a customer identification program and returns an account token if successful. After the first end-user is enrolled in the production environment, all subsequent API calls should include a uniform resource identifier (URI) parameter indicating which end-user this API request is on behalf of. The reason for this behavior change is because, upon initial provisioning, the API key may map one-to-one to a root account specifically associated with the account processor 120. After requesting enrollment, the API key mapping may become one-to-many, so the API 140a may require an account-token parameter and/or a URI parameter to indicate which individual account, within the portfolio of accounts, to perform an action on behalf of. If one or more end-users have been enrolled and no account-token argument is supplied, the API 140a may assume the root account.

In particular embodiments, different parties (e.g., a financial institution such as a bank, an account holder 105, the receiver processor 140, etc.) may set rules on accounts created by the receiver processor 140 via the API 140a. As an example and not by way of limitation, the receiver institution 145 may set account specific transaction limits.

As another example and not by way of limitation, a payer, as an account holder 105, may set up parental controls if a minor of the account holder 105 also has access to the account. As yet another example and not by way of limitation, the originator processor 125 or originator institution 130 may set rules to protect the commerce entity 115.

In particular embodiments, the account processor 120 may set rules on accounts to control spending via the API 140a. The account configuration schema may comprise the account token, the account state, and one or more parameters for the account (e.g., a spending limit/frequency). The account token may be a globally unique identifier for the account. The account states may include an active, paused, closed, locked, restricted, banned/suspended, and/or flagged state. Spending limit parameters for an account may comprise limitations on an individual transaction or a plurality of transactions. As an example and not by way of limitation, a single transaction may be limited to a maximum permitted payment value. As another example and not by way of limitation, a set of multiple transactions may be limited based on the volume or frequency of transactions (e.g., maximum number of transactions within a day or week). As yet another example, a set of multiple transactions may be limited based on combined transaction values (e.g., maximum total spending permitted daily, monthly, and/or over the lifetime of the account). Any charges to a card associated with this account may be declined (or alternatively paused/held or flagged for additional authorization) once their transaction volume and/or total value has surpassed the limit in the applicable time period, which may be on a rolling basis. A lifetime spending limit value of 0 or null in the account configuration may indicate that the lifetime spending limit feature is disabled such that there is no lifetime spending limit for that account. In particular embodiments, the account processor 120 may access account spending limits for one or more specified accounts via the API 140a. This endpoint may only be used on individual accounts within the portfolio of accounts associated with the root account that the calling API key manages. If an account token is specified, this endpoint may return an account-configuration object representing the account specified. If an account token is not specified, a list of account-configurations (e.g., account state and account parameters) for the individual accounts in the portfolio of accounts associated with the root account may be returned. If querying for a single account, the account processor 120 may not include pagination queries as there is only one account. In particular embodiments, the account processor 120 may set spending limits for a specified account (e.g., a root account), which may be applied to the accounts in the portfolio of accounts associated with the specified account that are managed by this API key. As an example and not by way of limitation, the account processor 120 may set a new amount for an account's daily spending limit, monthly spending limit, and lifetime spending limit. When one of these limits is reached, no transactions may be accepted on any card created for this account for the corresponding period unless the spending limit is updated. In particular embodiments, the account processor 120 may set the account state for a specified account via the API 140a, which may be applied to the accounts in the portfolio of accounts associated with the specified account that are managed by this API key. Accounts that are set as being in the paused account state may not be able to transact or create new cards.

In particular embodiments, the account processor 120 may enroll end-users (e.g., account holder 105) via the API 140a. The account processor 120 may enroll a new individual account into the root account managed by the API key. This endpoint may run the candidate enrollment through the customer identification program (CIP) and return an account token if successful. As an example and not by way of limitation, the request for enrollment may comprise one or more of date of birth (as an ISO 8601 date), email (if utilizing the receiver processor 140 for chargeback processing, this email address may be used to communicate dispute status and resolution), account holder's 105 first name, an ISO 8601 timestamp at which precomputed KYC (know-your-customer) was completed, a KYC-type specifying the KYC workflow to run on the account holder 105 for which the individual account is being created, account holder's 105 last name, account holder's 105 phone number which may improve the chances of a positive identity match and successful API response, social security number which may be required for identity verification and compliance with US banking regulations, valid address, an ISO 8601 timestamp at which the terms of service of the receiver processor 140 were accepted by account holder 105, or postal code. When a KYC evaluation fails, one or more of the failure reasons in Table 1 (below) may be returned in the API response.

TABLE 1

| Example failure reasons for KYC evaluations. | |
|---|---|
| ADDRESS_VERIFICATION_FAILURE | The address provided could not be matched. |
| AGE_THRESHOLD_FAILURE | The user did not fall within an acceptable age range. |
| BANKRUPTCY_RELATED_FAILURE | The user has a bankruptcy on record. |
| BLOCKLIST_ALERT_FAILURE | The user appeared on one or more blocklists. |
| COMPLETE_VERIFICATION_FAILURE | The user could not be matched to a person in any data source. |
| DATA_STRENGTH_FAILURE | The user's public record has insufficient information that can be used for verification. |
| DOB_VERIFICATION_FAILURE | The date of birth provided could not be matched. |
| EMAIL_VERIFICATION_FAILURE | The email provided is not valid or is improperly formatted. |
| MULTIPLE_RECORDS_FAILURE | The user has several valid records with conflicting information. |
| NAME_VERIFICATION_FAILURE | The name provided could not be matched. |
| PHONE_VERIFICATION_FAILURE | The phone number provided could not be matched. |

TABLE 1-continued

Example failure reasons for KYC evaluations.

| | |
|---|---|
| RISK_THRESHOLD_FAILURE | The user was flagged for high risk of fraud. |
| SSN_VERIFICATION_FAILURE | The social security number provided could not be matched. |
| OTHER_VERIFICATION_FAILURE | The user was rejected for a reason other than one specified above. |

In particular embodiments, the account processor 120 may use KYC to onboard and verify its customers. Building out KYC for products associated with the account processor 120 may be a substantial build that include third-party vendor selection and contract negotiation. In particular embodiments, through the API 140a, the account processor 120 may perform basic KYC, advanced KYC, and bring your own (BYO) KYC. Basic KYC may include identity verification for an individual, with a simple accepted or rejected decision. An example workflow for basic KYC may be as follows. The account processor 120 may submit, via the API 140a, required information identifying account holder 105, for which the receiver processor 140 may return, via the API 140a, an accepted or rejected status for the account holder 105. Advanced KYC may include identity verification for an individual, with a remediation path if the initially submitted information was not successfully verified (not all cases may be eligible). An example workflow for advanced KYC may be as follows. The account processor 120 may submit, via the API 140a, required information identifying account holder 105, for which the receiver processor 140 may return, via the API 140a, an accepted, rejected, pending resubmit, or pending document status for the account holder 105. If the status is pending resubmit, the account processor 120 may submit, via the API 140a, revised information, for which the receiver processor 140 may return, via the API 140a, an accepted, rejected, pending resubmit, or pending document status. If the status is "pending document", the account processor 120 may identify document type to be submitted, for which the receiver processor 140 may return URLs to which documents may be submitted. Once the account processor 120 submits documents with provided URLs, the API 140a may send a webhook to the account processor 120 once accepted or rejected status is available. BYO KYC may include an account creation process where the account processor 120 may bypass KYC enabled by the receiver processor 140 via the API 140a. The following is an example workflow for BYO KYC. The account processor 120 may submit, via the API 140a, required information with its own KYC workflow identifying account holder 105, for which the receiver processor 140 may return, via the API 140a, an accepted status for the account holder 105.

In particular embodiments, besides KYC, the account processor 120 may use know your business (KYB) to get to market faster by reducing the number of partners needed to launch a card program. The account processor 120 may perform basic KYB and BYO KYB. In particular embodiments, basic KYB may include identity verification for a business, with a simple accepted or rejected decision. An example workflow for basic KYB may be as follows. The account processor 120 may submit, via the API 140a, required information identifying account holder 105, for which the receiver processor 140 may return, via the API 140a, a pending status for the account. The API 140a may then send a webhook to the account processor 120 once accepted or rejected status is available. In particular embodiments, BYO KYB may include an account creation process where the account processor 120 may bypass KYB enabled by the receiver processor 140 via the API 140a. The following is an example workflow for BYO KYB. The account processor 120 may submit, via the API 140a, required information with its own KYB workflow identifying account holder 105, for which the receiver processor 140 may return, via the API 140a, an accepted status for the account holder 105.

In particular embodiments, the account processor 120 may create, update, manage, and reissue cards (both virtual cards and physical cards) via the API 140a. As an example and not by way of limitation, the card schema may comprise one or more of an ISO 8601 timestamp for when the card was created, three digit card verification value (CVV) printed on the back of the card, funding, expiry month and year, hostname of card's locked merchant (empty if not applicable), last four digits of the card number, nickname to identify the card, card number, spending limit (transaction requests above the spend limit may be declined), spending limit duration (e.g., transaction, monthly, annually, forever), state (e.g., open, paused, closed, pending fulfillment, pending activation), token (i.e., globally unique identifier), or type (single use, merchant locked, unlocked, physical). All physical cards may have digital wallet functionality and may be unlocked. Tables 2-4 (below) provide example card types, states, and spending limit durations.

TABLE 2

Example card types.

| | |
|---|---|
| SINGLE_USE | Card may close shortly after the first transaction. |
| MERCHANT_LOCKED | Card may be locked to first merchant that successfully authorizes the card. |
| UNLOCKED (Issuing) | Card may authorize at any merchant. Creating these cards may require additional privileges. |
| PHYSICAL (Enterprise) | Manufactured and sent to the cardholder. The issuer processor may offer white label branding, credit, ATM, PIN debit, chip/EMV, NFC and magstripe functionality. |
| DIGITAL_WALLET (Enterprise) | Cards that may be provisioned to a digital wallet. |

TABLE 3

Example card states.

| | |
|---|---|
| OPEN | Card may approve authorizations (if they match card and account parameters). |
| PAUSED | Card may decline authorizations but may be resumed at a later time. |
| CLOSED | Card may no longer approve authorizations. Closing a card may not be undone. |
| PENDING_FULFILLMENT | The initial state for cards of type PHYSICAL. The card may be provisioned pending manufacturing and fulfillment. Cards in this state may accept authorizations for e-commerce purchases, but not for "Card Present" purchases where the physical card itself is present. |
| PENDING_ACTIVATION | Each day at a certain time, cards of type PHYSICAL in state PENDING_FULFILLMENT may be sent to the card production warehouse and updated to state PENDING_ACTIVATION. Similar to PENDING_FULFILLMENT, cards in this state may be used for e-commerce transactions. API clients may update the card's state to OPEN after the cardholder confirms receipt of the card. |

TABLE 4

Example card spending limit durations.

| | |
|---|---|
| TRANSACTION | Card may authorize multiple transactions if each individual transaction is under the spending limit. |
| MONTHLY | Card may authorize transactions up to a spending limit for the trailing month. (Note month may be calculated as this calendar date one month prior). |
| ANNUALLY | Card may authorize transactions up to a spending limit in a calendar year. |
| FOREVER | Card may authorize up to a spending limit for the entire lifetime of the card. |

In particular embodiments, the account processor 120 may embed card PANs (primary account numbers) and CVV codes via the API 140a. Handling card PANs and CVV codes may require compliance with the payment card industry data security standards (PCI DSS). An enterprise client may choose to reduce their compliance obligations by using an embedded card UI (user interface) solution provided by the receiver processor 140. In this setup, PANs and CVV codes may be presented to the end-user (e.g., account holder 105) via a card UI that the receiver processor 140 provides, optionally styled in the enterprise client's branding using a specified CSS stylesheet. The request for the embedded card UI may be made directly to the receiver processor 140 (e.g., via a browser) such that the card PANs and CVVs are not transmitted or exposed to the account processor servers 120a, but are still displayed and visible to the end-users. The API response may comprise an HTML document, and the URL for the request may be inserted directly into the source attribute (SRC) of an inline frame (iframe) element. In particular embodiments, the account processor 120 may compute the request payload server-side at account processor server 120a. The account processor 120 may render the request payload (or the whole iframe) on the server 120a, or may make an AJAX call from the front-end code. The request for the embedded card UI may comprise an embed request to specify which card to load and a hash-based message authentication code (HMAC). In particular embodiments, the embed request schema (for issuing) may comprise one or more of a token, a publicly available URI, an account token, or an expiration time/date. The token may be a globally unique identifier for the card to be displayed. With the publicly available URI, the white-labeled card element can be styled with the enterprise client's branding, The account token may be included if one or more end-users (e.g., account holder 105) have been enrolled. The expiration may be an ISO 8601 timestamp for when the request should expire. In particular embodiments, the endpoint may return an HTML document. The account processor 120 may be responsible for providing CSS styles for the elements in the embed request. The account processor 120 may provide its own CSS URL in the request to style a card.

In particular embodiments, the account processor 120 may enable its cardholders (e.g., account holders 105) to directly add payment cards to their devices' 105b digital wallets with one touch. This may require some additional setup and configuration. As an example and not by way of limitation, the account processor 120 may specify one or more of a unique token for the card being added to the device's 105b digital wallet, the type of digital wallet, an account token (for multi-account users) identifying the account associated with the card, and optionally provided by the device's 105b wallet, a nonce, a nonce signature, and/or a certificate. The receiver processor 140 may return a provisioning payload, which may be a cryptographic payload representing a payment card 105a that can be passed to a device's 105b digital wallet. In particular embodiments, each digital wallet may utilize a different API 140a.

In particular embodiments, the account processor 120 may make funds available to its cards 105a via the API 140a. As an example and not by way of limitation, the funding account schema may comprise an account name identifying the funding source, an ISO 8601 string representing the time when the funding source was added, the last 4 digits of a funding account (e.g., bank account and debit card) associated with the funding source, a nickname given to the funding account (or null if it has no nickname), a state of the funding account (e.g., "enabled" (indicating the funding account is available to use for card creation and transactions), "pending" (indicating the funding account is still being verified)), a token (globally unique identifier) for the funding account, and/or the type of funding source (e.g., checking account, savings account, credit card account, cryptocurrency account). In particular embodiments, the account processor 120 may add a bank account as a funding source using routing and account numbers via the API 140a. As an example and not by way of limitation, the account processor 120 may specify in the request for adding a bank account one or more of the routing number of the bank account, the account number of the bank account, the account name, or the account token (for multi-account users) identifying the account that the bank account may be associated with. The receiver processor 140 may return a funding-account object comprising the bank information. In particular embodiments, funding accounts may be initially set to the pending state until a micro-deposit validation is completed, while in other embodiments, funding accounts may be set to the enabled state automatically (e.g., trusted funding sources; testing environments).

In particular embodiments, the account processor 120 may validate a bank account as a funding source by providing received micro-deposit amounts. As an example and not by way of limitation, the account processor 120 may specify in the validation request one or more of the token of the bank account to validate, an array of monetary amounts received in two credit transactions, or the account token (for multi-account users) identifying the account that the bank is associated with. In particular embodiments, the account processor 120 may update a bank account funding source using the given parameter (e.g., the token of the bank account) via the API 140*a*. As an example and not by way of limitation, the account processor 120 may specify in the updating request one or more of the token of the bank account to edit, the desired state of the bank account (e.g., enabled and deleted), or the account token (for multi-account users) identifying the account that the bank is associated with. If a bank account is set to be deleted, all cards linked to this account may no longer be associated with it. If there are no other funding accounts set to an enabled state on the account, authorizations may not be accepted on any cards linked to the account until a new funding account is added. In particular embodiments, the account processor 120 may list and display all the funding accounts via the API 140*a*.

In particular embodiments, the account processor 120 may create a virtual or physical card via the API 140*a*. As an example and not by way of limitation, the account processor 120 may specify one or more of memo which is a nickname to identify the card, a card type (e.g., single use, merchant locked, digital wallet, unlocked, and physical), a token for the desired funding account to use when making transactions with the card, a spending limit, a spending limit duration (e.g., transaction, monthly, annually, forever), a card state (e.g., open, paused), a card program token which may identify the card program under which to create the card (different card programs may have their own configurations, e.g., digital wallet card art, BIN type), an expiration month and year (either may be generated if not provided), an account token (e.g., for multi-account users), an account token identifying the account the card may be associated with, a PIN, a product identifier which may specify a manufacturing and design configuration (e.g., physical card art) for the card, or a shipping address.

In particular embodiments, the account processor 120 may update specified properties of the card via the API 140*a*. Unsupplied properties may remain unchanged. As an example and not by way of limitation, the account processor 120 may specify updates for one or more of a unique card token, a card state (e.g., open, paused, and closed), a token for a desired funding account, memo which is a friendly name to identify the card, a spending limit, a spending limit duration (e.g., transaction, monthly, annually, forever), an account token (for multi-account users) identifying the account which owns the card, or a PIN.

In particular embodiments, the account processor 120 may list cards via the API 140*a*. As an example and not by way of limitation, the account processor 120 may specify one or more of page for pagination, page size, begin date (cards created after the specified date may be included), end date (cards created before the specified date may be included), card token for returning a specific card, or account token (for multi-account users) for returning cards associated with this account. Physical cards may be provisioned for ATM/PIN debit access which may require a cardholder PIN. In particular embodiments, the account processor 120 may set and update the cardholder PIN via the API 140*a*. The API 140*a* may additionally enable setting a cryptographic nonce to create additional entropy and prevent replay attacks, which may be unique per request. In particular embodiments, the account processor 120 may reissue cards, i.e., initiating print and shipment of a duplicate card via the API 140*a*. As an example and not by way of limitation, the account processor 120 may specify one or more of card token which is the unique token of the card to update, shipping address, or product identifier which specifies the configuration (e.g., physical card art) that the card should be manufactured with.

In particular embodiments, the account processor 120 may learn more about transactions via the API 140*a*. As an example and not by way of limitation, a transaction schema may comprise one or more of the authorization amount of the transaction with a positive amount representing a debit and a negative amount representing a credit, which may change over time, the card schema, date and time when the transaction first occurred, a list of all events that have modified this transaction, a list of objects that describe how this transaction was funded, where a reference to the funding account for the card that made this transaction may appear here and the token may match the token for the funding account in the card field (if any promotional credit was used in paying for this transaction, its type may be promotion), the merchant schema, the transaction result with approved or decline reason, the amount of the transaction that has been settled, which may change over time, status (e.g., pending, voided, settling, settled, bounced, declined), or the token which is a globally unique identifier. Table 5 (below) enumerates example transaction status. Table 6 (below) enumerates example transaction results. In particular embodiments, a single card transaction may include multiple events that affect the transaction state and lifecycle. An event schema may comprise one or more of the amount of the transaction event, date and time this event entered the system, the result of approved or decline reason, the token which is a globally unique identifier, or the type (e.g., authorization, authorization advice, clearing, void, return). The amount of the transaction event may be always a positive value, unlike the transaction amount in the transaction schema. Whether the amount is a debit or credit may depend on the event type: authorization, authorization advice, and clearing may be debits whereas void and return may be credits. In particular embodiments, the merchant schema may comprise one or more of an identifier for the payment card acceptor, a city of the card acceptor, a country of the card acceptor, a short description of the card acceptor, a merchant category code, or a geographic state of the card acceptor. In particular embodiments, the account processor 120 may list the transactions via the API 140*a*. As an example and not by way of limitation, the account processor 120 may specify in the request one or more of approval status, page for pagination, page size for pagination, begin date (transactions created after the specified date may be included), end date (transactions created before the specified date may be included), card token which may filter transactions associated with a specific card, transaction token which may return a specific transaction, or account token (for multi-account users) which may return transactions associated with this account.

TABLE 5

Example transaction status.

| | |
|---|---|
| PENDING | Authorization is pending completion from the merchant |
| VOIDED | The merchant has voided the previously pending authorization |
| SETTLING | The merchant has completed the transaction and the funding source is being debited |
| SETTLED | The transaction is complete |
| BOUNCED | There was an error settling the transaction against the funding source. Your API account may be disabled |
| DECLINED | The transaction was declined |

TABLE 6

Example transaction results.

| | |
|---|---|
| APPROVED | |
| CARD_PAUSED | Card state was paused at the time of authorization. |
| CARD_CLOSED | Card state was closed at the time of authorization. |
| GLOBAL_TRANSACTION_LIMIT | Platform spending limit exceeded. |
| GLOBAL_WEEKLY_LIMIT | Platform spending limit exceeded. |
| GLOBAL_MONTHLY_LIMIT | Platform spending limit exceeded. |
| USER_TRANSACTION_LIMIT | User-set spending limit exceeded. |
| UNAUTHORIZED_MERCHANT | Merchant locked a card attempted at different merchants. |
| SINGLE_USE_RECHARGED | Single-use card attempted multiple times. |
| BANK_CONNECTION_ERROR | Please reconnect a funding source. |
| INSUFFICIENT_FUNDS | Please ensure the funding source is connected and up to date. |
| INSUFFICIENT_FUNDS_PRELOAD | Result given when client responds to authorization request with insufficient funds. |
| MERCHANT_BLACKLIST | This merchant is disallowed on the platform. |
| INVALID_CARD_DETAILS | Incorrect CVV or expiry date. |
| BANK_NOT_VERIFIED | Please confirm the funding source. |
| INACTIVE_ACCOUNT | |
| ACCOUNT_STATE_TRANSACTION_FAIL | |
| UNKNOWN_HOST_TIMEOUT | Network error, re-attempt the transaction. |
| SWITCH_INOPERATIVE_ADVICE | Network error, re-attempt the transaction. |
| FRAUD_ADVICE | Transaction declined due to risk. |
| INCORRECT_PIN | PIN verification failed. |

In particular embodiments, the account processor 120 may receive notifications about API events, sent as they occur. The transaction messages from the issuers processor 140 may be the main vehicle through which live transaction handling is performed. Each message may comprise a full transaction object. Transaction messages may generally be separated along two dimensions: financial versus non-financial messages, and requests versus advice. Financial messages may prompt movement of funds between accounts (e.g., a clearing message that prompts an ACH debit from the user's connected account), while non-financial messages may not prompt movement of funds (e.g., an authorization request that induces a hold on funds but doesn't trigger a payment to the merchant until the transaction is settled). Authorization holds may be temporary, as transactions that are subsequently declined may have the associated funds returned to the end-user for future use. On the other axis, requests may be messages that require a response (i.e., approval or decline) to the receiver processor 140, while advice messages may not require a response other than a notification that the advice was received. In particular embodiments, the receiver processor 140 may provide one or more services that provide access to different types of messages. As an example and not by way of limitation, one service may provide the ability to receive advice. As another example, another service may provide the ability to receive and respond to requests.

In particular embodiments, the receiver processor 140 may include a web-based software application, accessible under a software-as-a-service (SaaS) model, such that the receiver processor 140 and related software applications are executed by the receiver processor server 140*b* and little to no software processes are required by the payer's personal computing device or the account processor 120. As an example and not by way of limitation, the account processor 120 may execute a web browser application that executes software routines to access webpages, but execute few software routines for the receiver processor 140. In this example, the web browser may comprise a plugin that may execute software routines that communicate data with the receiver processor 140, and the majority of the routines associated with the receiver processor 140 may be executed by the issuer process server 140*b*. It should be appreciated that the division of functions between the account processor 120 and the issuer processor server 140*b* may vary across embodiments, and may be tailored for the power of the account processor 120 and/or the available bandwidth (e.g., if only a relatively low-bandwidth communication network 110 is available, the processing may be allocated to reduce the amount of information passed between the account processor 120 and the receiver processor server 140*b*).

In particular embodiments, the software routines of the receiver processor 140 may register account holder/client data that is stored into account profiles 140*c*, monitor transactions, and execute a number of routines to secure a transaction when a new transaction initiation is detected by the receiver processor 140. The receiver processor server 140*b* may include one or more computing devices having processors configured to execute the one or more software components or modules that provide the account holder 105 or account processor 120 the various features of the receiver processor 140 described herein. An issuer processor server 140*b* may comprise network interface circuitry, such as a network interface card (NIC) or similar component, allowing the issuer processor server 140*b* to communicate with various devices in the payment system 100, over a communication network 110 or a payment network 135. The receiver processor server 140*b* may be configured to continuously communicate and monitor the activity of the account holder 105 or account processor 120, and may determine or detect that the account holder 105 is engaged in or engages into a transaction with a commerce entity 115. In particular embodiments, the account holder's 105 personal computing device or the account processor 120 may have an issuer component, such as a web browser plugin, installed locally, where the browser plugin (or other component) may detect the instance of online transaction and can then establish one or more secure authenticating processes with the issuer processor server 140*b*. That is, in such embodiments, when the account holder's 105 personal computing device or the account processor 120 navigates to a webpage comprising a web transaction form, the issuer component or browser plugin may detect that the browser is at webpage with a transaction form and consequently transmit an indication signal to the receiver processor server 140*b* indicating that the account holder's 105 personal computing device or the account processor 120 has landed at the online transaction form. In this example, the receiver processor server 140*b* may then be triggered to execute secure authenticating processes.

In particular embodiments, the receiver processor 140 may comprise account profiles 140*c*, which may be hosted on one or more computing devices comprising non-transitory machine-readable storage media configured to store profile data. In operation, the receiver processor server 140*b* may be communicatively coupled to a database comprising the account profiles 140*c* via a network, where the network may include a private network that is internal to the receiver processor 140. The receiver processor server 140*b* may register new account holders 105 or enterprise clients, generate new card accounts, and perform authorization checks for transactions received from the payment network 135.

During registration, the receiver processor server 140*b* may receive data inputs from the account holder 105 or account processor 120, including funding account identifiers. A funding account may be the source of funds associated with a particular account, such as a bank account, payment card account (credit, debit, stored value, etc.), and/or cryptocurrency account. Although embodiments described herein describe funding accounts as being a checking account, debit card, or credit card, it should be appreciated that the disclosed embodiments can be configured to be funding account source payment system-agnostic. Non-limiting examples of a funding account may include a bank account (e.g., checking, savings), a payment card account (e.g., credit, debit, stored value card, gift card), non-payment card credit (e.g., fixed term loan, alternative lending, etc.) and cryptocurrency (e.g., Bitcoin). Nothing described herein should be construed as limiting upon the nature of the receiver processor 140 employed as the funding account for an account or a card.

The receiver processor server 140*b* may then establish encrypted connections with those funding accounts, which may be at any of a variety of entities, including banks and/or other financial institutions. When instructed to generate a new account, the receiver processor server 140*b* may request that a receiver institution 145 and/or server 145*a* (or other funding source or server) link the new account to that funding account. The receiver processor server 140*b* may also access this funding account for billing purposes. In some instances, the receiver processor 140 may function as a receiver institution 145, or vice versa, and thus may be understood as the same entity/actor and/or be contractually related.

In particular embodiments, the issuer-component may generate a public-private key (or parameter) pair associated with the account holder's 105 account or the enterprise client's account. The private key/parameter may be stored with the issuer-component on the account holder's 105 personal computing device or the account processor 120, and the public key/parameter may be transmitted to the receiver processor server 140*b* (and stored in an associated account profile 140*c*). The private key may then be used to sign data transmitted with requests to generate new cards/accounts. The public key may be stored into the account holder's/client's profile and may be used by the receiver processor server 140*b* to determine the authenticity of the request for a new card/account.

During a process for generating a new card/account, after the receiver processor server 140*b* is instructed to generate a new card/account, the receiver processor server 140*b* may determine the authenticity of the request based on any number of factors about the account holder/client, account holder's personal computing device, account processor 120, and other factors, which may include thousands of data points. The receiver processor server 140*b* may store data/one or more records indicating the commerce entity 115 involved/associated with an ongoing transaction (referred to herein as a "tag" or "merchant tag"), for which the account holder 105 or account processor 120 has requested a new card/account. The receiver processor server 140*b* may store this tag into a record for the new card/account into the account holder's/client's profile, along with the other relevant information associated with the new card/account (e.g., card number, CVV, payment network 135).

During a transaction authorization process, the receiver processor server 140*b* may receive or intercept an authorization query issued from the payment network 135 to a receiver institution 145. In some cases, the issuer-component may alert the receiver processor server 140*b* to the transaction and the receiver processor server 140*b* may receive the transaction data before an authorization request is sent from the commerce entity 115 to the payment network 135. The receiver processor server 140*b* may ultimately determine whether to authorize the transaction, as the receiver processor server 140*b* informs the receiver institution 145 or the payment network 135 whether the card is acceptable for the particular transaction. The receiver processor server 140*b* may query the account profiles 140*c* to determine whether the data about the card and the account holder/client matches what is stored for the card in the account profiles 140*c*. In some cases, the receiver processor server 140*b* may determine whether the commerce entity 115 identified in the transaction data matches to a commerce entity 115 associated with the particular card/account being analyzed, as indicated by the commerce-entity tag stored in a record of the card/account in the account profiles 140*c* (in some embodiments stored in and/or associated with an account holder/client profile or record).

In particular embodiments, the receiver processor 140 may optionally comprise authentication logic 140*d*. The authentication logic 140d may be provided by the account processor 120. The authentication logic 140d may provide the enterprise client with the ability to make custom transaction approval decisions even if the account processor 120 does not comprise a server.

In particular embodiments, the payment network 135 may be referred to as a "card scheme" or just as a "network." The payment network 135 may provide the rails for transactions to occur. The payment network 135 may sit in between acquirers and issuers and pass messages back and forth to make the transaction happen. The payment network 135 may also set the communication rules and standards that the acquirers and issuers need to adhere to. In particular embodiments, the payment network 135 may receive payment authorization requests from commerce-entity servers 115a, during or after transactions. New cards/accounts, like any other credit or debit cards, may be issued through the payment network 135. When a commerce-entity server 115a queries the payment network 135 on whether a card should be authorized for a transaction, the payment network 135 may review the card digits (e.g., Payment Account Number (PAN), Bank Identification Number (BIN), or Issuer Identification Number (IIN), etc.) to identify the receiver institution 145. The payment network 135 may then query the receiver institution server 145a whether to authorize the card. In particular embodiments, several numbers of the account/card number associated with a transaction may be configured to identify the receiver institution 145 as the appropriate party to authorize the transaction. As such, the payment network 135 may use these numbers to route the payment authorization request and transaction data to the receiver institution 145. In some implementations, the receiver institution server 145a may forward the authorization query to the receiver processor 140, which may then perform the requisite determinations, including whether the transaction data identifies the correct commerce entity 115 that matches the card's commerce-entity tag. The payment network 135 may then return an approval or rejection to the commerce-entity server 115a based upon how the receiver institution server 145a and receiver processor server 140b respond.

Figure 2:
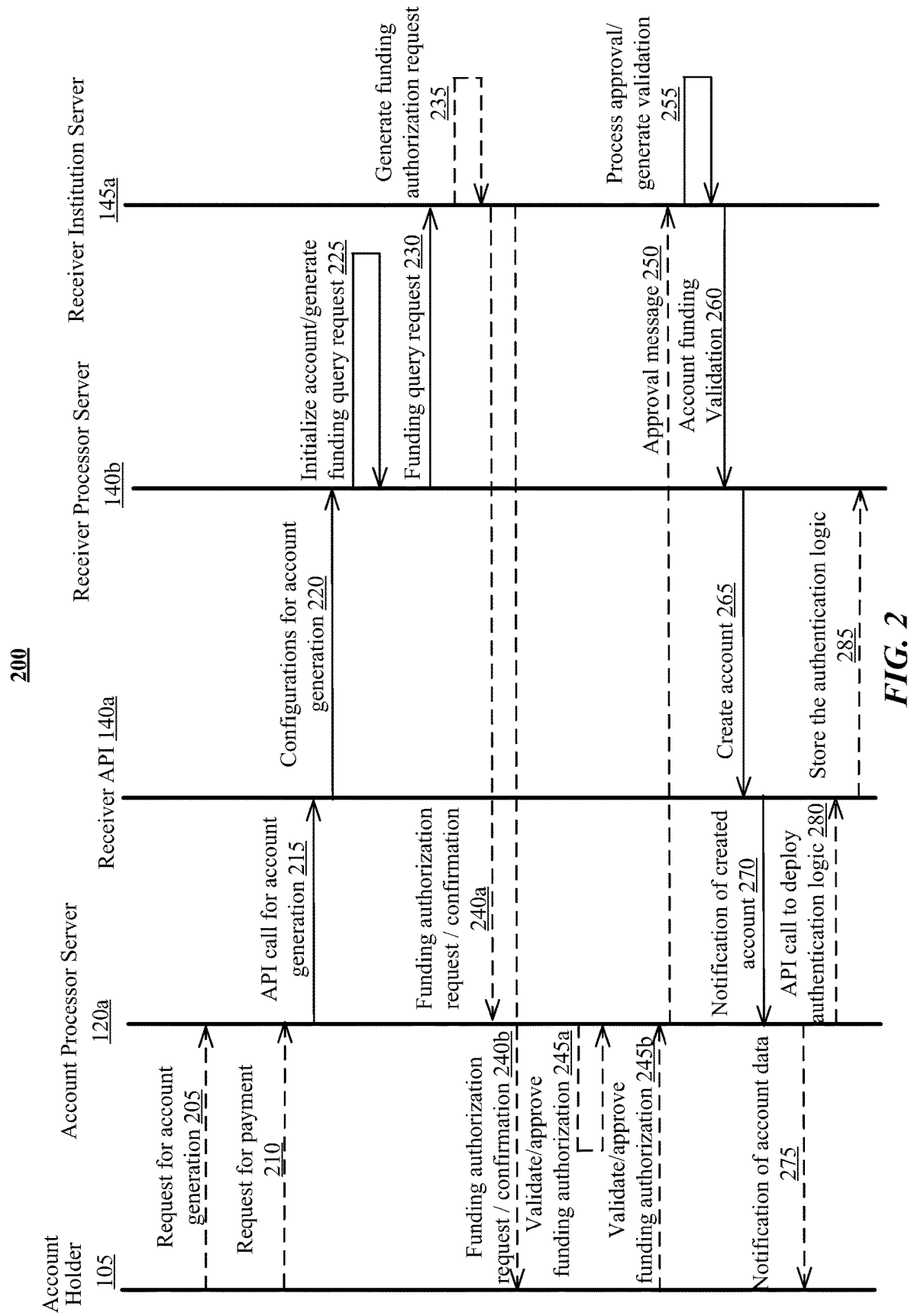
FIG. 2 illustrates an example sequence diagram for account initiation and validation.

FIG. 2 illustrates an example flow diagram 200 for account initiation and validation. The account initiation may be optionally started by the account holder 105. In particular embodiments, the account holder 105 may send a request for account generation 205 to the account processor server 120a. In alternative embodiments, the account holder 105 may send a request for payment 210 to the account processor server 120a. In particular embodiments, the account holder 105 sending a request for payment 210 comprises a request for account generation 205. As an example and not by way of limitation, the request for payment 210 may be based on the account holder's 105 attempt to make a purchase online. In particular embodiments, the account processor server 120a may make an API call for account generation 215. The API call may be responsive to the request for account creation 205 or request for payment 210. In alternative embodiments, the account processor server 120a may make the API call without any payer input. As an example and not by way of limitation, the enterprise client associated with the account processor server 120a may need to create individual accounts for its employees or contractors for its own business. The API call for account generation 215 may be based on the receiver processor API 140a. Through the receiver processor API 140a, the receiver processor server 140b may get the configurations for account generation 220. As an example and not by way of limitation, the configurations may comprise various account creation data, including email, password, access code (if applicable), name, address, birthday, and/or the like. The configurations may also comprise general information about the enterprise client or the account holder 105 (including preferences, interests, demographics, etc.) and/or know-your-customer (KYC) and/or other regulatory data. The configurations may further comprise one or more funding sources, such as the enterprise client's root account associated with the receiver institutions 145 (e.g., credit card accounts, checking accounts, savings accounts, or other financial accounts), that the enterprise client wishes to use as a funding source to generate the individual accounts. Although embodiments described herein describe funding accounts as being a checking account, savings account, debit card account, or credit card account, it should be appreciated that some embodiments can be configured to be agnostic to the funding source and/or payment system. Non-limiting examples of funding accounts/sources include a bank account (e.g., checking, savings), a payment card account (e.g., credit, debit, stored value card, gift card), and cryptocurrency (e.g., Bitcoin).

In particular embodiments, the receiver processor server 140b may use the configurations 220 to initialize an account/ generate funding query request 225. During account initialization, the receiver processor server 140b may perform geographic analysis, temporal/geographic analysis, and behavioral pattern analysis. The analysis may be based on data collected by the aggregated transaction data. In some implementations, the receiver processor server 140b may obtain an identifier (ID, account identifier, etc.) for a payer/ client requesting an account. The receiver processor server 140b may query a database, such as a receiver database and/or payment network database, for specific data collected by aggregated account transaction data records of the payer/ client. The receiver processor server 140b may also query the databases for all possible field values that can be taken by each of the field values (e.g., time, AM/PM, postal code, merchant name, merchant identifier, transaction amount, cost, etc.). Using the field values of all the fields, the receiver processor server 140b may generate field value pairs for use in a correlation analysis on the field value pairs. An example field value pair is: "time" is "AM (Pacific)", and "merchant" is "Best Coffee Shop." The receiver processor server 140b may then generate/determine probability estimates for each field value pair occurring, for example, in the aggregated transaction data records. As an example and not by way of limitation, the receiver processor server 140b may select a field value pair and determine the number of records within the aggregated transaction data records where the field value pair occurs. The receiver processor server 140b may then calculate a probability quotient for the field value pair, for example, by dividing the number determined for the occurrences of the field value pair by the total number of aggregate transaction data records. The receiver processor server 140b may also assign a confidence level for the probability quotient based on the sample size (e.g., total number of records in the aggregated transaction data records). The receiver processor server 140b may generate and store a record, such as described above, including the field value pair, the probability quotient, and the confidence level associated with the probability quotient. The receiver processor server 140b may perform such a computation for each field value pair generated. The field value pairs and associated records may be used by the receiver processor server 140b when determining if a request is valid, and/or when determining whether to require additional validating information from the account holder/client (such as described above when the account holder 105 is outside of specified geographic area), and the account holder/client may be prompted to re-authenticate.

In particular embodiments, the receiver processor server 140b may also analyze the commerce entity's location or the location from which the account generation is being requested to determine if the commerce entity 115 is valid. Such analysis may be based on commerce entity's information collected by the account processor server 120a, history of the commerce entity 115, owner of the commerce entity 115, location of the commerce entity 115, location of the owner of the commerce entity 115, whether the commerce entity 115 is on a fraud list (or the probability the commerce entity 115 is related to a commerce entity 115 on a fraud list), etc. If the receiver processor server 140b determines that the commerce entity 115 exceeds a specified risk threshold (e.g., either because of collected information or lack of available information), or otherwise determines the commerce entity 115 is not valid, the receiver processor server 140b may transmit a notification to the account processor server 120a and/or the account holder 105 that the commerce entity 115 is not valid (or has the potential to be invalid). In some embodiments, a determination about the validity of a commerce entity 115 may prevent the payer/client from receiving an account for the commerce entity 115, while in other embodiments, the receiver processor server 140b may allow the account holder/client, once notified about the risk, to proceed with the transaction and accept the risk. In particular embodiments, the receiver processor server 140b may determine if the account holder/client already has an existing account that is tagged to the commerce entity 115, and if so, may retrieve the information for the existing tagged account, provide the account information to the account holder 105 or account processor server 120a, and update the corresponding record.

In particular embodiments, the goal of funding query request 225 may be to make sure an individual account can be funded and/or confirm that the stated information (e.g., identity, location, funding information, and/or the like) is accurate/truthful. In some embodiments, a funding source may be required for creating an account, while in other embodiments, a specified funding source may be not initially required for creating an account, though in such embodiments, a validated funding source may be required prior to providing account for use in a transaction.

In particular embodiments, the receiver processor server 140b may send the funding query request 230 to the receiver institution server 145a (e.g., a bank server associated with a funding checking account indicated by the client-provided information). Optionally, the receiver institution server 145a may generate a funding authorization request 235. The receiver institution server 145a may then either send the funding authorization request/confirmation 240a to the account processor server 120a or send the funding authorization request/confirmation 240b to the account holder 105 for validation/approval. In one embodiment, the account processor server 120a may validate/approve the funding authorization 245a. In another embodiment, the account holder 105 may validate/approve the funding authorization 245b, which may be returned to the account processor server 120a. As an example and not by way of limitation, the receiver institution server 145a may generate a message to the account holder 105, such as a text message, mobile application message, email, and/or the like, to which the account holder 105 may reply and/or confirm that the requested funding information is approved/acceptable. The account processor server 120a may then send the approval message 250 to the receiver institution server 145a. As another example and not by way of limitation, the receiver institution server 145a may approve or conduct a microtransaction (e.g., a transaction for a small amount such as $0.13, $1.07, etc.) that shows up on the account holder's 105 or enterprise client's funding account and the account holder 105 or account processor server 120a may provide that specified amount and/or a code associated with the micro-transaction in response to show that the account holder 105 or account processor server 120a has access to the account, in order to validate the funding account. In particular embodiments, upon receiving the approval message 250, the receiver institution server 145a may validate the funding query request, i.e., process approval/generate validation 255. In particular embodiments, the receiver institution server 145a may perform process approval/generate validation 255 without sending an authorization request to the account holder 105 or account processor server 120a.

In particular embodiments, the receiver institution server 145a may provide an account funding validation 260 to the receiver processor server 140b. Once the receiver processor server 140b has received the funding account validation 260, it may create an individual account (including updating/creating a corresponding record in a database of the receiver processor 140). In particular embodiments, the individual account may be tagged to one or more specific commerce entities 115. The individual account may be generated as a bank account by the bank, issuer, or other type of financial institution whose servers are configured to receive instructions from the issuer processor server 140b. In particular embodiments, the receiver processor server 140b may store the new account information into the account profiles 140c. The receiver processor server 140b may also generate data indicating that the particular account is limited to use for the particular commerce entity 115. This data (referred to herein as a "tag") may be stored into and/or associated with the record of the new account or account profile 140c, and may be referenced by the receiver processor server 140b in the future to determine whether to authorize transactions attempting to submit the new account's number to a commerce entity 115 as a method of payment. Depending on the implementation, the record, account profile 140c, account(s), tag(s), etc. may be stored in a single record or in multiple, linked/associated records on one or more servers and/or databases.

In particular embodiments, the account creation 265 may be sent to the receiver processor API 140a, which may then transmit a notification of created account 270 to the account processor server 120a, indicating the requested account has been created for them. The account processor server 120a may download, access, and/or otherwise receive/retrieve related software program(s)/module(s), that, when activated/instantiated/run, can monitor the account holder's 105 actions/behaviors/interaction, such as browsing, transactions initiated by the account holder's 105 personal computing device (and associated programs), and interact with the receiver processor 140. In particular embodiments, the account processor server 120a may optionally send a notification of account data 275 to the account holder 105. As an example and not by way of limitation, the account data may comprise account number, routing number, merchant tag, etc.

In particular embodiments, the account processor server 120a may optionally make another API call to deploy its own authentication logic 280. Upon receiving the API call, the receiver processor server 140b may store the authentication logic 285. The authentication logic may provide the account processor 120 the ability to make custom transaction approval decisions without implementing it on its account processor server 120*a* or even if the account processor 120 does not have a server. Instead, the receiver processor 140 may implement and run the authentication logic on its server 140*b*.

Figure 3:
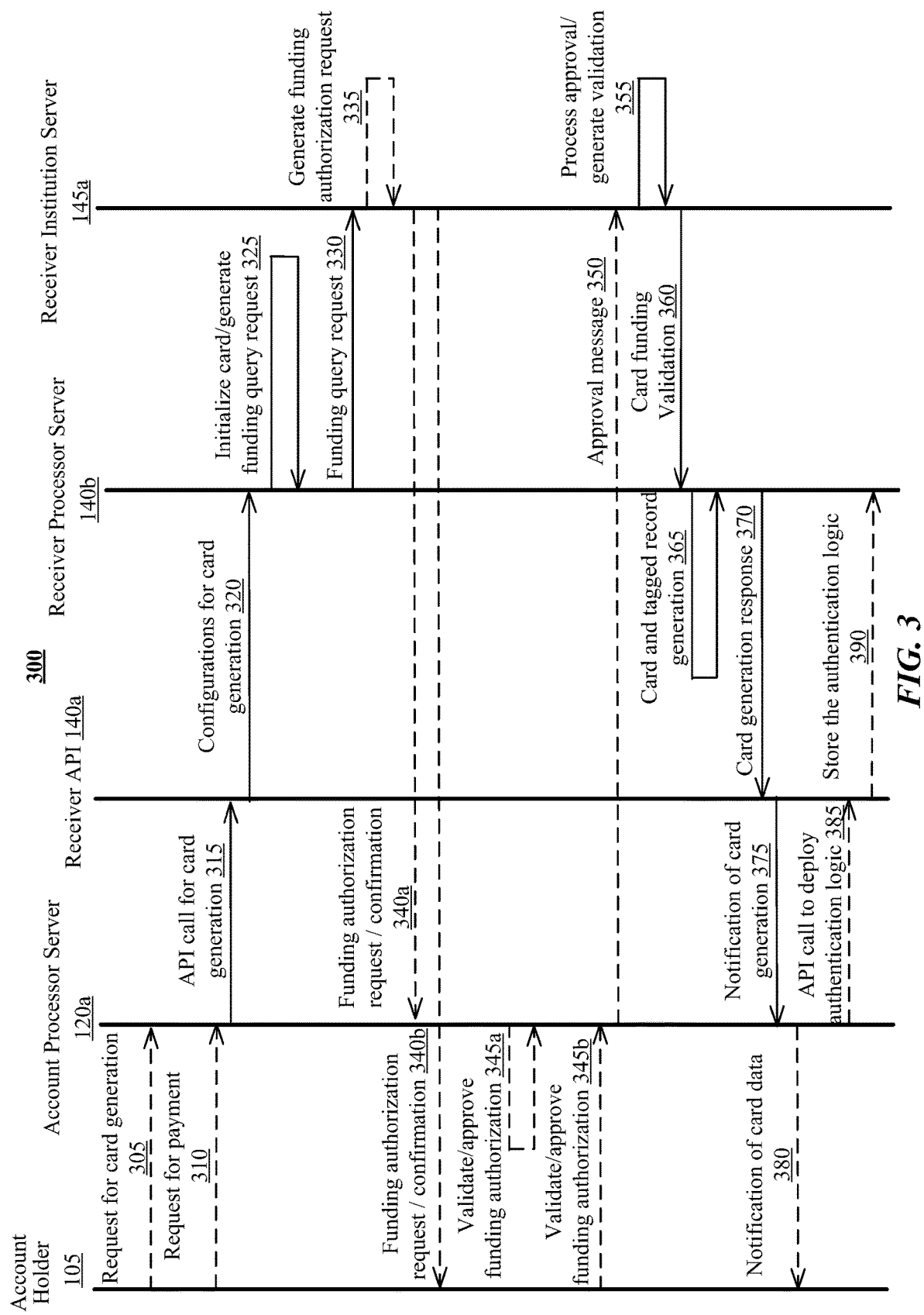
FIG. 3 illustrates an example sequence diagram for card initiation and validation.

FIG. 3 illustrates an example flow diagram 300 for card initiation and validation. The card initiation may optionally be started by the account holder 105. In particular embodiments, the account holder 105 may send a request for card generation 305 to the account processor server 120*a*. In alternative embodiments, the account holder 105 may send a request for payment 310 to the account processor server 120*a*. As an example and not by way of limitation, the request for payment 310 may be based on the account holder's 105 attempt to make a purchase online. In particular embodiments, the account processor server 120*a* may make an API call for card generation 315. The API call may be responsive to the request for card creation 305 or request for payment 310. However, the account processor server 120*a* may make the API call without any payer input. As an example and not by way of limitation, the enterprise client associated with the account processor server 120*a* may need to create individual cards for its employees or contractors for its own business. The API call for card generation 315 may be based on the receiver processor API 140*a*. Through the receiver processor API 140*a*, the receiver processor server 140*b* may get the configurations for card generation 320. As an example and not by way of limitation, the configurations may comprise various card creation data, including email, password, access code (if applicable), name, address, birthday, and/or the like. The configurations may also comprise general information about the enterprise client or the account holder 105 (including preferences, interests, demographics, etc.) and/or know-your-customer (KYC) and/or other regulatory data. The configurations may further comprise one or more funding sources, such as the enterprise client's root account associated with the receiver institutions 145 (e.g., credit card accounts, checking accounts, savings accounts, or other financial accounts) the enterprise client wishes to use as a funding source to generate the individual cards. Although embodiments described herein describe funding accounts as being a checking account, savings account, debit card account, or credit card account, it should be appreciated that some embodiments can be configured to be funding account source agnostic/payment system agnostic. Non-limiting examples of funding accounts/sources include a bank account (e.g., checking, savings), a payment card account (e.g., credit, debit, stored value card, gift card), and cryptocurrency (e.g., Bitcoin).

In particular embodiments, the receiver processor server 140*b* may use the configurations to initialize card/generate funding query request 325. During card initialization, the receiver processor server 140*b* may perform geographic analysis, temporal/geographic analysis, and behavioral pattern analysis. The analysis may be based on data collected by the aggregated transaction data. In some implementations, the receiver processor server 140*b* may obtain an identifier (ID, account identifier, etc.) for an account holder/client requesting a card. The receiver processor server 140*b* may query a database, such as a receiver database and/or payment network database, for specific data collected by aggregated card transaction data records of the account holder/client. The receiver processor server 140*b* may also query the databases for all possible field values that can be taken by each of the field values (e.g., time, AM/PM, postal code, merchant name, merchant identifier, transaction amount, cost, etc.). Using the field values of all the fields, the receiver processor server 140*b* may generate field value pairs for use in a correlation analysis on the field value pairs. An example field value pair is: "time" is "AM (Pacific)" and "merchant" is "Best Coffee Shop" The receiver processor server 140*b* may then generate/determine probability estimates for each field value pair occurring, As an example and not by way of limitation, occurring in the aggregated transaction data records. As another example and not by way of limitation, the receiver processor server 140*b* may select a field value pair and determine the number of records within the aggregated transaction data records where the field value pair occurs. The receiver processor server 140*b* may then calculate a probability quotient for the field value pair, for example, by dividing the number determined for the occurrences of the field value pair by the total number of aggregate transaction data records. The receiver processor server 140*b* may also assign a confidence level for the probability quotient based on the sample size (e.g., total number of records in the aggregated transaction data records). The receiver processor server 140*b* may generate and store a record, such as described above, including the field value pair, the probability quotient, and the confidence level associated with the probability quotient. The receiver processor server 140*b* may perform such a computation for each field value pair generated. The field value pairs and associated records may be used by the receiver processor server 140*b* when determining if a request is valid, and/or when determining whether to require additional validating information from the account holder/client (such as described above when the payer is outside of specified geographic area), and the account holder 105 may be prompted to re-authenticate.

In particular embodiments, the receiver processor server 140*b* may also analyze the commerce entity's location for or from which the card is being requested to determine if the commerce entity 115 is valid. Such analysis may be based on commerce entity's information collected by the account processor server 120*a*, history of the commerce entity 115, owner of the commerce entity 115, location of the commerce entity 115, location of the owner of the commerce entity 115, whether the commerce entity 115 is on a fraud list (or the probability the commerce entity 115 is related to a commerce entity 115 on a fraud list), etc. If the receiver processor server 140*b* determines that the commerce entity 115 exceeds a specified risk threshold (e.g., either because of collected information or lack of available information), or otherwise determines the commerce entity 115 is not valid, the receiver processor server 140*b* may transmit a notification to the account processor server 120*a* and/or the account holder 105 that the commerce entity 115 is not valid (or has the potential to be invalid). In some embodiments, a determination about the validity of a commerce entity 115 may prevent the account holder/client from receiving a card for the commerce entity 115, while in other embodiments, the receiver processor server 140*b* may allow the account holder/client, once notified about the risk, to proceed with the transaction and accept the risk.

In particular embodiments, the receiver processor server 140*b* may determine if the account holder/client already has an existing card that is tagged to the commerce entity 115 (typically a multi-use card, as single-use cards may be limited to a single transaction), and if so, may retrieve the information for the existing tagged card, provide the card information to the account processor server 120*a* or account holder 105, and update the corresponding record. If the receiver processor server 140*b* determines that the commerce entity 115 is not already associated with an existing card for the account holder/client, the receiver processor server 140b may determine (in some embodiments, based on account holder/client specified information and/or parameters) if a new card for the commerce entity 115 is to be a single-use card or a multi-use card (e.g., for recurring payments, such as a monthly subscription). If single use, the receiver processor server 140b may generate a merchant-tagged single-use card and corresponding record (as detailed above) and provide/transmit the single-use card information to the account holder/client (and in turn the information may be provided to the account holder 105 and commerce entity 115 corresponding to the tag). If multi-use, the receiver processor server 140b may generate a merchant-tagged multi-use card and corresponding record and transmit information regarding that tagged multi-use card to the account processor server 120a or account holder 105 in recurring payments. In some embodiments, the multi-use tagged card may be configured for recurring payments to the tagged commerce entity 115 (e.g., a monthly subscription for a particular commerce entity 115), where the amount is unlikely to vary widely, if at all, and the timing of payment/charge is likely to be at a particular time each time period (e.g., the first of every month, or the first week of every month). In other embodiments, the merchant-tagged, multi-use card may be configured such that an account holder 105 can use the card at the tagged commerce entity 115 for a specified or unlimited amount of transactions, and may further be configured to limit the transaction amount per period and/or per transaction. In such embodiments, the receiver processor server 140b may still perform the analytics on the payer/client behavior, merchant information, and/or other collected data to confirm that each card request/transaction request and each payment validation is valid, and the matching may be performed for each.

In particular embodiments, the goal of funding query request 325 may be to make sure that an individual card can be funded and/or confirm that the stated information (e.g., identity, location, funding information, and/or the like) is accurate/truthful. In some embodiments, a funding source may be required for creating a card, while in other embodiments, a specified funding source may be not initially required for creating a card, though in such embodiments, a validated funding source may be required prior to providing a card for use in a transaction.

In particular embodiments, the receiver processor server 140b may send the funding query request 330 to the receiver institution server 145a (e.g., a bank server associated with a funding checking account indicated by the client-provided information). Optionally, the receiver institution server 145a may generate a funding authorization request 335. The receiver institution server 145a may then either send the funding authorization request/confirmation 340a to the account processor server 120a or send the funding authorization request/confirmation 340b to the account holder 105 for validation/approval. In one embodiment, the account processor server 120a may validate/approve the funding authorization 345a. In another embodiment, the account holder 105 may validate/approve the funding authorization 345b, which may be returned to the account processor server 120a. As an example and not by way of limitation, the receiver institution server 145a may generate a message to the account holder 105, such as a text message, mobile application message, email, and/or the like, to which the account holder 105 may reply and/or or confirm that the requested funding information is approved/acceptable. The account processor server 120 may then send the approval message 350 to the receiver institution server 145a. As another example and not by way of limitation, the receiver institution server 145a may approve or conduct a microtransaction (e.g., a transaction for a small amount such as $0.13, $1.07, etc.) that shows up on the account holder's 105 or enterprise client's funding account and the account holder 105 or account processor server 120a may provide that specified amount and/or a code associated with the microtransaction in response to show that the account holder 105 or account processor server 120a has access to the account, in order to validate the funding account. In particular embodiments, upon receiving the approval message 350, the receiver institution server 145a may validate the funding query request, i.e., process approval/generate validation 355. In particular embodiments, the receiver institution server 145a may perform process approval/generate validation 355 without sending an authorization request to the account holder 105 or account processor server 120a.

In particular embodiments, the receiver institution server 145a may provide a card funding validation 360 to the receiver processor server 140b. Once the receiver processor server 140b has received the card funding validation 360, the receiver processor server 140b may perform card and tagged record generation 365. Specifically, the receiver processor server 140b may create an individual card (including updating/creating a corresponding record in a database of the receiver processor 140). The receiver processor server 140b may also tag the individual card to one or more specific commerce entities 115. The individual card may be generated as an actual debit/credit card account or virtual card by the bank, issuer, or other type of financial institution whose servers are configured to receive instructions from the receiver processor server 140b. For a physical card, the receiver processor server 140b may access a card issuer server to request generation of the physical card. In particular embodiments, the receiver processor server 140b may store the new card information into the account profiles 140c. The receiver processor server 140b may also generate data indicating that the particular card is limited to use for the particular commerce entity 115. This data (referred to herein as a "tag") may be stored into and/or associated with the record of the new card or account profile 140c, and may be referenced by the receiver processor server 140b in the future to determine whether to authorize transactions attempting to use the new card at a commerce entity 115 as a method of payment. Depending on the implementation, the record, account profile 140c, card(s), tag(s), etc. may be stored in a single record or in multiple, linked/associated records on one or more servers and/or databases.

In particular embodiments, the receiver processor server 140b may send a card generation response 370 to the receiver processor API 140a, which may then transmit a notification of card generation 375 to the account processor server 120a, indicating the requested card has been created for them. The account processor server 120a may download, access, and/or otherwise receive/retrieve related software program(s)/module(s), that, when activated/instantiated/run, can monitor the account holder's 105 actions/behaviors/interaction, such as using the card at commerce entities 115, browsing, transactions initiated by the account holder's 105 personal computing device (and associated programs), and interact with the receiver processor 140. In particular embodiments, the account processor server 120a may optionally send a notification of card data 380 to the account holder 105. As an example and not by way of limitation, the card data may comprise card number, authorization code (CVV), expiration date, merchant tag, etc.

In particular embodiments, the account processor server 120 may optionally make another API call to deploy its own authentication logic 385. Upon receiving the API call, the receiver processor server 140*b* may store the authentication logic 390. The authentication logic may provide the account processor 120 the ability to make custom transaction approval decisions without implementing it on its account processor server 120*a* or even if the account processor 120 does not have a server. Instead, the receiver processor 140 may implement and run the authentication logic on its server 140*c*.

Figure 4:
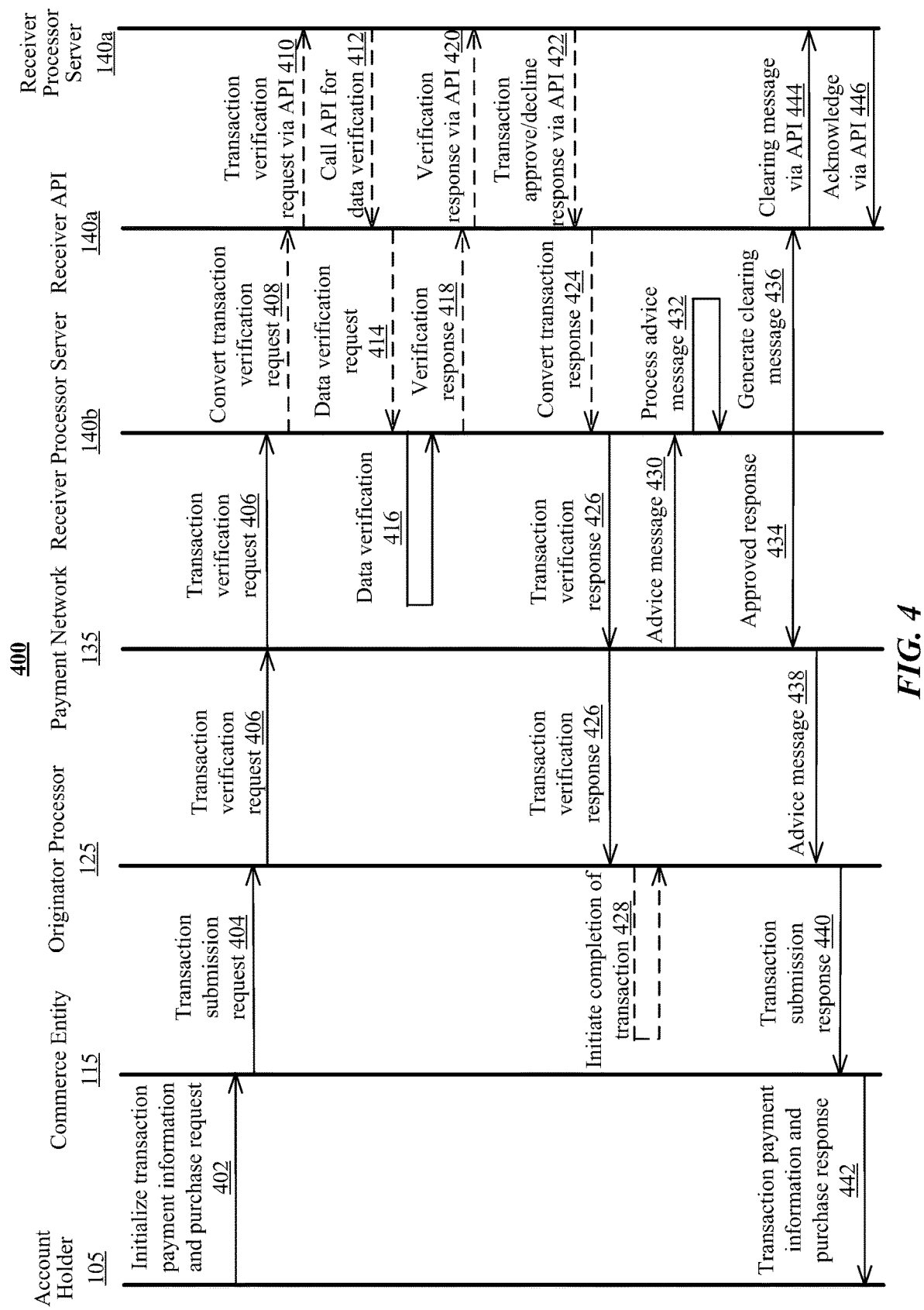
FIG. 4 illustrates an example sequence diagram for enabling a transaction by the receiver processor.

FIG. 4 illustrates an example flow diagram 400 for enabling a transaction by the receiver processor 140. In particular embodiments, the account holder 105 may initialize transaction payment information and purchase request 402 to the commerce entity 115. As an example and not by way of limitation, the account holder 105 may use a card at a payment machine 115*b* associated with the commerce entity 115. As another example, for online transaction, the account holder 105 may provide input into a personal computing device, such as mobile application input (e.g., via a user interface such as a touch screen, voice commands, gestures, eye-tracking, etc.) and web navigation input (via keyboard, mouse, other peripheral, etc.). Additional input may be monitored, tracked, and/or recorded, including direct input from the account holder 105, information/data from another program or application running on the personal computing device, information/data from sensors of the personal computing device (e.g., GPS data, BLUETOOTH data, wireless network data, camera data, video data, photo data, microphone data, accelerometer data, etc.), and/or the like.

In particular embodiments, the commerce entity 115 may collect the transaction data (including the account/card information) and purchase request (e.g., via the payment machine 115*b*). For online transactions, the commerce entity 115 may comprise any number of servers 115*a* responsible for processing incoming online transaction data, or the commerce entity 115 may transmit the data from the online transaction to the servers of a third-party payment-processing vendor. In either case, the account/card information and any other relevant data may be submitted to the appropriate verifying party, after the online transaction data comprising the payment information is received from the account holder's 105 personal computing device.

In particular embodiments, the commerce entity 115 may then transmit the transaction data (e.g., as a transaction submission request 404) to the originator processor 125 (for the appropriate originator institution 130). The originator processor 125 may in turn transmit a transaction verification request 406 including the transaction data (typically via the payment network 135) to the receiver processor server 140*b*.

In particular embodiments, the transaction data that is provided by the commerce entity 115 and goes through to the receiver processor server 140*b* may comprise one or more of card information, payment/charge amount, billing information, or card acceptor name and location. The card acceptor name and location may be defined, for example, to be 43 characters in length, divided into 4 distinct subproperties: positions 1-25 is address data, positions 26-38 is city data, positions 39-40 is state data, positions 41-43 is country data. The disclosed messages may conform to the appropriate ISO protocols, and, unlike other payment methods that require use of new data formats, communications equipment, complex security token, and/or complex user-defined rules, may not require any additional burden, bandwidth, or processing power on the part of the commerce entity 115, the originator processor 125, the receiver processor server 140*b*, and/or the payment network 135 (depending on which are implicated in the transaction). The transaction data received by the receiver processor server 140*b* may be analyzed, such as by tag matching and/or as detailed below.

As noted above, the receiver processor 140 may not require additional bandwidth, or even additional processing on the part of the commerce entity 115 or intermediary parties—the card issued by the receiver processor 140 may be handled by them in the same way as a traditional credit card without requiring the commerce entity 115 to provide additional information, making the receiver processor 140 function for commerce entities 115 relying on payment methods used more than a decade ago while also be functional with commerce entities 115 that have the latest payment methods (e.g., tokenized payment, mobile wallet, QR payment, etc.). As such, when the receiver processor server 140*b* receives card acceptor name and location, the format and content of that information may vary widely.

In particular embodiments, the receiver processor server 140*b* may optionally convert the transaction verification request 408 for the receiver processor API 140*a* and provide it to the receiver processor API 140*a*. A transaction request via the API 410 may be then sent to the account processor server 120*a*. It should be understood that, in some implementations, the originator institution 130/originator processor 125, receiver institution 145/receiver processor 140, and/or the payment network 135 may not be included and/or may represent/be associated with the same entity (e.g., if the originator institution 130 is also the receiver institution 145), and in any event the relevant information starting with the information provided by the commerce entity 115 may be ultimately provided to the receiver processor server 140*b* (e.g., in the form a transaction verification request 406). In particular embodiments, the account processor server 120*a* may verify the data by itself. In alternative embodiments, the account processor server 120*a* may call the API for data verification 412 by the receiver processor 140. The receiver processor API 140*a* may transmit the data verification request 414 to the receiver processor server 140*b*.

In particular embodiments, the receiver processor server 140*b* may perform data verification 416, which may be responsive to the transaction verification request 406 or data verification request 414. During data verification 416, the receiver processor server 140*b* may determine whether to authorize the payment by comparing fields of the transaction data against fields stored in the account profiles 140*c*. As an example and not by way of limitation, the receiver processor server 140*b* may receive the card number and then cross-reference the card number against the corresponding record in account profiles 140*c*. Using the transaction data, the receiver processor server 140*b* may determine not only whether the data associated with the card number is generally correct (e.g., card number, CVV, name, address), and may also determine whether the transaction data identifies the commerce entity 115 as the particular commerce entity 115 tagged to the particular card number. Conventional systems may determine whether the inputted data is accurate and satisfies the required data field inputs. Some conventional systems may link cards/accounts to categories of commerce entities 115 through the well-known MCC coding standards, which may limit the category for the card number. In some cases, conventional systems may limit the number of uses for the card number. Some conventional systems may be available to commerce entities 115 wanting to publish their own merchant-specific branded cards, such as gift cards, but these may be unwieldy, and may be not brand agnostic. Here, the transaction data may comprise an indicator for the particular commerce entity 115 associated with the transaction, which may then be matched to a tag stored in the record of the card. Thus, the limitations may be addressed, but there may be additional protection over known authorization techniques, because a card number stolen from Merchant A cannot be later used to pay for transactions to Merchant B, as the receiver processor server 140*b* may automatically review the transaction data before issuing a verification response to the payment network 135.

In particular embodiments, the transaction data that is received by the receiver processor server 140*b* may be unstructured, making it difficult to match the transaction message with the commerce entity 115 that originated the transaction. The address field may generally be used for the name of the commerce entity/service (though the name is sometime incomplete or missing), and the city field may be sometimes used for city, other times with the domain name, phone number, service name, etc., and state and country may sometimes be offshore for a domestic business.

In particular embodiments, when the receiver processor server 140*b* receives a transaction verification request 406, a confidence score may be calculated for whether the charge matches the metadata captured when generating the corresponding card. In some implementations, first the card acceptor name and location address and city subfields may be lexically parsed and tokenized by splitting on any non-alphanumeric characters. This may yield what can be understood or defined as a bag-of-words (BOW), and the BOW of the lexically parsed and tokenized subfields defined as a first BOW ("BOW A"). The BOW may comprise data where text is represented as the multiset of its components, in some embodiments disregarding grammar and word order while keeping multiplicity. A second BOW ("BOW B") may comprise the stored metadata from the configurations for card generation 320 collected when the card was generated/created. Depending on the implementation, a variety of processes may be applied, for example, words of two characters or less may be stripped from both bags. Similarly, commonly occurring strings such as www, inc, llc may additionally or alternatively be stripped out from both bags.

Then, BOW A and BOW B may be input to a function (e.g., Bayesian probability function, k-means clustering algorithm, etc.) that returns a percentage confidence score that BOW A is related to BOW B. If the probability is over a specified threshold T, then the receiver processor server 140*b* may communicate that the charge is accepted, else the receiver processor server 140*b* may communicate that the charge is declined. In some embodiments, threshold T may change as more transactions are processed and/or as a probability function (e.g., Bayes function) and/or cluster analysis (e.g., k-means clustering algorithm) is trained and/or updated with historical data. In some embodiments, if the threshold T was not reached, the receiver processor server 140*b* may determine if the card was created within a given time period (e.g., within the past five minutes) and if so, provided the other parameters are within tolerances (e.g., payment amount), the charge may be approved based on temporal locality as an indicator of validity (presuming the probability function returned a false negative). For online transactions, the authorization decisioning of the receiver processor server 140*b* may be enhanced by comparing entered information, such as billing information, at checkout with corresponding information, such as AVS (address verification system) information passed within the authorization message. Some information entered at time of billing may, in some embodiments, comprise coded or tagged information based on the card generation. In some embodiments, the receiver processor server 140*b* may determine if the authorization amount matches what was collected as the total on card created (in some embodiments, within specified tolerances to account for service fees and/or service/convenience charges).

In particular embodiments, the receiver processor server 140*b* may utilize stream training and matching for authorization. In some implementations, the receiver processor server 140*b* may utilize clustering analysis, for example, to analyze two or more BOWs. In one embodiment, BOWs may be input to a k-means clustering algorithm. In some implementations, a k-means cluster may be retrained every time a new card is generated/created. In some embodiments, a k-means cluster may utilize the number of clusters to compute when the model is trained, and each commerce entity 115 for which a card is created may be a cluster. For each cluster, the receiver processor server 140*b* may tokenize every word (and/or every word meeting specifications, such as a length greater than 1 character, etc.) and vectorize it to create a BOW. For an example merchant "Merchant A", an example card request may generate a BOW having the form of. ["merchant A", "your", "wallet", "utf8", "5551234567", "reno", "nv", "usa" ]. Depending on the implementation, the k-means cluster may include more than 100, 500, 1000, 2000, 3000, 4000, 5000, 6000, 7000, 8000, 9000, 10000, 11000, 12000, 13000, 14000, 15000, 20000, 25000, 30000, 40000, 50000, or more than 100000 unique clusters. The receiver processor server 140*b* may, in some embodiments, retrain the k-means clustering on each card-create request, to retrain the k-means cluster with the new, additional cluster added.

In particular embodiments, the receiver processor server 140*b* may use behavioral pattern analysis in validating an incoming transaction. In some embodiments, the receiver processor server 140*b* may also utilize machine learning to provide dynamic (i.e., real-time and/or near real-time) fraud and risk management, including fraud/risk scoring. The receiver processor server 140*b* may collect many different data points per account holder/client and transaction which may be aggregated in a centralized database. This data may be secured and augmented with third-party data. Machine-learning models may be applied to analyze the data and assign a risk score (e.g., from 1-100, based on increasing risk). This risk score may allow the receiver processor server 140*b* to further analyze/determine whether a transaction should be authorized or rejected. This score may also allow the receiver processor server 140*b* to determine what risk management actions it may take with an account holder/client, including but not limited to lending and underwriting as well as fraud monitoring and prevention. In some instances, the risk score may be dynamic because the machine-learning models may run continuously and may be constantly refining themselves based on the latest data inputs.

In particular embodiments, after data verification 416, a verification response 418 may be provided to the receiver processor API 140*a*. The receiver processor API 140*a* may further transmit the verification response via API 420 to the account processor server 120*a*. In particular embodiments, the transaction approve/decline response via API 422 may be returned to the receiver processor API 140*a*. The receiver processor API 140*a* may then convert the transaction response 424 for the receiver processor server 140*b*.

In particular embodiments, after the receiver processor server 140*b* or account processor server 120*a* determines from the transaction data that the commerce entity 115 is not the commerce entity 115 identified by the tag stored in the record for the card number, as indicated in the account profiles 140c, the receiver processor server 140b or account processor server 120a may then return a rejection/decline indicator message. It should be noted that the card owner's true and accurate information may be submitted for verification, but the transaction may still be declined. A bad actor, such as a hacker, may be able to steal enough accurate data about the card/bank account from its owner to be capable of submitting the requisite information. The payment, however, may be rejected when the transaction data for the commerce entity 115 is not matched to the tag associated with the card number under scrutiny.

In particular embodiments, after the receiver processor server 140b or account processor server 120a determines from the transaction data that the commerce entity 115 is the commerce entity 115 identified by the tag stored in the record for the card number, as indicated in the account profiles 140c, the receiver processor server 140b or account processor server 120a may then return an approval indicator message.

In particular embodiments, the receiver processor server 140b may send the transaction verification response 426 via the payment network 135 to the originator processor 125. The originator processor 125 may optionally initiate completion of transaction 428. In particular embodiments, the payment network 135 may send an advice message 430 to the receiver processor server 140b, which may process the advice message 432. The receiver processor server 140b may send the approved response 434 to the payment network 135. In particular embodiments, the payment network 135 may generate an advice message 438 based on the approved response 434 and send it to the originator processor 125. The originator processor 125 may send the transaction submission response 440 to the commerce entity 115. The commerce entity 115 may then return the transaction payment information and purchase response 442 to the account holder 105.

In particular embodiments, while sending the approved response 434 to the payment network 135, the receiver processor server 140b may generate a clearing message 436 for the receiver processor API 140a. The receiver processor API 140a may send the clearing message via API 444 to the account processor server 120a. The account processor server 120a may then acknowledge via API 446 the receipt of the clearing message.

Processing Transactions with Idempotency in Real-Time Ledgers

In particular embodiments, the receiver processor 140 may attribute millions of transactions to a diverse set of financial accounts. Such transactions may follow different flows and affect different accounts based on customer and internal configurations. As an example and not by way of limitation, internal configurations for possible ISO8583 transactions may include pre-paid (drawing funding from a for-benefit-of account), post-paid (extending a customer a line of credit) and multi-account (multiple settlement account). The receiver processor 140 may attribute transactions, aid in transaction processing by decisioning on balances, produce accurate balances and model all money movements. As a result, the receiver processor 140 may automate the real-time ledgering of financial and non-financial activities from multiple sources. As an example and not by way of limitation, these sources may include, but not limited to, ACH, ISO8583 transactions, direct transfers, wires, etc. This may enable the receiver processor 140 to accurately bill customers, extend lines of credit, offer virtual bank accounts (potentially FDIC insured), offer "for the benefit of" (FBO) accounts, support complex multistage movements of money across multiple accounts and produce financial statements and other reports on top of issuing accounts/cards and processing ISO8583 transactions for those accounts/cards. In particular embodiments, the receiver processor 140 may process a transaction by using real-time balance information to determine whether a message should be authorized, which may include assigning a transaction and group identifier, processing the authorization, and updating various ledger balances based on the transaction itself. In particular embodiments, conditional checks may be applied before the ledger is updated to ensure that no previous updates were based on events/transactions with the same identifier as the present transaction. Although this disclosure describes ledgering particular transactions by particular processors in a particular manner, this disclosure contemplates ledgering any suitable transaction by any suitable processor in any suitable manner.

In particular embodiments, the receiver processor 140 may receive a first network event corresponding to a first transaction associated with a transfer of resources between a resource account and a third party. As an example and not by way of limitation, the first network event may be an ISO8583 authorization from a network provider. The first network event may be assigned a unique transaction group identifier associated with the first transaction. In particular embodiments, the receiver processor 140 may authorize the transfer of resources based at least in part on a balance value of a ledger account recorded in an account ledger. The ledger account may represent the resource account in the account ledger. In particular embodiments, the receiver processor 140 may record a first update in the account ledger. Recording the first update may comprise recording the unique transaction group identifier in association with the first update and the ledger account, and modifying the balance value of the ledger account in the account ledger based on a transfer value associated with the transfer of resources. In particular embodiments, the receiver processor 140 may receive a second network event corresponding to a second transaction associated with the transfer of resources between the resource account and the third party. The receiver processor 140 may determine that a unique transaction group identifier assigned to the second network event matches the unique transaction group identifier associated with the first update and the ledger account. In particular embodiments, the determination of a match may indicate that the balance value of the resource account has already been modified based on the transfer of resources. The receiver processor 140 may further record a second update in the account ledger. In particular embodiments, recording the second update may comprise recording the unique transaction group identifier in association with the second update without modifying the balance value of the ledger account in the account ledger. In particular embodiments, when processing a transaction and writing to the account ledger, the updates and writes to balances for transactions may be atomic and adhere to ACID properties and principles (atomicity, consistency, isolation, and durability).

Ledgering has been a process since ancient times. Every business may need to record its financial activity and calculate its payables and receivables. Processing millions of transactions that result in upwards of a billion dollars in volume per year is a difficult problem, compounded by the need to support millions of customers with different funding flows, use cases, and contractual obligations. Most ledgering/accounting software today may be not built for scale of billions of events, may be unable to provide real-time updates, may be unable to handle both financial and non-financial transactions, and may be overall less flexible since they are use case specific (e.g., accounting just for small businesses). In particular embodiments, the issuer processor 140 may address such limitations by automating and streamlining the process of posting both financial and non-financial transactions (e.g., one or more of the first transaction and second transaction may be associated with a non-financial activity) to a flexible chart of accounts, as well as approving or declining transactions that result in movements of money. The receiver processor 140 may also offer an auditable trail of transactions and balances, both real-time and historical.

Before describing the embodiments disclosed herein, the ledger definitions associated with the embodiments are first listed in Table 7 below.

originator account may need to have a sufficient balance to process the transfer. For account transfers, funds may be moved from an operating account belonging to the end-user account to a settlement account belonging to the end-user account. The originator account may need to have a sufficient balance to process the transfer.

In particular embodiments, events may be consumed from different topics, including transactions topic 510, instances (program) topic 515, accounts topic 520, and cards topic 525. These topics may be consumed by different consumer modules within the account ledger. As an example and not by way of limitation, instances consumer 530*a* may consume from transactions topic 510, instances consumer 530*b* may consume from instances topic 515, accounts consumer 535 may consume from accounts topic 520, and cards consumer 540 may consume from cards topic 525. The consumers may be configured with identify-and-access

TABLE 7

Ledger definitions related to the disclosure herein.

| Item | Description |
|---|---|
| Chart of Accounts | A hierarchical representation of accounts associated with the receiver processor 140 in the payment system 100. All accounts may be classified as an asset, liability, or equity. The accounting equation may state that the total value of assets + liabilities = equities. |
| Program | Also known as an instance, a program may be a top-level container for users of the receiver processor 140 and may contain many end-user accounts, which in turn hold many cards. |
| Ledger Account | May represent a node in the Chart of Accounts. Externally these may refer to programs, virtual banks (VBAN's), cardholder accounts, cards, etc. May be a container or final account type. |
| Container Ledger Account | A parent node on the Chart of Accounts. May represent entities such as a program, an end-user account, etc. |
| Final Ledger Account | A leaf node on the Chart of Accounts. May represent an entity such as a card. |
| VBAN | A special, publicly routable ledger account. A VBAN may require entries in a second table used to support the management of the accounts routing and account number. The VBAN entity may be posted to both the ledger and VBAN tables, but share a UUID (universally unique identifier) across both. The purpose of posting VBAN entity to both tables may be that certain private information (e.g., VBAN account number) may only exist in the VBAN table, but may still be referenceable in the ledger. |
| Transaction | May represent a transaction between accounts. May include both financial and nonfinancial advice messages. A transaction may be attributed to a single ledger account, but may impact the balances of many ledger accounts. |
| Ledger Event | Derived from transactions (one versus many), may allow for dual-entry accounting to ensure transaction data is accurately reflected across all parties on the Chart of Accounts. Balance updates may be derived from all ledger events associated with a given transaction. |
| Balance | May represent the current balance for a ledger account. A balance may represent various currency balances, each defined by pending and available amounts. A balance may also contain data about the last update, including the transaction UUID's and the impact the transaction had on the balance. A balance may also comprise historical balances and/or balance roll-ups. |

Figure 5:
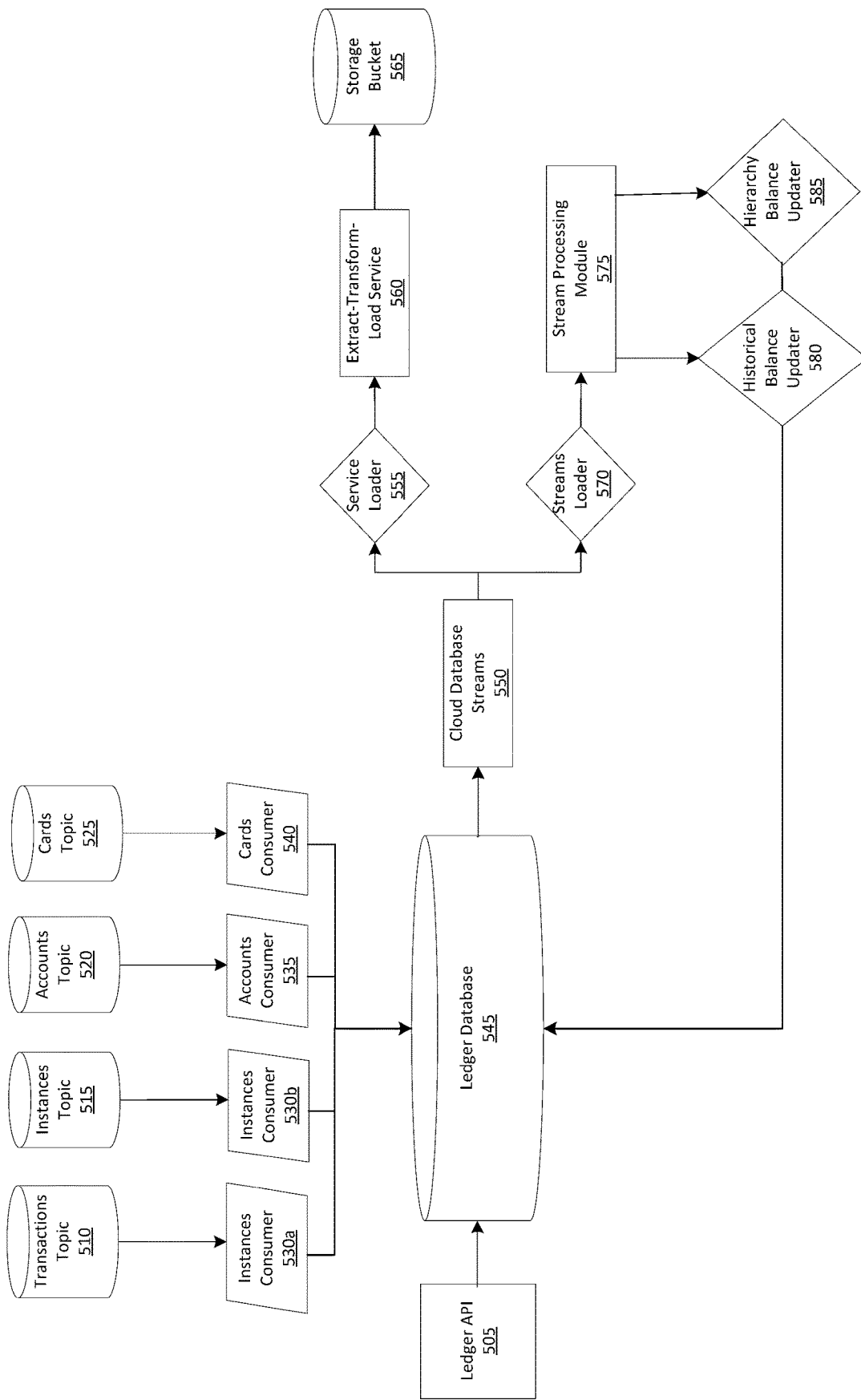
FIG. 5 illustrates an example system of the account ledger.

FIG. 5 illustrates an example system 500 of the account ledger. In particular embodiments, the ledger API 505 may provide the external API into transactions. The balances of the ledger API 505 may be a representation of the transactions it has consumed. The view of transactions via the ledger API 505 may represent the proof-of-work. In particular embodiments, the ledger API 505 may also comprise a super set of transactions such as ACH transfers, direct transfers, program transfers, and account transfers. As an example and not by way of limitation, for direct transfers, the ledger API 505 may expose an endpoint which may be used to initiate money movements between two accounts. For program transfers, funds may be moved from any operating account belonging to the program account to any settlement account belonging to the program account. The management (IAM) authentication on a topic-level. By default, no entities may read or write to any partition and each producer and consumer may be specifically permissioned for its specific topic(s). In addition, messages may be encrypted.

In particular embodiments, the consumers may write the events to the ledger database 545. All consumers within the account ledger may be implemented with idempotency guarantees. Specifically, all writes to the ledger database 545 may include conditional checks on the existence of the entity's UUID. In the event that the UUID exists, no action or only limited action may be taken. This may apply across all entity types, i.e., ledger accounts, ledger events, and transactions. The account ledger may be responsible for the management of all ledger types except program, end-user, and card account types. Within the account ledger, the ledger accounts may be identified via their upstream UUID. As an example and not by way of limitation, a ledger account representing a card may use the value persisted in the column associated with UUID of cards in a database. In addition to consuming creation events, the account ledger may consume all update events to ensure that status changes are reflected. As an example and not by way of limitation, if a card is closed, this may be reflected in the account ledger.

In particular embodiments, all events processed via the ledger database 545 may be made available to downstream consumers. The account ledger may be a highly available service, which may be deployed across multiple regions, running in a modified hot-hot configuration. In particular embodiments, the output from the ledger database 545 may be consumed by cloud database streams 550. A cloud database may be deployed as a global table, with replication to each supported region. All infrastructure may be deployed across all regions. Consumers in all regions may process all messages but may be configured via an environment variable as to whether they write the message to the cloud database. During normal operations, only one region may be configured to write messages to the cloud database. During an outage in one region, the configuration of the consumers may be modified to change the "active" region. Note that during switchover it may not be a concern if consumers from multiple regions are each temporarily processing messages due to the idempotency guarantees. In particular embodiments, the cloud database may implement a particular recovery mechanism, allowing the database to be restored from any time in a recent period of time (e.g., 35 days), which may help ensure the durability of data. In particular embodiments, the cloud database may be configured with identify-and-access management (IAM) authentication. By default, no entities may read or write to the ledger database 545. The ledger API 505 and consumers may have permissions for creating, reading, updating, and deleting data to the cloud database. All such data may be encrypted. These measures may help enhance security.

In particular embodiments, all ledger events may be archived in the storage bucket 565 for long-term archival. The archival may be powered via cloud database streams 550 and an extract-transform-load (ETL) service 560. The ETL service 560 may reliably capture, transform, and deliver streaming data to data lakes, data stores, and analytics services. A service loader 555 may consume data from the cloud database streams 550 and call the ETL service 560. As an example and not by way of limitation, after a period of time (e.g., 60 days), data may be moved to a data storage configured for infrequent access. As another example and not by way of limitation, after an extended period of time (e.g., 180 days), data may be moved to a glacier data storage. The ETL service 560 may write to the storage bucket 565. In particular embodiments, the storage bucket 565 may have a private access-control list and only permissioned users (controlled via IAM) may have read-access to the storage bucket 565. In particular embodiments, only the loader may have write-access to the storage bucket 565. Storage bucket 565 may be encrypted.

In particular embodiments, a streams loader 570 may consume from cloud database streams 550 and make the consumed data available to downstream consumers via an asynchronous data stream processing module 575. As an example and not by way of limitation, a historical balance updater 580 and a hierarchy balance updater 585 may consume from the asynchronous data stream processing module 575. The two updaters may further write their respective updates to the ledger database 545. In particular embodiments, the available data may exclude data from a privacy table comprising VBAN information, which may comprise sensitive data (e.g., the account number). In particular embodiments, downstream events may be ordered based on ledger account UUID (used as a partition key). Events may be marked as out of order if the initial processing of the event fails, and may then be republished.

In particular embodiments, the asynchronous data stream processing module 575 may have a retention period (e.g., 30 days), which may help ensure durability of the data. To enhance security, the asynchronous data stream processing module 575 may be configured with IAM authentication. By default, no entities may read or write to the stream, and all data may be encrypted. Although FIG. 5 illustrates a particular arrangement of components associated with the account ledger, this disclosure contemplates any suitable arrangement of components for the account ledger. Moreover, although FIG. 5 illustrates a particular number of components associated with the account ledger, this disclosure contemplates any suitable number of components for the account ledger.

In particular embodiments, with the exception of the ledger database 545, all components in the account ledger may be stateless and designed to scale horizontally, allowing the receiver processor 140 to increase the number of running processes. Further, each component may be configured with autoscaling to reduce the need for manual intervention during increases in traffic.

In particular embodiments, the receiver processor 140 may begin with modeling a chart of accounts for effective and efficient ledgering. Tables 8-10 illustrate example chart of accounts. In particular embodiments, the accounts may comprise one or more management accounts for ledgering and the business logic surrounding them. As an example and not by way of limitation, the management accounts may comprise the following account types: a settlement account, a fee account receivable, a reserve account, an operating account, a settlement account receivable, a chargeback account, a chargeback offset account, and a VBAN. The settlement account may be a final ledger account containing funds from which card transactions draw from. The fee account receivable account may be a final ledger account containing funds the enterprise customer has earned as a part of any revenue sharing agreement. The reserve account may be a final ledger account containing funds which are used to de-risk a given enterprise customer. The operating account may be a final ledger account which an enterprise customer can freely move money to/from (i.e., move funds off of a card, later moving it from the operating account to the card). The settlement account receivable may be a final ledger account which offsets post-paid enterprise customers. The chargeback account may represent money the enterprise customer is owed due to chargebacks. The chargeback offset account may be an account used to offset chargebacks on the assets portion of the chart of accounts. The VBAN may be a routable ledger account with a unique account number associated to a routing number held by the receiver processor 140, where the routable ledger account may represent money the receiver processor 140 holds for an enterprise customer. In particular embodiments, the VBAN may have a one-to-one relationship with a linked account (i.e., to the operating account). In particular embodiments, final ledger accounts may not contain sub-accounts, but transactions and ledger events may be posted to them. An extensible and flexible chart of accounts may be an effective solution for effective and efficient ledgering of all impacted accounts with respect to a transaction as it may enable the receiver processor 140 to model a vast array of customer hierarchies.

TABLE 8

Example initial chart of accounts.

Assets (container)
   RTN-123456789 (container)
     For Benefit of Customers (container)
      Receiver Processor (container)
        Receiver Processor Holding VBAN (final - Network Provider draws from this account for all activity)
      Assets Suspense (final)
     Accounts Receivable
      Programs A/R
Liabilities (container)
   Network Payables (container)
     Network Provider Payables (final)
     Liabilities Suspense (final)
   Programs Container (container)
Equities (container)

TABLE 9

Example initial chart of accounts for pre-paid programs.

Assets

1. RTN-123456789
   a. For Benefit of Customers
     i. Program A VBAN Container (container)
       1. Program A Reserve VBAN (final)
       2. Program A Settlement VBAN (final)
       3. Program A Fee A/R VBAN (final)
       4. Program A Operating VBAN (final)
       5. Chargeback offset (final - not routable)
2. Accounts Receivable
   a. Programs Accounts Receivable
     i. Program A A/R Container
       1. Program A Fee A/R Account (final)

Liabilities

1. Programs
   a. Program A
     i. Reserve (final)
     ii. Settlement (final)
     iii. Operating (final)
     iv. Chargeback (final)
     v. End User Container (container)

TABLE 10

Example initial chart of accounts for post-paid programs.

Assets

1. RTN-123456789
   a. For Benefit of Lithic Customers
     i. Program A VBAN Container (container)
       1. Program A Reserve VBAN (final)
       2. Program A/R VBAN (final)
       3. Chargeback offset (final - not routable)
2. Accounts Receivable
   a. Programs Accounts Receivable
     i. Program A A/R Container
       1. Program A Settlement A/R Account (final)
       2. Program A Fee A/R Account (final)

Liabilities

1. Programs
   a. Program A
     i. Reserve (final)
     ii. Operating (final)
     iii. Chargeback (final)
     iv. End User Container (container)

In particular embodiments, the chart of accounts may comprise root containers used exclusively for top-level equities, asset, and liability containers. In particular embodiments, generic container ledger accounts or generic final ledger accounts may not require any linking, or special rules.

In particular embodiments, the chart of accounts may comprise pre-paid accounts for pre-paid programs or end-user accounts and post-paid accounts for post-paid programs or end-user accounts. In particular embodiments, a program may be a top-level container ledger account for an enterprise customer associated with the account processor 120. An end-user account may be an "accounts" API object. An end-user account may contain many cards, which may be either physical cards or virtual cards. In particular embodiments, a program may contain many end-user accounts. In particular embodiments, the pre-paid or post-paid accounts may comprise one or more of assets, liabilities, or equities, which may be all container ledger accounts. The container ledger accounts may contain sub-accounts, but transactions and ledger events may not be posted to them.

In particular embodiments, assets may comprise one or more top-level containers associated with particular routing numbers (herein "RTN containers"), such as, e.g., container "RTN-123456789," and an accounts receivable container. The goal of the account ledger may be to accurately track the existing funds contained for the routing number and correctly track the allocation of funds to each VBAN for that routing number. The RTN container may comprise a container 'for benefit of users' of the receiver processor 140, a container for the receiver processor 140, and an assets suspense account (a final account). In particular embodiments, the container for benefit of users of the receiver processor 140 may comprise a program A VBAN container, which may be a container ledger account for a program's VBAN's. The container for the receiver processor 140 may comprise a holding VBAN account, which may be a final ledger account where a network provider may draw from for all activities. As an example and not by way of limitation, the program A VBAN container may comprise one or more of a program A reserve VBAN (final ledger account), a program A settlement VBAN (final ledger account), a program A fee account receivable VBAN (final ledger account), a program A operating VBAN (final ledger account), and a chargeback offset account (final and not routable). In particular embodiments, the accounts receivable container may comprise a programs accounts receivable container. The programs accounts receivable container may comprise a program A account receivable container, which may further comprise a program A fee account receivable account (final ledger account). For post-paid programs only, the programs accounts receivable may additionally comprise a final account used to offset transactions in a pending state for post-paid customers in a dual-message transaction flow. In particular embodiments, such final ledger account may be at the program level or account-holder level.

In particular embodiments, the liabilities may comprise a network payables container, which may comprise a network-provider payables account (final ledger account) and a liabilities suspense account (final ledger account). The liabilities may additionally comprise a programs container. As an example and not by way of limitation, the programs container may comprise program A accounts, which may comprise one or more of a reserve account (final ledger account), an operating account (final ledger account), a chargeback account (final ledger account), and an end-user container (container). In particular embodiments, the operating account may be owned by a program or end-user account. For pre-paid programs only, the programs container associated with the liabilities may additionally comprise a settlement account (final ledger account).

In particular embodiments, for pre-paid programs, a program or end-user (e.g., account holder 105) account may additionally own a settlement account. The corresponding settlement account receivable may be at the program level or the account-holder level. As an example and not by way of limitation, for pre-paid programs, the program A VBAN container may additionally comprise a settlement VBAN. As another example and not by way of limitation, for pre-paid programs, the program A accounts associated with liabilities may additionally comprise a settlement account.

In particular embodiments, the management accounts may be associated with a plurality of business rules. One business rule may be that a program can contain exactly one settlement, fee, and reserve account. Another business rule may be that a program can transfer funds from an operating account to a settlement account, but not the other way. Another business rule may be that an account can contain exactly one settlement account, and one operating account. In particular embodiments, the ledger API 505 associated with the receiver processor 140 may provide an interface for making an account only containing one settlement account and one operating account. Another business rule may be that an enterprise customer may not perform any direct transfer to/from any of settlement (can be transferred to), fee, or reserve accounts. Enterprise customers may load funds into these accounts via an ACH transaction to a linked VBAN. Another business rule may be that a program may move money between a program-level settlement account and an account-level settlement or operating account. Although management accounts may be provisioned as needed after the initial creation, the ledger API 505 may provide a standard skeleton for any program.

In particular embodiments, linked accounts may indicate mapping of account type to UUID, which may be used to guide funds flows. As an example and not by way of limitation, a card in a pre-paid program may be linked to a settlement account and the VBAN associated with the settlement account. In particular embodiments, the rules for linked accounts may be as follows. One rule may be that generic types, i.e., root accounts, generic container ledger accounts, and generic final ledger accounts may have no required linked accounts. In other words, any mapping can be provided. Another rule may be that all account types, except the program type, may be linked to a program. Another rule may be that program, end-user, and card accounts may be linked to their funding accounts, which vary depending on whether they are post or pre-paid. Pre-paid accounts may be linked to a settlement account and a VBAN account which is linked to the settlement account. Post-paid accounts may be linked to an account receivable. Another rule may be that program accounts may be linked to both an operating account and a reserve account. Supporting flows such as transaction authorization from a pre-paid balance at the program and cardholder levels, post-paid transactions at the program and cardholder levels, and real-time funding may be an effective solution for addressing the technical challenge of effective and efficient ledgering of complex money movements as the receiver processor 140 may atomically and transactionally move money across multiple financial accounts.

FIGS. 6A-6B illustrate example charts of accounts 600. As illustrated in FIGS. 6A-6B, the chart of accounts 600 may comprise assets 610 and liabilities 620. The assets 610 may reflect what the entity associated with the receiver processor 140 owns whereas the liabilities 620 may reflect what the entity associated with the receiver processor 140 owes. For assets 610, the debits (i.e., money going in) may increase whereas the credits (i.e., money going out) may decrease. For liabilities 620, the credits may increase whereas the debits may decrease. The chart of accounts 600 may indicate the pending balance 630 and available balance 640. The pending balance 630 may reflect the money held in a pending state whereas the available balance 640 may reflect the money available to be used. The derived total balance may be the pending balance 630 plus the available balance 640.

In particular embodiments, the supported access patterns of the account ledger may comprise transactions, ledger events, balances, ledger accounts, and VBAN. As the account ledger may be composed of synchronous processes and asynchronous processes, it may get an immediately consistent view for updates to be synchronously applied to the account ledger or an eventually consistent view for updates to be asynchronously applied to the account ledger. In particular embodiments, for transactions, the account ledger may get an immediately consistent view of transactions relating to a final ledger account. This view may include both pending and settled transactions. The account ledger may also get an immediately consistent view of related transactions. In particular embodiments, more than one transaction events may be grouped via a unique transaction group identifier (i.e., transaction group UUID). As an example and not by way of limitation, an authorization and a capture may be associated via the same transaction group UUID. The account ledger may additionally get an eventually consistent view of a single transaction by UUID. The account ledger may also get an eventually consistent view of transactions by their current status (i.e., whether they are pending, or have been settled). The account ledger may also perform an immediately consistent balance-checked transfer of funds between two final ledger accounts, which may impact either pending or available balances. The account ledger may also commit an immediately consistent network event to a card account. The account ledger may further commit an immediately consistent balance-checked network event authorization to a card account (authorization from balance).

For ledger events, the account ledger may get an immediately consistent view of ledger events relating to a final ledger account. For balances, the account ledger may get an immediately consistent view of a final ledger account's balance, get an eventually consistent list of hierarchical balances under a given container ledger account, get an eventually consistent view of historical balances, get an eventually consistent view of the balance at the time of a given transaction, and add a currency to an accounts balance.

For ledger accounts, the account ledger may get an immediately consistent view of a ledger account, get an immediately consistent view of the chart of accounts hierarchy, get an eventually consistent view of a container ledger accounts' balance, and the balances of its children, create a ledger account under a given parent account UUID, and atomically bootstrap a program and all of its related management accounts.

For VBAN, the account ledger may get an immediately consistent view of a VBAN by its routing and account number. The account ledger may also get an immediately consistent view of a VBAN by its linked ledger account UUID. The account ledger may additionally create a VBAN linked to a ledger account. In particular embodiments, the receiver processor 140 may identify, from the account ledger, a unique container ledger account identifier (i.e., container UUID) associated with a virtual bank account (VBAN) container ledger account, and a unique final ledger account identifier (i.e., final account UUID) associated with a final ledger account. The receiver processor 140 may then identify, from a privacy table separate from the account ledger, a VBAN record for a first VBAN. The VBAN record may comprise the unique container ledger account identifier, the unique final ledger account identifier, a unique VBAN account number for the first VBAN, and a routing number associated with the first VBAN. The receiver processor 140 may further retrieve, from a virtual account database, a transaction resource configuration for transactions associated with the first VBAN. In particular embodiments, the transaction resource configuration may be decoupled from the resource account. Authorizing the transfer of resources may be further based on determining that one or more parameters of the transaction resource configuration are satisfied based on metadata associated with the first transaction. In particular embodiments, authorizing the transfer of resources may cause the balance value of the resource account to be reduced via the routing number associated with the first VBAN.

In particular embodiments, the account ledger may be associated with funding levels, funding types, supported configurations, and modifications of the funding type. In particular embodiments, the account ledger may support different funding levels for ledger accounts. As an example and not by way of limitation, the funding levels may include account-level funding and program-level funding. This may be defined for card, end-user, and program ledger account models. In particular embodiments, program-level funding may be the default funding level. In program-level funded flows, all card funding and balance checks may be derived from an account owned by a program account. The account may be determined by the account's funding type. In account-level funded flows, all card funding and balance checks may be derived from an account owned by an end-user account. The account may be determined by the account's funding type.

In particular embodiments, the account ledger may support different funding types. As an example and not by way of limitation, the funding types may include pre-paid funding and post-paid funding. All programs, end-user pre-paid accounts, and card-accounts may have an associated funding type, dictating which offsetting accounts are used during the various funding flows. In particular embodiments, pre-paid funding flows may require that users fund settlement accounts which are used to fund card activity. During any movement of funds that require a balance check, the settlement account may be used as a source of truth. In particular embodiments, post-paid funding flows may require that an account receivable account be used to offset card activity. The balance of this account may represent the amount of money owed by the enterprise customer associated with the payment processor 120. The account receivable account may be impacted by actual movement of money impacting the available balance. As a result, the embodiments disclosed herein may have a technical advantage of enabling the receiver processor 140 to accurately identify outstanding account receivables and payables. This may simplify billing process and help catch discrepancies earlier, thus decreasing the funding risk.

In particular embodiments, the account ledger may support different funding types and funding-level combinations. As an example and not by way of limitation, these combinations may include program-level pre-paid, program-level post-paid, account-level pre-paid, and account-level post-paid. The account ledger may support mixed program accounts containing end-user accounts which have different funding configurations.

In particular embodiments, the account ledger may modify funding types. A program or an individual end-user account may have its funding configuration modified at any time between post-paid and pre-paid. Updating the funding configuration for either may be immediately consistent.

In particular embodiments, the account ledger may consume downstream transactions from different data flows. The data flows may comprise a legacy flow and an authorization from balance (AfB) flow. In particular embodiments, for any given final ledger account, upstream transactions may flow from one of the data flows, which may help guarantee strict serialization isolation. The ledger API 505 may also provide native support for initiating money movements between two accounts.

Figure 7:
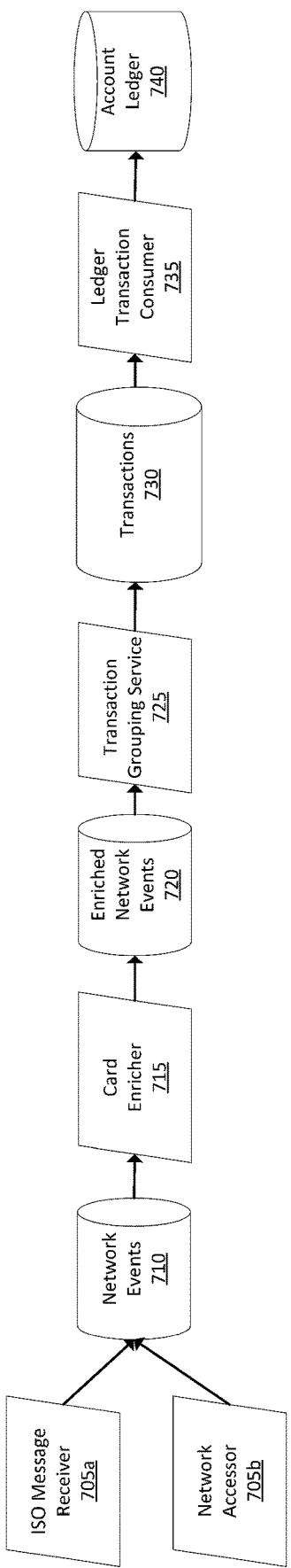
FIG. 7 illustrates an example flow diagram of the legacy flow.

FIG. 7 illustrates an example flow diagram of the legacy flow 700. In particular embodiments, the ISO message receiver 705a or network accessor 705b may receive a message from the network. The ISO message receiver 705a or network accessor 705b may then publish the message to network events 710 in the cardholder data environment in a virtual private cloud. In particular embodiments, a network event may comprise information associated with one or more of a message type indicator (MTI), a message UUID, a transaction group UUID, a card UUID, a transmission datetime, a retrieval reference number (RNN), an authorization identifier response, a card acceptor name, a card acceptor location, and an authorization life cycle. In particular embodiments, the receiver processor 140 may redact sensitive data associated with one or more network events (e.g., a first and second network event). Network events 710 may be consumed by a card enricher 715 which may replace sensitive data such as the PAN with the internal card UUID. Other sensitive data elements (e.g., a CVV1 and CVV2) may be redacted from the payload as well. As an example and not by way of limitation, the specific data elements removed from the message may include one or more of data element (DE)-2 PAN, DE-35 Track 2 (magstripe data), DE-45 Track 1 (magstripe data), DE-152: CVV2, DE-160: PAN, and DE-162: CVV. The message may then be re-published to enriched network events 720.

In particular embodiments, the transaction grouping service 725 may consume the messages and perform the grouping logic to assign each message the appropriate transaction group UUID, which is a shared UUID to group all events in a dual message flow. In particular embodiments, a dual message flow may be an authorization message (ISO8583 message type indicator: 0100/non-financial) followed by a capture message (ISO8583 message type indicator: 0220/financial). By contrast, a single message flow may be an authorization and capture in a single message (ISO8583 message type indicator: 0200/financial request). As an example and not by way of limitation, the dual message flow may be illustrated by the following scenario in which it may be assumed that a card has $10 loaded on to it. A user may place an order for 2 books ($5 each) at an online retailer using a card issued by the receiver processor 140. At day 1, the online retailer may send the receiver processor 140 an authorization request (ISO8583 message type indicator: 0100) for $10. The receiver processor 140 may hold this $10 on the card. However, at this point, the $10 may not actually be taken from the card yet, and as such, this stage is non-financial. At day 2, the online retailer may ship out the first book and send the receiver processor 140 a capture request (ISO8583 message type indicator: 0220) for $5. This amount may be deducted from the card's balance. This capture request may be financial since it affects a money movement. The card may have a remaining $5 authorization amount being held. At day 5, the online retailer may discover that they do not have the second book in stock and reverse the $5 authorization (ISO8583 message type indicator: 0420). The $5 being held may be released and may be used for new transactions. As another example and not by way of limitation, the single message flow may be illustrated by the following scenario. An account holder 105 may be at an ATM and may withdraw $10 from the ATM using a card issued by the receiver processor 140. The receiver processor 140 may receive a financial request (ISO8583 message type indicator: 0200) and immediately deduct $10 from the account holder's 105 card. This is a single message since there is no prior authorization.

In particular embodiments, the ISO8583 messages that are a part of the same transaction lifecycle may comprise attributes that are shared across the lifecycle of the transaction. As an example and not by way of limitation, the PAN (primary account number) and the retrieval reference number (set by the payment network 135) may be shared across authorizations and captures that are part of the same group. In particular embodiments, the receiver processor 140 may use these attributes to locate the first message (usually an authorization) and group subsequent related messages. In the dual message flow, the authorization (ISO8583 message type indicator: 0100) and capture (ISO8583 message type indicator: 0220) may be assigned a shared identifier by the transaction grouping service 725 since they are a part of the same transaction lifecycle.

In particular embodiments, the transaction grouping service 725 may perform the following operations when it receives a message. The transaction grouping service 725 may firstly query a data store for an existing group identifier. If a group identifier exists, the transaction grouping service 725 may enrich the event with the group UUID and insert the network event into the data store. If a group identifier does not exist, the transaction grouping service 725 may generate a new identifier and insert the network event into the data store. In the event of a force post (i.e., a capture without a preceding authorization), the transaction grouping service 725 may generate a transaction group UUID upon failing to query for the authorization. The transaction grouping service 725 may further publish the fully enriched message to the grouped network events.

In particular embodiments, the transaction grouping service 725 may use matching rules to group messages. Certain types of events may have different fields exposed that could make matching rules differ on type. In particular embodiments, the logic for matching messages from ISO message receiver 705a may be as follows, and which may retrieve the transaction from a transaction table using a cascading approach (i.e., try the first option and, if unsuccessful, then try the second option, etc.). The transaction grouping service 725 may use comprehensive matching rules for particular payment networks 135, using reverse match to handle out-of-order messages. As an example and not by way of limitation, the transaction grouping service 725 may firstly compare DE-38 (i.e., approval number) and encrypted PAN. The transaction grouping service 725 may then compare DE-37 (i.e., RRN) and card identifier within a past time period (e.g., 60 days). The transaction grouping service 725 may then compare DE-63 (i.e., network reference identifier) and card identifier with the past time period. For network accessor 705b, this may be DE-37 plus three trailing 0's. Values may end up being the same as the DE-63 field for ISO message receiver 705a. The transaction grouping service 725 may then compare DE-90 (i.e., multiple data elements nested inside). Note that DE-90 may be not available in clearings for network accessor 705b. The transaction grouping service 725 may further perform a fuzzy match on card identifier, merchant descriptor, date, and amount. In particular embodiments, captures, failed authorization, authorization reversals, and refund requests may require a subsequent query to retrieve the original authorization using the transaction identifier.

In particular embodiments, the transaction grouping service 725 may handle out-of-order messages using different options. One option may be processing each message on receipt and always assigning a transaction group UUID. As an example and not by way of limitation, if the transaction grouping service 725 receives a message with message type indicator of 110 (MTI-110) before the original MTI-100, it may assign a transaction group identifier to the MTI-110 immediately. Then when it receives the MTI-100, it may match this event to the MTI-110 in the data store and use the same transaction group identifier. As a result, every incoming network event may be immediately assigned a transaction group identifier. Another option may be processing messages in order by queueing those that arrive too early. For MTI-100s (except incremental authorizations), the transaction grouping service 725 may skip matching and assign a transaction group identifier right away. For authorization response MTI-110, the transaction grouping service 725 may wait until it gets the MTI-100 so it may queue the MTI-110 to be processed later. Most MTIs may only depend on the MTI-100, so if for instance an authorization advice (MTI-120) or reversal (MTI-400) comes in, the transaction grouping service 725 may still link it to the MTI-100 even if MTI-110 has not yet arrived. MTI-410, MTI-420, and MTI-430 may depend on MTI-400.

In particular embodiments, if the transaction grouping service 725 encounters an error while processing a message, it may push the message to a dead-letter queue. The transaction grouping service 725 may retry request messages (e.g., MTI-100, MTI-120, MTI-400) that are needed by other services to act on. As an example and not by way of limitation, if the transaction grouping service 725 receives an MTI-420 reversing an MTI-100 that for some reason got dropped, the transaction grouping service 725 may publish it with a new transaction group UUID. In the situation that a network event should have been but cannot be grouped to an existing transaction, the transaction grouping service 725 may define what should be done for that event. As an example and not by way of limitation, a capture (MTI-220) may be treated as a force post and assigned a new transaction group UUID. Since responses indicate the transaction grouping service 725 has already allowed/declined the requests, the transaction grouping service 725 may forward them to consumers like ledger so they can update their views.

In particular embodiments, remediation may be required to handle incorrectly grouped network events. One challenge may be identifying which transaction group UUID a network event should belong to. As an example and not by way of limitation, if the network events in a transaction group are incorrectly spread out amongst other transaction groups, the transaction grouping service 725 may choose a correct transaction group UUID (or create a new one) and shift each of the events (e.g., delete and re-insert, or insert) to that group. In particular embodiments, the transaction grouping service 725 may use the following options to handle incorrectly grouped network events. One option may be voiding a network event and reprocessing it so that it appears with the correct group. As an example and not by way of limitation, the transaction grouping service 725 may void the event or emit some synthetic event that can be grouped correctly. Another option may be appending and maintaining some versioning of the transaction group UUID. As an example and not by way of limitation, let transaction_group_uuid_v0 of a network event be the up-to-date transaction group UUID. Any time the network event is re-grouped, the transaction grouping service 725 may change v0 to reflect the new group and append an increasing v1 (or v2, etc.) field with the new group.

In particular embodiments, the transaction grouping service 725 may re-emit the events to transactions 730. In particular embodiments, the ledger transaction consumer 735 may read events from the transactions 730 and atomically write the transaction, ledger entries, and balance updates via the account ledger 740.

Figure 8:
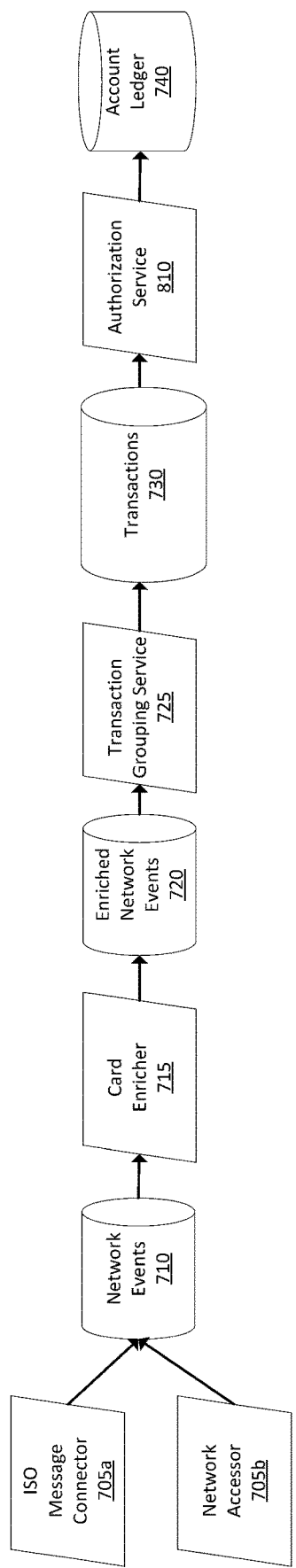
FIG. 8 illustrates an example flow diagram of the authorization-from-balance (AfB) flow.

FIG. 8 illustrates an example flow diagram of the authorization-from-balance (AfB) flow 800. In particular embodiments, the AfB flow 800 may represent a workflow in which transactions use real-time balance information to determine whether a message should be authorized. The ISO message receiver 705a or network accessor 705b may receive messages from the network. The ISO message receiver 705a or network accessor 705b may then publish the messages to network events 710 in the cardholder data environment in a virtual private cloud. In particular embodiments, network events 710 may be consumed by a card enricher 715 which may replace sensitive data such as the PAN with the internal card UUID. The messages may be then re-published to the enriched network events 720. In particular embodiments, the transaction grouping service 725 may consume the messages and perform the grouping logic to assign each message the appropriate transaction group UUID, which is a shared UUID to group all events in a dual-message flow. The transaction grouping service 725 may re-emit the events to transactions 730. The authorization service 810 may read these messages and perform all necessary authorization checks. The authorization service 810 may run checks based on authorization rules to ensure that transactions conform to business, legal, compliance and internal rules associated with the receiver processor 140. In particular embodiments, authorizing the transfer of resources may be further based on one or more confirmation checks of metadata associated with the first transaction against one or more rules. As an example and not by way of limitation, the checks may comprise one or more of verifying the checksum matches, verifying merchant is not blocked, verifying account is not banned, verifying the country of origin of the transaction is not blocked, or verifying the transaction does not put the card over its spending limit.

In particular embodiments, the authorization rules may be grouped into different categories. One category may be basic validation rules. These rules may always need to be run and may be the most basic checks to execute. Another category may be state rules associated with the receiver processor 140. Instance (program), account, and cards may be set to a variety of states e.g., instance suspended, card yellow path, account suspended through admin or management API or through triggers. Depending on the state, the authorization may be rejected. These rules may be run for everything. Another category may be other rules associated with the receiver processor 140. Another category may be sponsoring bank rules. Another category may be velocity limits, which are used to check for card limits. Another category may be authorization stream access (ASA) rules. Another category may be privacy only rules. Another category may be miscellaneous rules. Table 11 lists example authorization rules.

TABLE 11

An example list of authorization rules.

| Check Name | Category | Business Logic | Enabled by Default on Instances? |
|---|---|---|---|
| auth_verify_icc | Basic rules | Verify chip card (EMV) | Yes |
| auth_cvv_expiration | Basic rules | Card is not expired + CVV correct | Yes |
| auth_pin_block_data | Basic rules | When PIN provided, it is correct | Yes |
| auth_instance_state | State rules | Check instance state, can be suspended by receiver processor 140 | Yes |
| auth_account_state | State rules | Check account state | Yes |
| auth_card_state | State rules | Check card state | Yes |
| auth_pan_enumerators | Other rules | | Yes for non-ASA. No for ASA. |
| auth_pre_auth_credit | Other rules | Reject any refund authorizations. | Case by case. |
| misc_auth | Other rules | Daily velocity and monthly velocity for all users - referral/promo fraud - weekly global spend limit for certain users - return fraud for certain users | Yes for non-ASA. No for ASA. |

TABLE 11-continued

An example list of authorization rules.

| Check Name | Category | Business Logic | Enabled by Default on Instances? |
|---|---|---|---|
| auth_test_bank_mcc_blocklist | Sponsoring bank rules | Block specific MCC's as specified by banks | Yes |
| auth_test_bank_country_blocklist | Sponsoring bank rules | Block specific countries as specified by banks | Yes |
| auth_check_card_limits | Velocity limits | Check daily, weekly, monthly, forever card limits. | Yes for non-ASA. No for ASA (unless ASA check_card limits enabled) |
| auth_auth_rule | ASA rules | Customer configured authorization rules | No, unless ASA rules enabled |
| auth_merchant_greylist | Privacy only | For example, custom rules to avoid gift card purchases at certain merchants | No |
| auth_unsupported_merchant | Privacy only | | No |
| auth_user_subscription | Privacy only | If card is part of subscription and subscription is inactive | No |
| auth_merchant_lock | Privacy only | Supports the use case of single use card and a single merchant. Has "Locking period" in case multiple authorizations. | No |
| auth_retry_on_visa | Privacy only | Retry when purchases are on wrong network | No |
| auth_merchant_abuse | Privacy only | Hand crafted rules for specific merchants. Specific logic for vaulted cards | No |
| auth_foreign_merchant_veloc | Separated from miscellaneous authorizations | N/A | No |
| auth_fraud_advice | Separated from miscellaneous authorizations | N/A | No |
| auth_foreign_merchant_veloc | Separated from miscellaneous authorizations | N/A | No |
| auth_blocklists | Separated from miscellaneous authorizations | N/A | No |
| auth_global_weekly_limit | Separated from miscellaneous authorizations | N/A | No |
| auth_merchant_abuse_num_vaulted | Separated from miscellaneous authorizations | N/A | No |

In particular embodiments, the following checks may be applied for transactions associated with a given program (instance). The authorization service 810 may firstly find the instance identifier for the card/account. The authorization service 810 may then find the instance configuration of the instance for the given instance identifier and whether peek checks are set in the configuration. Peek checks may be set per command type, e.g., transaction/authorization. If peek checks are set in the configuration, the authorization service 810 may use the rules listed in Table 11 for the types of checks to perform. If no peek checks are set, default peek checks may be set in the code. The authorization service 810 may further analyze the rules in Table 8 to understand what business logic each check executes.

In particular embodiments, the authorization service 810 may also perform a synchronous call to the account ledger 740. The account ledger 740 may approve/decline the transaction based on the current balance of the card account. If the account ledger 740 approves the transaction, it may atomically write the transaction, ledger events, and balance updates. These messages may be ignored when re-processed via the ledger transaction consumer 735 as the account ledger 740 is built with idempotency handling. Specifically, the account ledger 740 may not write any unique combination of the transaction group UUID and the transaction (ISO8503 message) UUID that has already been processed. Given the transaction was committed during the AfB flow 800, the second attempt at processing may fail. If the account ledger 740 declines the transaction, it may record the decline but perform no other updates. A decline entry may be recorded as a transaction with no impact on the account ledger 740.

In particular embodiments, the account ledger 740 may work as follows. Upon accepting a transaction (effectively the full ISO8583 event) enriched with the account UUID and card UUID, the account ledger 740 may fetch the account, card and program ledger accounts and determine which accounts should be used for the funding flow. As an example and not by way of limitation, an account level funded account may be funded via an account-level settlement account. From the transaction and the funding accounts, the account ledger 740 may generate the ledger events for the transaction, which represent all money movements which occur. In particular embodiments, the first ledger event may specify one or more of a collection type, a collection identifier, an item type, an item identifier, an item, or a Boolean representation indicating whether the first ledger event is out of order.

In particular embodiments, recording the first update may further comprise recording a first transaction identifier associated with the first transaction. A second transaction identifier assigned to the second network event may be distinct from the first transaction identifier. In particular embodiments, the ledger account may be associated with a unique ledger account identifier. Correspondingly, recording the first update may further comprise recording the unique ledger account identifier in association with the first update. In particular embodiments, recording the first update may further comprise recording a first ledger event associated with the first update and the resource account. The first ledger event may comprise a record of the modification of the balance value of the ledger account.

From the ledger events, the account ledger 740 may calculate the net impact of the transaction across all impacted parties. In particular embodiments, the account ledger 740 may synthesize the net impact into balance updates from which the queries are built. The balance updates may represent a change to the pending and available amounts for a given currency. In particular embodiments, a balance record may comprise the following metadata. The metadata may comprise a mapping of currencies to current balances and a list of the balance updates which were last applied to the balance. The current balances may comprise an available balance, a pending balance, and store metadata about the time of the last update and the UUIDs for the last transaction (ISO8583 and group UUID) which triggered the update. The metadata may also comprise a list of the balance updates which were last applied to the balance, each of which includes the currency and impact to available and pending balance. If a balance update negatively impacts an accounts balance, a balance check may be applied. The entire transaction may fail if the accounts balance after the update is not greater than the configured threshold. This balance check may be configurable per account or program. As a result, the embodiments disclosed herein may have a technical advantage of tracking and recording an auditable trail of financial activity across all assets, liabilities and equities such as accounts receivables, virtual bank accounts, network payables and external clients, which may result in FDIC-insured bank accounts, identifying erroneous transactions, and providing accurate account statements.

Asynchronously, via the asynchronous data stream processing module 575, the account ledger 740 may perform several operations when detecting an update to the balance of a final ledger account. One operation may be applying the balance updates on the final ledger account to the containers in the final-account hierarchy, e.g., all of its parent and an aggregation record. In particular embodiments, the aggregation record may be a container balance record of all accounts of the balance type of the final ledger account (i.e., the balance of all settlement accounts under a given container). For this operation, the ledger account representing the resource account may be a final ledger account in the account ledger. The receiver processor 140 may identify one or more container ledger accounts associated with the final ledger account. The receiver processor 140 may then record a third update in the account ledger. Recording the third update may comprise, for each of the one or more container ledger accounts, recording the unique transaction group identifier in association with the third update and the container ledger account, and modifying a balance value of the container ledger account in the account ledger based on the modification of the balance value of the final ledger account. In particular embodiments, the balance value of the final ledger account may be associated with a balance value type. The one or more container ledger accounts may be identified based on the associated balance value type. Correspondingly, recording the third update may further comprise recording, for each of the one or more container ledger accounts, an idempotency record comprising a first mapping of the container ledger account to a unique container ledger account identifier (i.e., container ledger account UUID), a unique final ledger account identifier (i.e., final ledger account UUID) associated with the final ledger account, the unique transaction group identifier (i.e., transaction group UUID), and a first transaction identifier (i.e., transaction UUID) associated with the first transaction. In particular embodiments, this operation may be performed once by transactionally writing both updates along with an idempotency record, which may be a mapping of the container ledger account UUID to the UUID of the final account whose balance is being impacted and the transaction group and transaction UUIDs.

Another operation may be snapshotting the balances. In particular embodiments, the ledger account may be associated with a unique ledger account identifier (i.e., ledger account UUID). The modification of the balance value of the ledger account may be associated with a balance-update time. Accordingly, recording the first update may further comprise recording a first mapping of the ledger account to the balance-update time, the balance value associated with the balance-update time, and a first transaction identifier associated with the first transaction. The account ledger 740 may record a new entry in the account ledger 740 to provide a mapping of the ledger account to the balance update time, and the ledger account to the transaction (ISO8503) UUID. This may enable the account ledger 740 to perform lookups of the balance of an account by date and by transaction UUID. In particular embodiments, the receive processor 140 may receive a query for the balance value of the ledger account at a particular balance-update time. The query may comprise one or more of a balance-update time, a balance value, a ledger account identifier, and a transaction identifier. Responsively, the receiver processor 140 may determine the balance value of the resource account associated with the particular balance-update time based on the first mapping of the ledger account.

Figure 9:
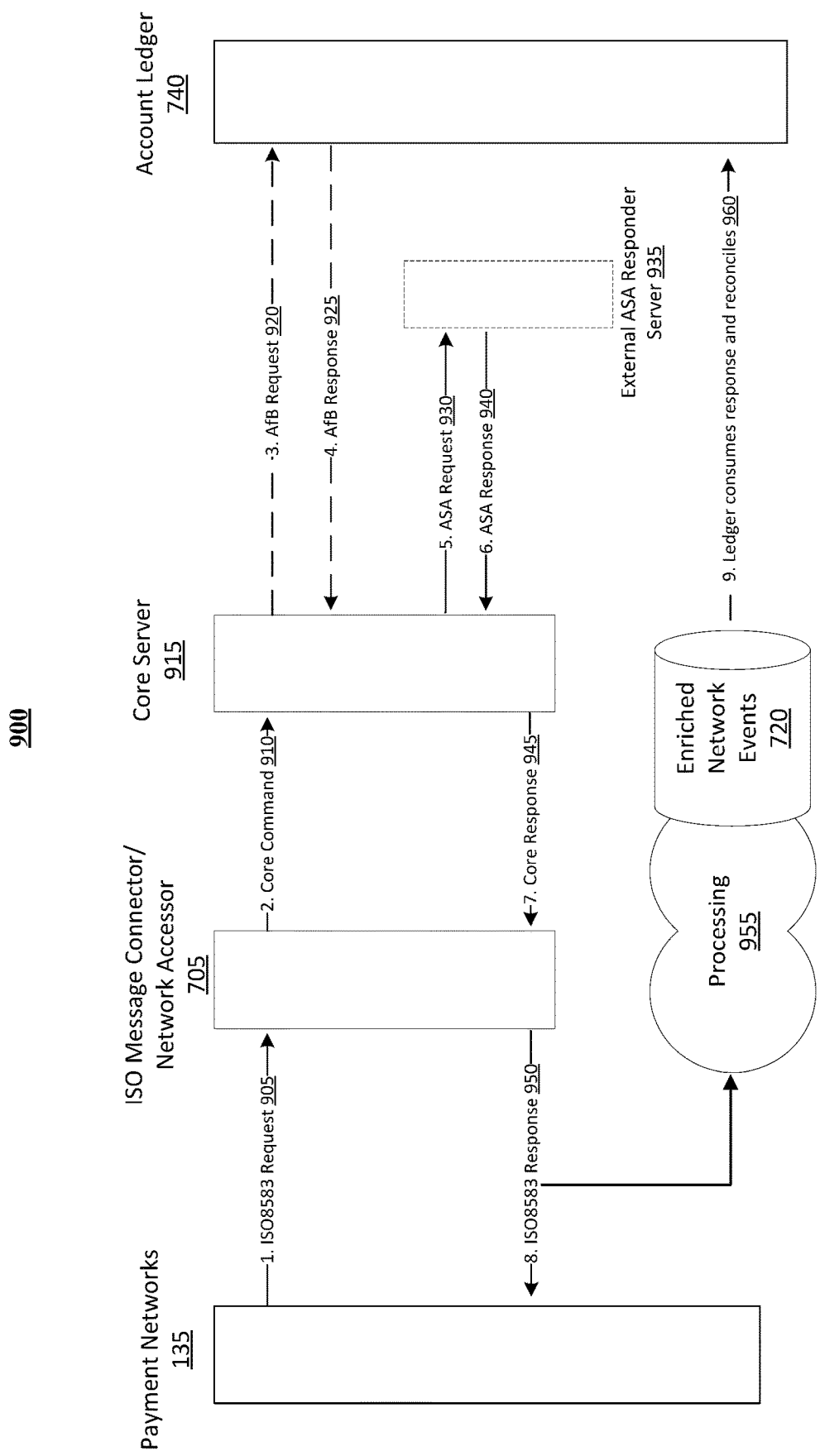
FIG. 9 illustrates an example sequence diagram for ledgering events from the payment networks.

FIG. 9 illustrates an example sequence diagram 900 for ledgering events from the payment networks 135. In particular embodiments, at step 1, the ISO message connector 705a or network accessor 705b may receive an ISO8583 request 905. At step 2, the ISO message connector 705a or network accessor 705b may send a core command 910 to the core server 915 associated with the receiver processor 140. In particular embodiments, at step 3, the core server 915 may send an AfB request 920 to the account ledger 740 (i.e., to request the account ledger 740 to process the ISO8583 request 905 via the AfB flow 800). At step 4, the account ledger 740 may return an AfB response 925. In particular embodiments, at step 5, the core server 915 may send an authorization stream access (ASA) request 930 to an external ASA responder 935. At step 6, the external ASA responder 935 may return an ASA response 940 to the core server 915. More information on authorization stream access (ASA) may be found in U.S. patent application Ser. No. 17/859,977, filed 7 Jul. 2022, which is incorporated by reference. At step 7, the core server 915 may return a core response 945 to the ISO message receiver 705a or network accessor 705b. The core response 945 may be generated based on the ASA response 940. At step 8, the ISO message receiver 705a or network accessor 705b may send an ISO8583 response 950 to the payment networks 135. The ISO8583 response 950 may be generated based on the core response 945. In particular embodiments, the ISO8583 response 950 may go through processing 955 to the enriched network events 720. In particular embodiments, at step 9, the account ledger 740 may consume the response and reconcile 960 since the ASA response 940 from the external ASA responder 935 and the AfB response 925 from the account ledger 740 may conflict. The two responses may be identified by their shared identifier (UUID) and the transaction in the account ledger 740 may be updated with the final decision that was sent to the payment networks 135.

As described at steps 5, 6, and 9 in FIG. 9, the receiver processor 140 may send, upon recording the first update in the account ledger, to an external server associated with a payment processor, an external authorization request for the first transaction. The receiver processor 140 may then receive, from the external server, an external authorization response declining authorization for the first transaction. The response may be generated based on a customized transaction schema associated with the payment processor. The receiver processor 140 may further reconcile the first update in the account ledger based on the external authorization response. As an example and not by way of limitation, reconciling the first update in the account ledger may comprise reversing the modification of the balance value of the ledger account in the account ledger.

Figure 10:
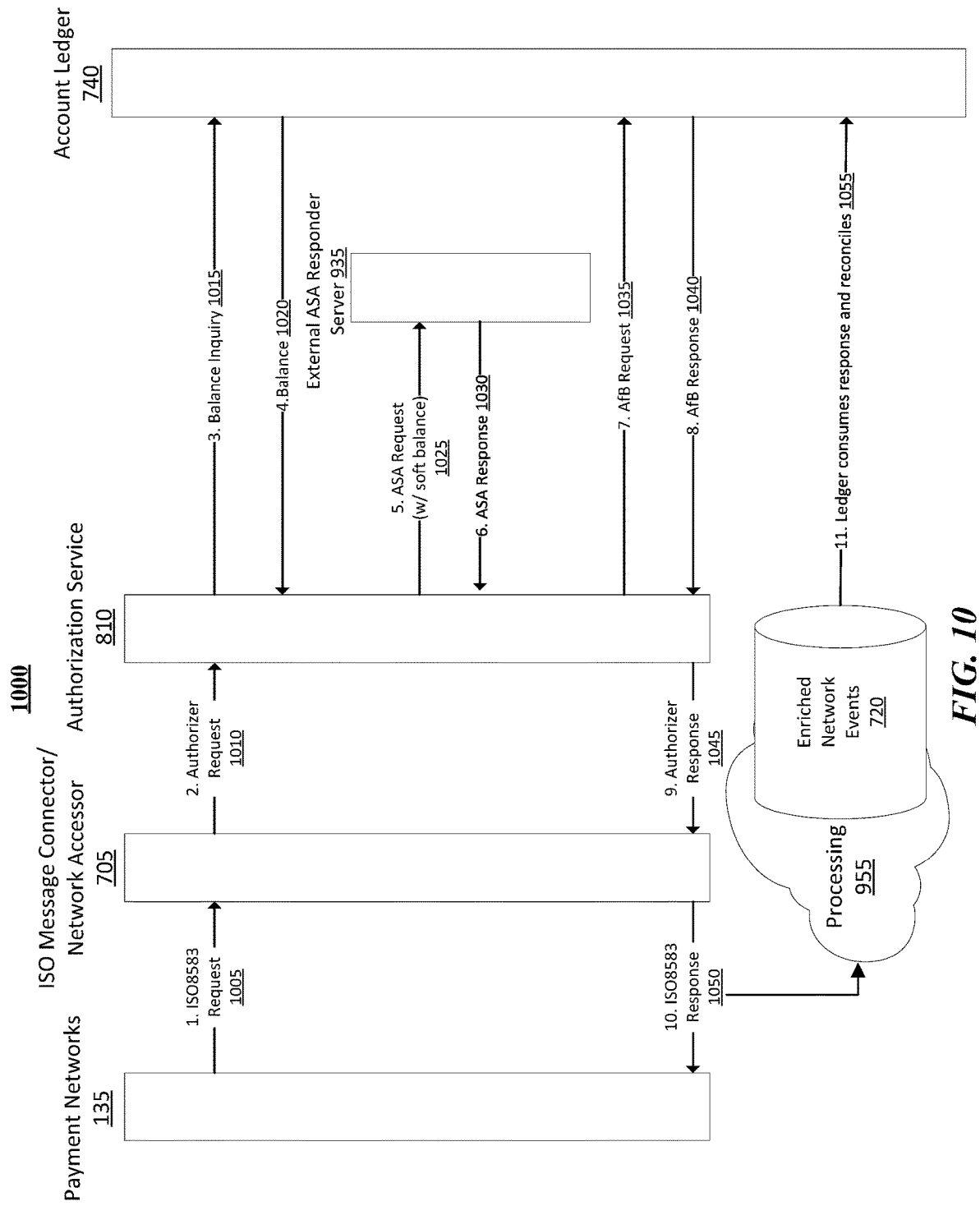
FIG. 10 illustrates another example sequence diagram for ledgering events from the payment networks.

FIG. 10 illustrates another example sequence diagram 1000 for ledgering events from the payment networks 135. In particular embodiments, at step 1, the ISO message receiver 705a or network accessor 705b may receive an ISO8583 request 1005 from the payment networks 135. At step 2, the ISO message receiver 705a or network accessor 705b may send an authorizer request 1010 to the authorization service 810. In particular embodiments, at step 3, the authorization service 810 sends a balance inquiry 1015 to the account ledger 740. At step 4, the account ledger 740 may return the balance 1020 to the authorization service 810. In particular embodiments, at step 5, the authorization service 810 may send an authorization stream access (ASA) request with soft balance 1025 to the external ASA responder 935. At step 6, the external ASA responder 935 may return an ASA response 1030 to the authorization service 810. At step 7, the authorization service 810 may send an AfB request 1035 to the account ledger 740. At step 8, the account ledger 740 may return an AfB response 1040. At step 9, the authorization service 810 may return an authorizer response 1045 to the ISO message receiver 705a or network accessor 705b. The authorizer response 1045 may be generated based on the AfB response 1040. At step 10, the ISO message receiver 705a or network accessor 705b may send an ISO8583 response 1050 to the payment networks 135. The ISO8583 response 1050 may be generated based on the authorizer response 1045. In particular embodiments, the ISO8583 response 1050 may go through processing 955 to the enriched network events 720. In particular embodiments, at step 11, the account ledger 740 may consume the response and reconcile 1055 if the ASA response 1030 from the external ASA responder 935 and the AfB response 1040 from the account ledger 740 conflicts. The two responses may be identified by their shared identifier (UUID) and the transaction in the account ledger 740 may be updated with the final decision that was sent to the payment networks 135.

As described at steps 5-6 in FIG. 10, the receiver processor 140 may send, prior to authorizing the transfer of resources, to an external server associated with a payment processor, an external authorization request for the first transaction. The receiver processor 140 may then receive, from the external server, an external authorization response authorizing the first transaction. In particular embodiments, the external authorization response may be generated based on a customized transaction schema associated with the payment processor. The transfer of resources may be authorized based at least in part on the external authorization response from the external server.

Figure 11:
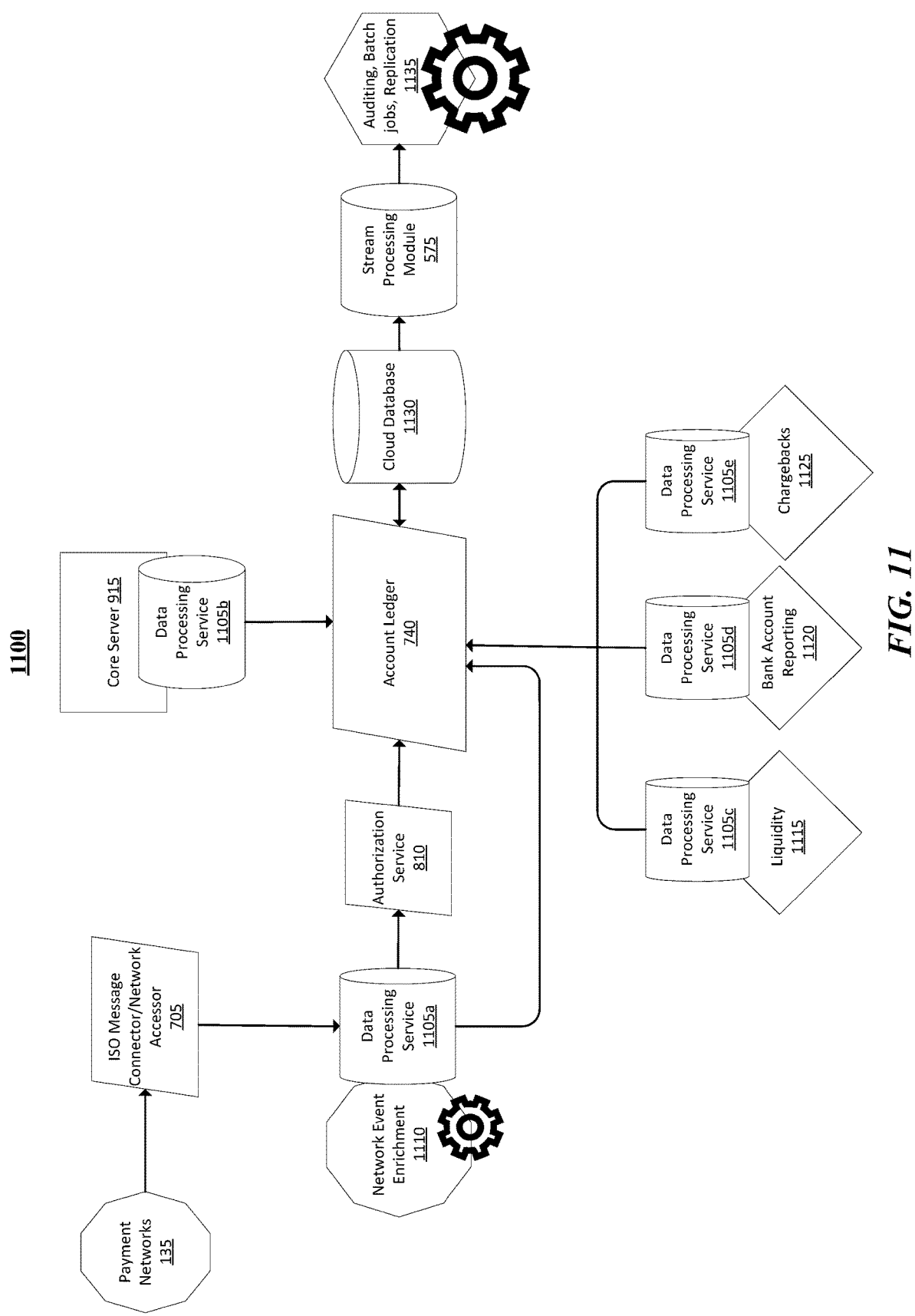
FIG. 11 illustrates an example flow diagram for processing ISO8583 transactions by the account ledger in the ecosystem associated with the receiver processor.

FIG. 11 illustrates an example diagram flow 1100 for processing ISO8583 transactions by the account ledger in the ecosystem associated with the receiver processor 140. In particular embodiments, the ISO message receiver 705a or network accessor 705b may receive ISO8583 messages from the payment networks 135. The ISO message receiver 705a or network accessor 705b may then publish the messages to a data processing service 1105a. In particular embodiments, the data processing service 1105a may call a module of network event enrichment 1110 to remove sensitive data from the messages received from the ISO message receiver 705a or network accessor 705b. The data processing service 1105a may send requests to the authorization service 810 to authorize the transactions. Asynchronously, the data processing service 1105a may send advice and non-authorization related messages determined based on the balance to the account ledger 740. In particular embodiments, the account ledger 740 may also receive instance, programs, and cards, etc. from a data processing service 1105b associated with the core server 915.

In particular embodiments, a data processing service 1105c may access liquidity 1115 and send the processed liquidity data to the account ledger 740. A data processing service 1105d may access bank account reporting 1120 and send the processed reporting data to the account ledger 740.

A data processing service 1105e may access chargebacks 1125 and send the processed chargeback data to the account ledger 740. In particular embodiments, the chargebacks 1125 may automate the issuing of provisional products and limit the exposure of the receiver processor 140.

In particular embodiments, the account ledger 740 may write the processed transactions to the cloud database 1130. The asynchronous stream processing module 575 may consume from the cloud database 1130. In particular embodiments, the output from the asynchronous stream processing module 575 may be used for auditing, batch jobs, replication 1135. In particular embodiments, the account ledger 740 may be configured to generate reports based on data recorded in the account ledger 740. As an example and not by way of limitation, each report may comprise recorded data associated with one or more of authorizations of transfers of resources, updates, final ledger accounts, container ledger accounts, ledger account balance values, balance-update times, and unique identifiers associated with transactions, transaction groups, updates, final ledger accounts, and container ledger accounts. As a result, the embodiments disclosed herein may have a technical advantage of producing accurate real-time and historical balances with transaction attribution for all accounts within the account ledger, which may further help with auditing, billing, transaction processing and customer APIs.

The example diagram flow 1100 in FIG. 11 may correspond to the following embodiments. The receiver processor 140 may firstly receive a first network event corresponding to an authorized transaction associated with a transfer of resources between a first resource account and a third party. The first network event may be assigned a unique transaction identifier associated with the first transaction. The receiver processor 140 may then record a first update in an account ledger. Recording the first update may comprise recording the unique transaction identifier in association with the first update and a final ledger account in the account ledger. In particular embodiments, the final ledger account may represent the resource account in the account ledger, and modifying the balance value of the final ledger account in the account ledger based on a transfer value associated with the transfer of resources. The receiver processor 140 may then detect, via an asynchronous data stream processing module, the modification to the balance value of the final ledger account in the account ledger. The receiver processor 140 may then identify one or more container ledger accounts associated with the final ledger account. The receiver processor 140 may further record a second update in the account ledger. Recording the second update may comprise, for each of the one or more container ledger accounts, recording the unique transaction identifier in association with the second update and the container ledger account, and modifying the balance value of the container ledger account in the account ledger based on the modification to the balance value of the final ledger account.

The following describes example scenarios of account ledger 740 for charge backs. In a first scenario, a provisional credit is issued to a cardholder and no chargeback is filed. When a cardholder files a chargeback and the issuer deems it credible, the issuer may credit the cardholder while the issuer works behind the scenes filing the chargeback with the networks. If the chargeback is lost (i.e., the merchant wins), the provisional credit may be pulled back from the cardholder. In the first scenario, the cardholder is issued a provisional credit, and no chargeback is actually filed with the payment networks 135. This may usually happen when a cardholder opens a chargeback for a small-amount (e.g., $5) transaction, and it is cheaper to just give the cardholder money. The ledger entries for the first scenario may include a $5 debit for the enterprise client's (which issued the card to the cardholder) settlement account and a $5 credit for the cardholder's spend account. Note that this may be the same as the high level "transfer" endpoint that is exposed via the public API. The enterprise client is moving funds from their program-level settlement account to the cardholder's account.

In a second scenario, a provisional credit is issued to the cardholder, but the chargeback is lost. The cardholder files chargeback (e.g., for $599), for which the program/instance issues a provisional credit to the cardholder. However, several weeks later, the chargeback is lost (i.e., the merchant provides sufficient evidence that goods/services are delivered to the cardholder). In the second scenario, at step 1, the cardholder is issued a provisional credit. Correspondingly, the ledger entries may include a $599 debit for the enterprise client's settlement account and a $599 credit for the cardholder's spend account. At step 2, the chargeback is filed with the payment network 135 and the cardholder receives a pre-arbitration credit. When a cardholder files a chargeback with the payment network 135, they receive a pre-arbitration credit. If the merchant disputes the chargeback and wins, the pre-arbitration credit is returned. For step 2, the ledger entries may include $599 debit for network payables associated with the network provider and $599 credit for the client's settlement account. At step 3, the payment network 135 sides with the merchant and the pre-arbitration credit is returned. Correspondingly, the ledger entries may include $599 debit for the client's settlement account and $599 credit for network payables associated with the network provider. At step 4, the provisional credit is revoked from the cardholder. Correspondingly, the ledger entries may include $599 debit for the cardholder's spend account and $599 credit for the client's settlement account.

In a third scenario, a provisional credit is issued to the cardholder and the cardholder won the chargeback. At step 1, the cardholder is issued a provisional credit. Correspondingly, the ledger entries may include a $599 debit for the enterprise client's settlement account and a $599 credit for the cardholder's spend account. At step 2, the chargeback is filed with the payment network 135 and the cardholder receives a pre-arbitration credit. Correspondingly, the ledger entries may include $599 debit for network payables associated with the network provider and $599 credit for the client's settlement account.

Figure 12:
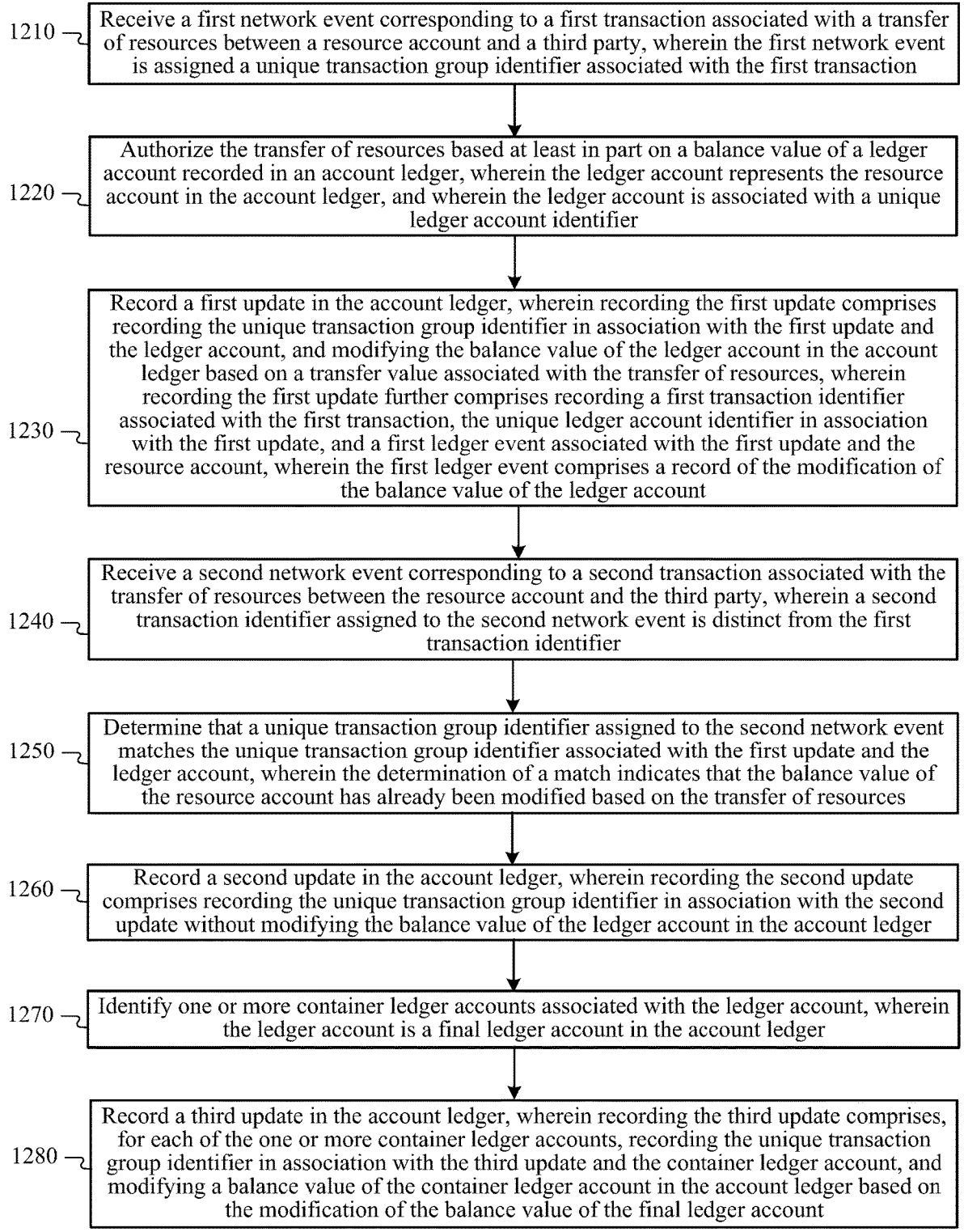
FIG. 12 illustrates an example method for processing transactions with idempotency in real-time ledgers.

FIG. 12 illustrates an example method 1200 for processing transactions with idempotency in real-time ledgers. The method may begin at step 1210, where the receiver processor 140 may receive a first network event corresponding to a first transaction associated with a transfer of resources between a resource account and a third party, wherein the first network event is assigned a unique transaction group identifier associated with the first transaction. At step 1220, the receiver processor 140 may authorize the transfer of resources based at least in part on a balance value of a ledger account recorded in an account ledger, wherein the ledger account represents the resource account in the account ledger, and wherein the ledger account is associated with a unique ledger account identifier. At step 1230, the receiver processor 140 may record a first update in the account ledger, wherein recording the first update comprises recording the unique transaction group identifier in association with the first update and the ledger account, and modifying the balance value of the ledger account in the account ledger based on a transfer value associated with the transfer of resources, wherein recording the first update further comprises recording a first transaction identifier associated with the first transaction, the unique ledger account identifier in association with the first update, and a first ledger event associated with the first update and the resource account, wherein the first ledger event comprises a record of the modification of the balance value of the ledger account. At step 1240, the receiver processor 140 may receive a second network event corresponding to a second transaction associated with the transfer of resources between the resource account and the third party, wherein a second transaction identifier assigned to the second network event is distinct from the first transaction identifier. At step 1250, the receiver processor 140 may determine that a unique transaction group identifier assigned to the second network event matches the unique transaction group identifier associated with the first update and the ledger account, wherein the determination of a match indicates that the balance value of the resource account has already been modified based on the transfer of resources. At step 1260, the receiver processor 140 may record a second update in the account ledger, wherein recording the second update comprises recording the unique transaction group identifier in association with the second update without modifying the balance value of the ledger account in the account ledger. At step 1270, the receiver processor 140 may identify one or more container ledger accounts associated with the ledger account, wherein the ledger account is a final ledger account in the account ledger. At step 1280, the receiver processor 140 may record a third update in the account ledger, wherein recording the third update comprises, for each of the one or more container ledger accounts, recording the unique transaction group identifier in association with the third update and the container ledger account, and modifying a balance value of the container ledger account in the account ledger based on the modification of the balance value of the final ledger account. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for processing transactions with idempotency in real-time ledgers including the particular steps of the method of FIG. 12, this disclosure contemplates any suitable method for processing transactions with idempotency in real-time ledgers including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
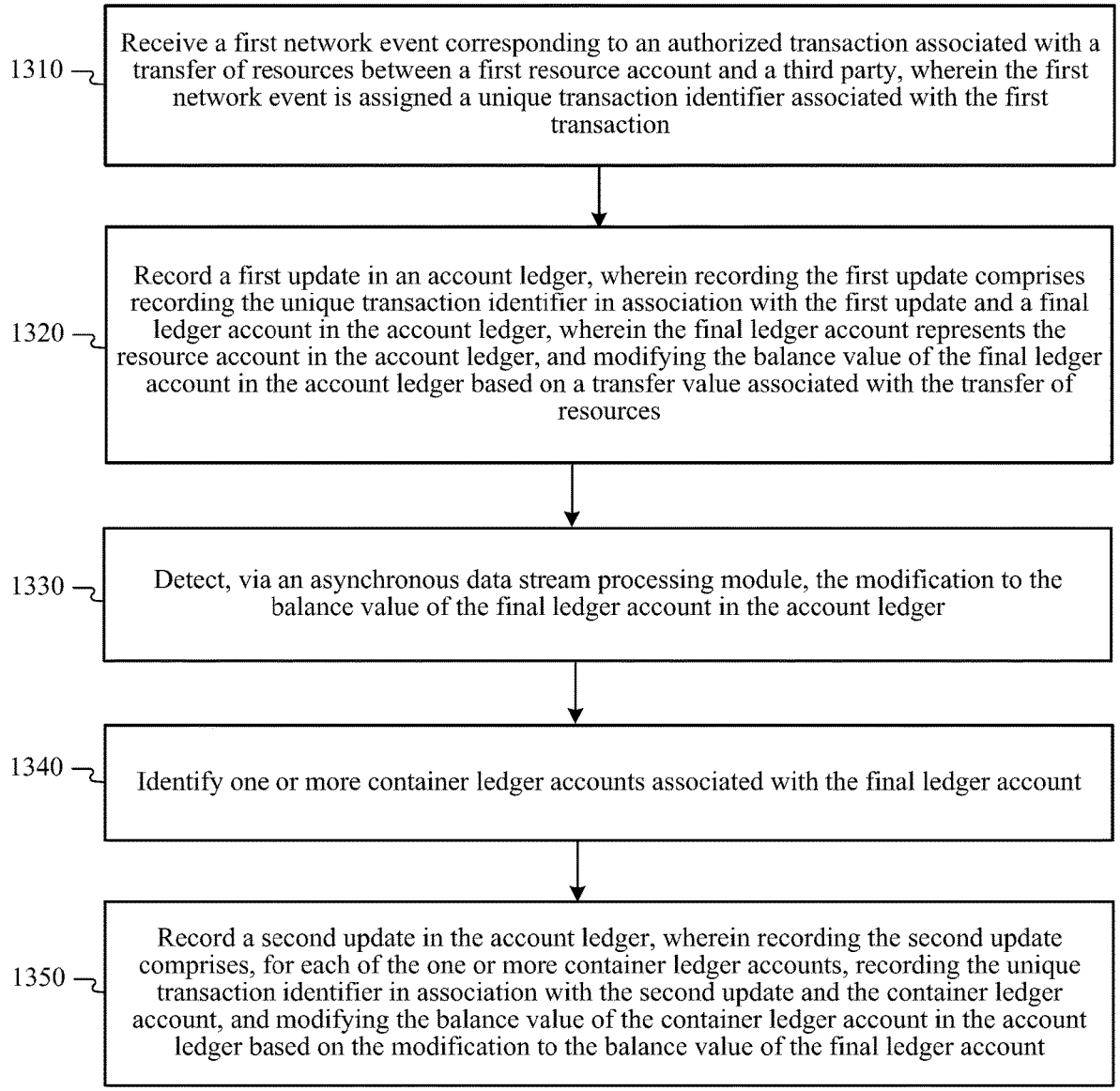
FIG. 13 illustrates another example method for processing transactions with idempotency in real-time ledgers.

FIG. 13 illustrates another example method 1300 for processing transactions with idempotency in real-time ledgers. The method may begin at step 1310, where the receiver processor 140 may receive a first network event corresponding to an authorized transaction associated with a transfer of resources between a first resource account and a third party, wherein the first network event is assigned a unique transaction identifier associated with the first transaction. At step 1320, the receiver processor 140 may record a first update in an account ledger, wherein recording the first update comprises recording the unique transaction identifier in association with the first update and a final ledger account in the account ledger, wherein the final ledger account represents the resource account in the account ledger, and modifying the balance value of the final ledger account in the account ledger based on a transfer value associated with the transfer of resources. At step 1330, the receiver processor 140 may detect, via an asynchronous data stream processing module, the modification to the balance value of the final ledger account in the account ledger. At step 1340, the receiver processor 140 may identify one or more container ledger accounts associated with the final ledger account. At step 1350, the receiver processor 140 may record a second update in the account ledger, wherein recording the second update comprises, for each of the one or more container ledger accounts, recording the unique transaction identifier in association with the second update and the container ledger account, and modifying the balance value of the container ledger account in the account ledger based on the modification to the balance value of the final ledger account. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for processing transactions with idempotency in real-time ledgers including the particular steps of the method of FIG. 13, this disclosure contemplates any suitable method for processing transactions with idempotency in real-time ledgers including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Dual-Table Ledgering for Privacy-Protected VBAN Transactions

In particular embodiments, the receiver processor 140 may attribute millions of transactions to a diverse set of financial accounts. Such transactions may follow different flows and affect different accounts based on customer and internal configurations. The receiver processor 140 may attribute transactions, aid in transaction processing by decisioning on balances, produce accurate balances and model all money movements. In particular embodiments, the financial accounts may include virtual accounts. Because virtual accounts may contain sensitive data, and because certain real-time ledger data may be intended to be available to downstream consuming modules, the receiver processor 140 may utilize a virtual-account table separate from the real-time ledger to permit accurate tracking of virtual accounts, virtual-account transactions, and any related containers/programs in the ledger without compromising the sensitive virtual-account data. More information on virtual accounts may be found in U.S. patent application Ser. No. 17/859,943, filed 7 Jul. 2022, and U.S. patent application Ser. No. 17/859,954, filed 7 Jul. 2022, each of which is incorporated by reference. Although this disclosure describes ledgering particular accounts by particular processors in a particular manner, this disclosure contemplates ledgering any suitable account by any suitable processor in any suitable manner.

In particular embodiments, the receiver processor 140 may receive a request to generate a virtual bank account (VBAN) associated with a user. The receiver processor 140 may then identify, from an account ledger 740, a unique container ledger account identifier associated with a VBAN container ledger account, and a unique final ledger account identifier associated with a final ledger account. In particular embodiments, the VBAN container ledger account and the final ledger account may be associated with a resource account. The receiver processor 140 may then generate a unique VBAN account number for a first VBAN associated with the user. In particular embodiments, the first VBAN may be associated with the final ledger account and the VBAN account number may be based at least in part on the unique container ledger account identifier. The receiver processor 140 may then record, in a privacy table separate from the account ledger, a VBAN record for the first VBAN. The VBAN record may comprise the unique container ledger account identifier, the unique final ledger account identifier, the unique VBAN account number for the first VBAN, and a routing number associated with the first VBAN. In particular embodiments, the receiver processor 140 may further transmit, to the user, the unique VBAN account number for the first VBAN and the routing number associated with the first VBAN.

In particular embodiments, the VBAN container ledger account may be associated with a program ledger account and the program ledger account may be associated with a unique program ledger account identifier (i.e., program UUID). The program ledger account may represent the resource account in the account ledger. In particular embodiments, the program ledger account, the resource account, and the user may be associated with a first entity. The VBAN container ledger account may be associated with the user. The final ledger account and the first VBAN may be associated with the user and a receiving party.

In particular embodiments, creating a VBAN may require a program UUID and a linked ledger account UUID (e.g., an enterprise customer's settlement account). During VBAN creation, the following may occur. The receiver processor 140 may first fetch the program to retrieve the container UUID for the program's VBAN's. The receiver processor 140 may then fetch the program's reserved block. As an example and not by way of limitation, the reserved block may be the first 5-digits of the account number. If the reserved block does not exist, the receiver processor 140 may create one. The receiver processor 140 may further generate a random account number for the VBAN, starting with the 5-digit program block. As described above, generating the unique VBAN account number may comprise the following steps. In particular embodiments, the receiver processor 140 may determine a plurality of reserved block digits associated with the unique program ledger account identifier. In particular embodiments, the receiver processor 140 may further generate a plurality of random digits, wherein the unique VBAN account number is based on the plurality of reserved block digits and the plurality of random digits.

In particular embodiments, the VBAN account number for the first VBAN and the routing number associated with the first VBAN may be determined to be a unique combination of an account number combined with a routing number. In particular embodiments, the combination may be determined to be unique based in part on the VBAN account number for the first VBAN being a unique account number within the privacy table, and further based in part on the routing number associated with the first VBAN being unique to an entity associated with the receiver processor 140. In particular embodiments, the receiver processor 140 may generate an insert query of an account number reservation. The account number reservation may be a record used to ensure that each combination of routing number and account number is only used once. If a combination is not unique, the entire write may fail.

Table 12 illustrates an example VBAN privacy table. As an example and not by way of limitation, the VBANs may have account numbers that are 15 digits long. The receiver processor 140 may reserve a random unique 5-digit block for each program and randomly generate the remaining 9 digits for any account. The combination of the program block (first 6 digits) and the account block (9 digits) may be unique.

TABLE 12

Example VBAN privacy table.

| Entity | PK | SK | Notes |
|---|---|---|---|
| Program Block Reservation (PBR) | PBR | {5_digit_number} | Used to ensure uniqueness of block |
| Program Block Mapping | PB# (program_uuid} | {5_digit_number} | Used to map a program to 1+ program blocks (currently only 1 is ever generated) |
| Account Number Reservation | AN# {routing_number} | {account_number} | Used to ensure uniqueness of RTN + Account number combination |
| VBAN | VBAN# {program_uuid} | {linked_account_uuid}# {vban_uuid} | Used to retrieve a VBAN via the linked ledger account. |

In particular embodiments, a VBAN record for the VBAN table may be a record containing VBAN-specific metadata (e.g., account number, routing number) and the linked ledger account UUID. The VBAN record may also provide the mapping of the linked ledger account to VBAN. By storing this in a separate table (i.e., the privacy table), the receiver processor 140 may avoid leaking such data downstream. In particular embodiments, the receiver processor 140 may report, via an asynchronous data stream processing module 575, one or more of data associated with the VBAN container ledger account, data associated with the final ledger account, and data associated with the resource account. Sensitive data associated with the first VBAN recorded in the privacy table may be not accessible in the reported data. As an example and not by way of limitation, the sensitive VBAN data may be omitted from the reported data or redacted in the reported data. In particular embodiments, the sensitive data associated with the first VBAN may comprise the unique VBAN account number for the first VBAN and the routing number associated with the first VBAN. As a result, the embodiments disclosed herein may have a technical advantage of enhancing data security as the VBAN record containing sensitive data is stored in a separate table (i.e., the privacy table), thereby preventing such data being leaked downstream.

In particular embodiments, the receiver processor 140 may receive a query associated with the VBAN record. The receiver processor 140 may then identify the VBAN record based on one or more of the unique container ledger account identifier, the unique final ledger account identifier, the unique VBAN account number for the first VBAN, and the routing number associated with the first VBAN.

In particular embodiments, the receiver processor 140 may receive, from an external server, a transaction authorization request to authorize a transaction associated with a transfer of resources to a receiving entity from the resource account. The receiver processor 140 may then retrieve, from a VBAN database, a transaction resource configuration of the first VBAN for transactions associated with the receiving entity and the user. In particular embodiments, the transaction resource configuration may be decoupled from the resource account. The receiver processor 140 may then determine whether one or more parameters of the transaction resource configuration are satisfied based on metadata associated with the transaction authorization request. The receiver processor 140 may further transmit, to the external server, responsive to determining whether the one or more parameters of the transaction resource configuration are satisfied, a transaction authorization response indicating whether the transaction is authorized. In particular embodiments, the transaction being authorized may cause a balance value associated with the resource account to be reduced based on the transfer of resources associated with the transaction.

In particular embodiments, the receiver processor 140 may receive a first network event corresponding to a first transaction associated with a transfer of resources between the resource account and a third party. The first network event may be assigned a unique transaction group identifier associated with the first transaction. The receiver processor 140 may then identify, from the privacy table, based on the unique ledger account identifier associated with the resource account, the VBAN record for the first VBAN. In particular embodiments, the receiver processor 140 may retrieve, from a virtual account database, a transaction resource configuration associated with the first VBAN for transactions associated with the resource account and the third party. The transaction resource configuration may be decoupled from the resource account. In particular embodiments, the receiver processor 140 may further authorize the transfer of resources based on a determination that one or more parameters of the transaction resource configuration are satisfied based on metadata associated with the first transaction. Authorizing the transfer of resources may be further based on a balance value of the final ledger account. In particular embodiments, authorizing the transfer of resources may cause the balance value of the final ledger account to be modified based on a transfer value associated with the transfer of resources.

In particular embodiments, the primary table in the account ledger 740 may comprise a VBAN-ledger record. The VBAN-ledger record may be a final ledger account under the program container with the same UUID as the VBAN-record in the VBAN privacy table. The VBAN-ledger record may be the record used to keep track of balances. Therefore, the VBAN-ledger record may be an effective solution for addressing the technical challenge of accurate mapping between a VBAN and a ledger account. In particular embodiments, the receiver processor 140 may record a first update in the account ledger. Recording the first update may comprise recording the unique transaction group identifier in association with the first update and the resource account, and modifying the balance value of the resource account in the account ledger 740 based on a transfer value associated with the transfer of resources. In particular embodiments, the receiver processor 140 may then receive a second network event corresponding to a second transaction associated with the transfer of resources between the resource account and the third party. The receiver processor 140 may determine that a unique transaction group identifier assigned to the second network event matches the unique transaction group identifier associated with the first update and the resource account. In particular embodiments, the determination of a match may indicate that the balance value of the resource account has already been modified based on the transfer of resources. The receiver processor 140 may further record a second update in the account ledger 740, wherein recording the second update comprises recording the unique transaction group identifier in association with the second update without modifying the balance value of the resource account in the account ledger 740.

In particular embodiments, authorizing the transfer of resources may be further based on a balance value of the VBAN container ledger account. Correspondingly, authorizing the transfer of resources may cause the balance value of the VBAN container ledger account to be modified based on the transfer value associated with the transfer of resources. In particular embodiments, authorizing the transfer of resources may be further based on a balance value of the program ledger account. Correspondingly, authorizing the transfer of resources may cause the balance value of the program container ledger account to be modified based on the transfer value associated with the transfer of resources.

In particular embodiments, modifying the balance values of the VBAN container ledger account and the program ledger account may comprise the following steps. The receiver processor 140 may detect, via an asynchronous data stream processing module 575, the modification to the balance value of the final ledger account in the account ledger 740. The receiver processor 140 may then identify the VBAN container ledger account and the program ledger account as being associated with the final ledger account.

In particular embodiments, the modification of the balance value of the final ledger account may be associated with a balance-update time recorded in the account ledger 740. The receiver processor 140 may receive a query for the balance value of the final ledger account at a particular balance-update time. In particular embodiments, the query may comprise one or more of a balance-update time, a balance value, a final ledger account identifier, a transaction group identifier, and data associated with the first VBAN. The receiver processor 140 may further determine the balance value of the final resource account at the particular balance-update time in response to the query.

FIGS. 14A-14D illustrate example ledger events for the pre-paid program via the single message flow. Funds may be pushed/pulled from the customer through ACH to a virtual bank account number (VBAN), held for a number of days to de-risk, released, and made immediately available to transact on. FIG. 14A illustrates that program A loads $1000 through ACH into their settlement account. The ACH payment may be held for 3 days to de-risk. The ledger events may include a pending $1000 debit to the settlement VBAN account 1405 and a pending $1000 credit to the settlement account 1410. FIG. 14B illustrates that the ACH funds are released after 3 days. The ledger events may include reversing the pending debit/credit. The settlement VBAN account 1405 now has $1000 debit available and the settlement account 1410 now has $1000 credit available. FIG. 14C illustrates that a $200.00 settlement request is received on card 1415. As an example and not by way of limitation, the settlement request may be associated with an ATM transaction. The ledger events may include an available $50 debit to the settlement account 1410, then an available $50 credit to the card 1415, then an available $50 debit to the card 1415, and then an available $50 credit to the FIS (network provider) payable 1420. FIG. 14D illustrates that FIS drawdown for $50. The ledger events may include an available $50 debit to the FIS payable 1420 and an available $50 credit to the settlement VBAN 1405. As described above, the embodiments disclosed herein may have a technical advantage of enabling transaction authorization from a pre-paid balance.

FIGS. 15A-15D illustrate example ledger events for the pre-paid program via the dual message flow. FIG. 15A illustrates that program A is pre-funded through ACH and the ACH payment is held for 3 days to de-risk and be released. This also provides a technical advantage of decreased financial risk as the receiver processor 140 may allow for the holding/suspense of risky (e.g., ACH) transactions that take multiple days to settle. In this example, program A 1510 loads $1000 into their settlement account 1515. The ledger events may include a pending $1000 debit to the settlement VBAN 1520 and a pending $1000 credit to the settlement account 1515. FIG. 15B illustrates that the ACH funds are released after 3 days. The ledger events may include reversing the pending debit/credit. The settlement VBAN account 1520 now has $1000 debit available and the settlement account 1515 now has $1000 credit available. FIG. 15C illustrates that $100 authorization request is received on card 1525. The ledger events may include an available $50 debit to the settlement account 1515, then an available $50 credit to the card 1525, then an available $50 debit to the card 1525, and then an available $50 credit to the FIS payable 1530. FIG. 15D illustrates that $200 settlement advice is received on card 1520. The ledger events may include reversing pending debit/credit. The settlement account 1515 has $50 debit available. Then the card 1525 has $50 credit available. Then the card 1525 has $50 debit available. Then the FIS payable 1530 has $50 credit available.

FIG. 16 illustrates example ledger events for the post-paid program. In this example, the settlement account may be removed, and the program accounts receivables (A/R) may be added. With post-paid programs, the receive processor 140 may extend customers a line of credit and allow them to transact without pre-funding their account. Funds may be collected after through their virtual bank account number (VBAN).

Figure 17:
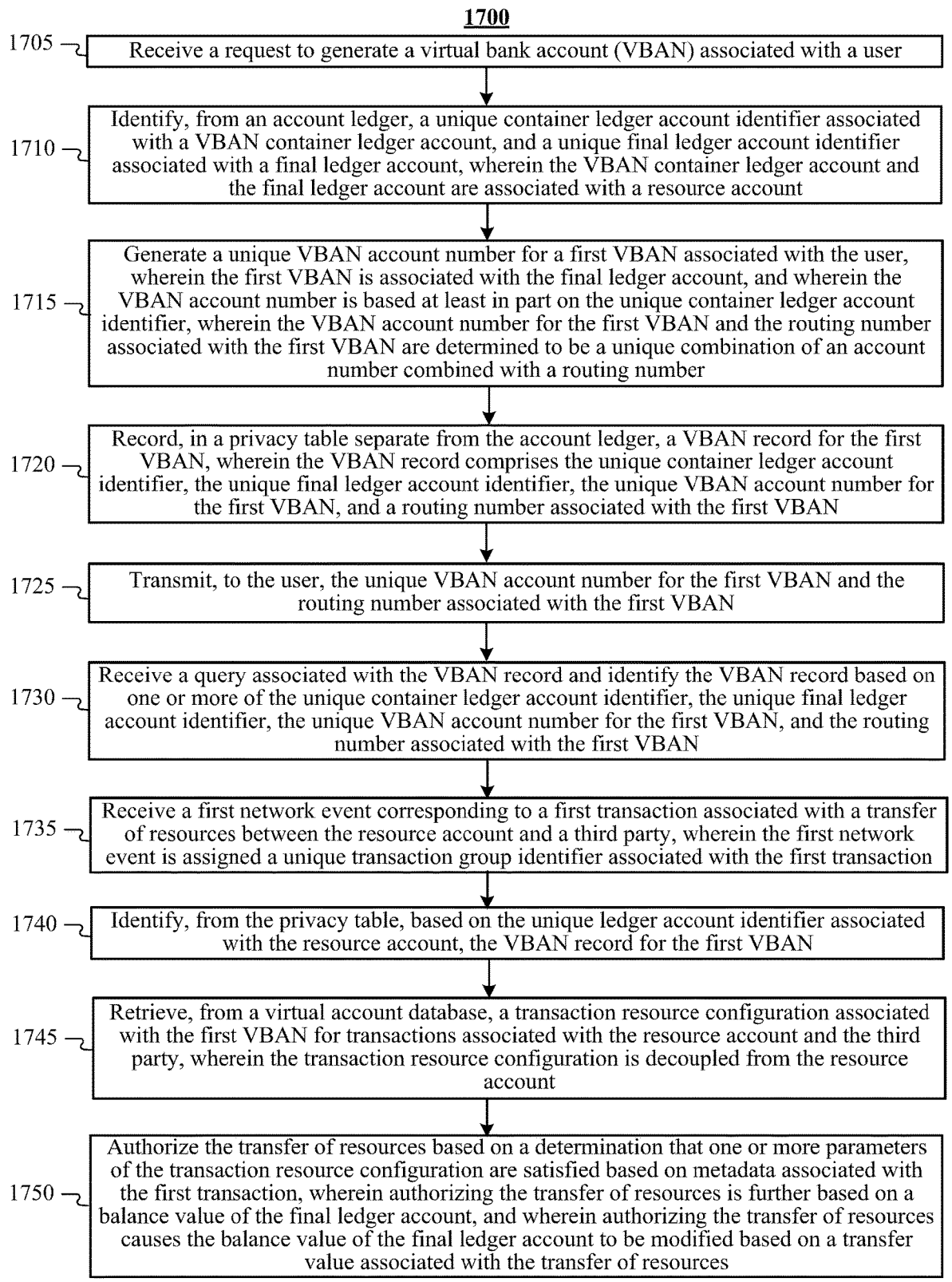
FIG. 17 illustrates an example method for dual-table ledgering for privacy-protected VBAN transactions.

FIG. 17 illustrates an example method 1700 for dual-table ledgering for privacy-protected VBAN transactions. The method may begin at step 1705, where the receiver processor 140 may receive a request to generate a virtual bank account (VBAN) associated with a user. At step 1710, the receiver processor 140 may identify, from an account ledger, a unique container ledger account identifier associated with a VBAN container ledger account, and a unique final ledger account identifier associated with a final ledger account, wherein the VBAN container ledger account and the final ledger account are associated with a resource account. At step 1715, the receiver processor 140 may generate a unique VBAN account number for a first VBAN associated with the user, wherein the first VBAN is associated with the final ledger account, and wherein the VBAN account number is based at least in part on the unique container ledger account identifier, wherein the VBAN account number for the first VBAN and the routing number associated with the first VBAN are determined to be a unique combination of an account number combined with a routing number. At step 1720, the receiver processor 140 may record, in a privacy table separate from the account ledger, a VBAN record for the first VBAN, wherein the VBAN record comprises the unique container ledger account identifier, the unique final ledger account identifier, the unique VBAN account number for the first VBAN, and a routing number associated with the first VBAN. At step 1725, the receiver processor 140 may transmit, to the user, the unique VBAN account number for the first VBAN and the routing number associated with the first VBAN. At step 1730, the receiver processor 140 may receive a query associated with the VBAN record and identify the VBAN record based on one or more of the unique container ledger account identifier, the unique final ledger account identifier, the unique VBAN account number for the first VBAN, and the routing number associated with the first VBAN. At step 1735, the receiver processor 140 may receive a first network event corresponding to a first transaction associated with a transfer of resources between the resource account and a third party, wherein the first network event is assigned a unique transaction group identifier associated with the first transaction. At step 1740, the receiver processor 140 may identify, from the privacy table, based on the unique ledger account identifier associated with the resource account, the VBAN record for the first VBAN. At step 1745, the receiver processor 140 may retrieve, from a virtual account database, a transaction resource configuration associated with the first VBAN for transactions associated with the resource account and the third party, wherein the transaction resource configuration is decoupled from the resource account. At step 1750, the receiver processor 140 may authorize the transfer of resources based on a determination that one or more parameters of the transaction resource configuration are satisfied based on metadata associated with the first transaction, wherein authorizing the transfer of resources is further based on a balance value of the final ledger account, and wherein authorizing the transfer of resources causes the balance value of the final ledger account to be modified based on a transfer value associated with the transfer of resources. Particular embodiments may repeat one or more steps of the method of FIG. 17, where appropriate. Although this disclosure describes and illustrates particular steps of the method of FIG. 17 as occurring in a particular order, this disclosure contemplates any suitable steps of the method of FIG. 17 occurring in any suitable order. Moreover, although this disclosure describes and illustrates an example method for dual-table ledgering for privacy-protected VBAN transactions including the particular steps of the method of FIG. 17, this disclosure contemplates any suitable method for dual-table ledgering for privacy-protected VBAN transactions including any suitable steps, which may include all, some, or none of the steps of the method of FIG. 17, where appropriate. Furthermore, although this disclosure describes and illustrates particular components, devices, or systems carrying out particular steps of the method of FIG. 17, this disclosure contemplates any suitable combination of any suitable components, devices, or systems carrying out any suitable steps of the method of FIG. 17.

Systems and Methods

Figure 18:
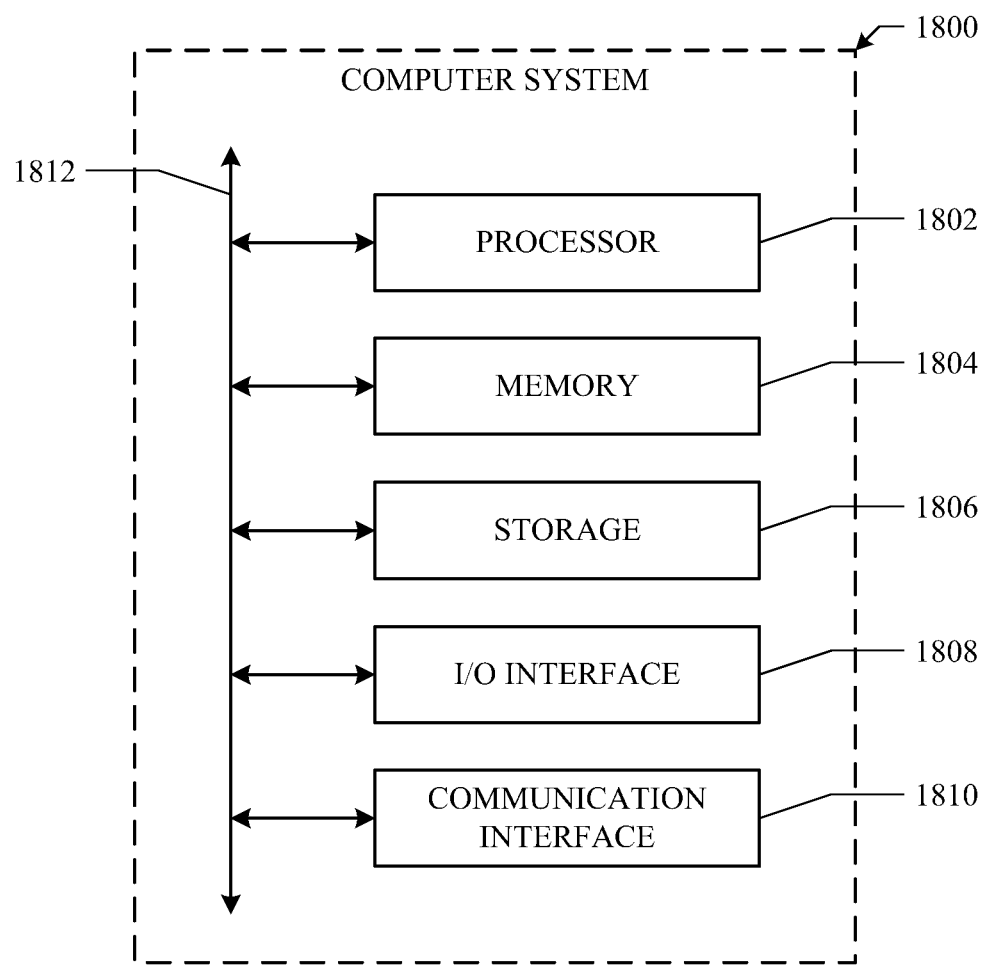
FIG. 18 illustrates an example computer system.

FIG. 18 illustrates an example computer system 1800. In particular embodiments, one or more computer systems 1800 perform one or more steps of one or more methods described or illustrated herein. In particular embodiments, one or more computer systems 1800 provide functionality described or illustrated herein. In particular embodiments, software running on one or more computer systems 1800 performs one or more steps of one or more methods described or illustrated herein or provides functionality described or illustrated herein. Particular embodiments include one or more portions of one or more computer systems 1800. Herein, reference to a computer system may encompass a computing device, and vice versa, where appropriate. Moreover, reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1800 may include one or more computer systems 1800; be unitary or distributed; span multiple locations; span multiple machines; span multiple data centers; or reside in a cloud, which may include one or more cloud components in one or more networks. Where appropriate, one or more computer systems 1800 may perform without substantial spatial or temporal limitation one or more steps of one or more methods described or illustrated herein. As an example and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing instructions, such as those making up a computer program. As an example and not by way of limitation, to execute instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor 1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs); be a multi-core processor; or include one or more processors 1802. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may include one or more memories 1804, where appropriate. Although this disclosure describes and illustrates particular memory, this disclosure contemplates any suitable memory.

In particular embodiments, storage 1806 includes mass storage for data or instructions. As an example and not by way of limitation, storage 1806 may include a hard disk drive (HDD), a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both, providing one or more interfaces for communication between computer system 1800 and one or more I/O devices. Computer system 1800 may include one or more of these I/O devices, where appropriate. One or more of these I/O devices may enable communication between a person and computer system 1800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may include one or more I/O interfaces 1808, where appropriate. Although this disclosure describes and illustrates a particular I/O interface, this disclosure contemplates any suitable I/O interface.

In particular embodiments, communication interface 1810 includes hardware, software, or both providing one or more interfaces for communication (such as, for example, packet-based communication) between computer system 1800 and one or more other computer systems 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example and not by way of limitation, bus 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may include one or more buses 1812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems associated with a receiver processor:
   receiving a first network event corresponding to a first transaction associated with a transfer of resources between a resource account and a third party, wherein the first network event is assigned a unique transaction group identifier associated with the first transaction by the receiver processor, wherein the resource account is associated with a client entity and issued by a receiver institution, wherein the first transaction is associated with publicly routable account credentials of the resource account, and wherein the unique transaction group identifier assigned by the receiver processor is associated with a plurality of network events;
   identifying, from an account ledger stored in an account ledger data storage, a virtual bank account (VBAN) container ledger account and a final ledger account, wherein the VBAN container ledger account represents a parent program container corresponding to the resource account on a hierarchical representation of accounts containing a plurality of final ledger accounts in the account ledger, wherein the final ledger account represents a leaf node on the hierarchical representation of accounts, wherein the final ledger account is issued by the receiver processor, and wherein the account ledger is configured as a privacy shield for financial data associated with the final ledger account;
   identifying, from a privacy table stored in a privacy data storage separate from the account ledger data storage, a VBAN record for a first VBAN associated with the final ledger account;
   retrieving, from a virtual account database, a transaction resource configuration for transactions associated with the first VBAN;
   authorizing the transfer of resources based at least in part on stored balance values of the VBAN container ledger account and the final ledger account and the retrieved transaction resource configuration;
   recording a first update in the account ledger, wherein recording the first update comprises recording the unique transaction group identifier in association with the first update and the VBAN container ledger account and final ledger account, and modifying the stored balance values of the VBAN container ledger account and final ledger account in the account ledger based on a transfer value associated with the transfer of resources;
   receiving a second network event corresponding to a second transaction associated with the transfer of resources between the resource account and the third party;
   determining that a unique transaction group identifier assigned to the second network event matches the unique transaction group identifier associated with the first update and the VBAN container ledger account and final ledger account, wherein the determination of a match indicates that the stored balance values of the VBAN container ledger account and final ledger account have already been modified based on the transfer of resources; and
   recording a second update in the account ledger, wherein recording the second update comprises recording the unique transaction group identifier in association with the second update without modifying the stored balance values of the VBAN container ledger account and final ledger account in the account ledger.

2. The method of claim 1, wherein recording the first update further comprises recording a first transaction identifier associated with the first transaction, and wherein a second transaction identifier assigned to the second network event is distinct from the first transaction identifier.

3. The method of claim 1, wherein the VBAN container ledger account is associated with a unique container ledger account identifier, and wherein recording the first update further comprises recording the unique container ledger account identifier in association with the first update.

4. The method of claim 1, wherein recording the first update further comprises recording a first ledger event associated with the first update and the resource account, and wherein the first ledger event comprises a record of the modification of the stored balance values of the VBAN container ledger account and final ledger account.

5. The method of claim 1, wherein the first ledger event specifies one or more of a collection type, a collection identifier, an item type, an item identifier, an item, or a Boolean representation indicating whether the first ledger event is out of order.

6. The method of claim 1, further comprising:
   sending, upon recording the first update in the account ledger, to an external server associated with a payment processor, an external authorization request for the first transaction;
   receiving, from the external server, an external authorization response declining authorization for the first transaction, wherein the response is generated based on a customized transaction schema associated with the payment processor; and
   reconciling the first update in the account ledger based on the external authorization response.

7. The method of claim 6, wherein reconciling the first update in the account ledger comprises reversing the modification of the stored balance values of the VBAN container ledger account and final ledger account in the account ledger.

8. The method of claim 1, further comprising:
   sending, prior to authorizing the transfer of resources, to an external server associated with a payment processor, an external authorization request for the first transaction; and
   receiving, from the external server, an external authorization response authorizing the first transaction, wherein the external authorization response is generated based on a customized transaction schema associated with the payment processor, and wherein the transfer of resources is authorized based at least in part on the external authorization response from the external server.

9. The method of claim 1, wherein the VBAN container ledger account is associated with a unique container ledger account identifier, wherein the modification of the stored balance value of the VBAN container ledger account is associated with a balance-update time, and wherein recording the first update further comprises recording a first mapping of the VBAN container ledger account to the balance-update time, the stored balance value associated with the balance-update time, and a first transaction identifier associated with the first transaction.

10. The method of claim 9, further comprising:
receiving a query for the stored balance value of the VBAN container ledger account at a particular balance-update time, wherein the query comprises one or more of a balance-update time, a stored balance value, a container ledger account identifier, and a transaction identifier; and
determining a balance value of the resource account associated with the particular balance-update time based on the first mapping of the VBAN container ledger account.

11. The method of claim 1, further comprising:
identifying one or more second container ledger accounts associated with the VBAN container ledger account and final ledger account; and
recording a third update in the account ledger, wherein recording the third update comprises, for each of the one or more second container ledger accounts, recording the unique transaction group identifier in association with the third update and the second container ledger account, and modifying a stored balance value of the second container ledger accounts in the account ledger based on the modification of the stored balance values of the VBAN container ledger account and final ledger account.

12. The method of claim 11, wherein the stored balance values of the VBAN container ledger account and final ledger account are associated with a balance value type, and wherein the one or more second container ledger accounts are identified based on the associated balance value type.

13. The method of claim 11, wherein recording the third update further comprises:
recording, for each of the one or more second container ledger accounts, an idempotency record comprising a first mapping of the second container ledger account to a unique VBAN container ledger account identifier associated with the VBAN container ledger account, a unique final ledger account identifier associated with the final ledger account, the unique transaction group identifier, and a first transaction identifier associated with the first transaction.

14. The method of claim 1, wherein the account ledger is configured to generate reports based on data recorded in the account ledger, wherein each report comprises recorded data associated with one or more of authorizations of transfers of resources, updates, final ledger accounts, container ledger accounts, ledger account balance values, balance-update times, and unique identifiers associated with transactions, transaction groups, updates, final ledger accounts, and container ledger accounts.

15. The method of claim 1, further comprising:
identifying, from the account ledger, a unique first container ledger account identifier associated with the VBAN container ledger account, and a unique final ledger account identifier associated with the final ledger account;
wherein the VBAN record comprises the unique first container ledger account identifier, the unique final ledger account identifier, a unique VBAN account number for the first VBAN, and a routing number associated with the first VBAN,
wherein the transaction resource configuration is decoupled from the resource account, wherein authorizing the transfer of resources is further based on determining that one or more parameters of the transaction resource configuration are satisfied based on metadata associated with the first transaction, and wherein authorizing the transfer of resources causes a balance value of the resource account to be reduced via the routing number associated with the first VBAN.

16. The method of claim 1, further comprising:
redacting sensitive data associated with the first or second network event.

17. The method of claim 1, wherein one or more of the first transaction and second transaction is associated with a non-financial activity.

18. The method of claim 1, wherein authorizing the transfer of resources is further based on one or more conformation checks of metadata associated with the first transaction against one or more rules.

19. One or more computer-readable non-transitory storage media embodying software that is operable when executed to:
receive a first network event corresponding to a first transaction associated with a transfer of resources between a resource account and a third party, wherein the first network event is assigned a unique transaction group identifier associated with the first transaction by a receiver processor, wherein the resource account is associated with a client entity and issued by a receiver institution, wherein the first transaction is associated with publicly routable account credentials of the resource account, and wherein the unique transaction group identifier assigned by the receiver processor is associated with a plurality of network events;
identify, from an account ledger stored in an account ledger data storage, a virtual bank account (VBAN) container ledger account and a final ledger account, wherein the VBAN container ledger account represents a parent program container corresponding to the resource account on a hierarchical representation of accounts containing a plurality of final ledger accounts in the account ledger, wherein the final ledger account represents a leaf node on the hierarchical representation of accounts, wherein the final ledger account is issued by the receiver processor, and wherein the account ledger is configured as a privacy shield for financial data associated with the final ledger account;
identify, from a privacy table stored in a privacy data storage separate from the account ledger data storage, a VBAN record for a first VBAN associated with the final ledger account;
retrieve, from a virtual account database, a transaction resource configuration for transactions associated with the first VBAN;
authorize the transfer of resources based at least in part on stored balance values of the VBAN container ledger account and the final ledger account and the retrieved transaction resource configuration;
record a first update in the account ledger, wherein recording the first update comprises recording the unique transaction group identifier in association with the first update and the VBAN container ledger account and final ledger account, and modifying the stored balance values of the VBAN container ledger account and final ledger account in the account ledger based on a transfer value associated with the transfer of resources;
receive a second network event corresponding to a second transaction associated with the transfer of resources between the resource account and the third party;

determine that a unique transaction group identifier assigned to the second network event matches the unique transaction group identifier associated with the first update and the VBAN container ledger account and final ledger account, wherein the determination of a match indicates that the stored balance values of the VBAN container ledger account and final ledger account have already been modified based on the transfer of resources; and record a second update in the account ledger, wherein recording the second update comprises recording the unique transaction group identifier in association with the second update without modifying the stored balance values of the VBAN container ledger account and final ledger account in the account ledger.

20. A receiver processor comprising: one or more processors; and a non-transitory memory coupled to the processors comprising instructions executable by the processors, the processors operable when executing the instructions to:

receive a first network event corresponding to a first transaction associated with a transfer of resources between a resource account and a third party, wherein the first network event is assigned a unique transaction group identifier associated with the first transaction by a receiver processor, wherein the resource account is associated with a client entity and issued by a receiver institution, wherein the first transaction is associated with publicly routable account credentials of the resource account, and wherein the unique transaction group identifier assigned by the receiver processor is associated with a plurality of network events;

identify, from an account ledger stored in an account ledger data storage, a virtual bank account (VBAN) container ledger account and a final ledger account, wherein the VBAN container ledger account represents a parent program container corresponding to the resource account on a hierarchical representation of accounts containing a plurality of final ledger accounts in the account ledger, wherein the final ledger account represents a leaf node on the hierarchical representation of accounts, wherein the final ledger account is issued by the receiver processor, and wherein the account ledger is configured as a privacy shield for financial data associated with the final ledger account;

identify, from a privacy table stored in a privacy data storage separate from the account ledger data storage, a VBAN record for a first VBAN associated with the final ledger account;

retrieve, from a virtual account database, a transaction resource configuration for transactions associated with the first VBAN;

authorize the transfer of resources based at least in part on stored balance values of the VBAN container ledger account and the final ledger account and the retrieved transaction resource configuration;

record a first update in the account ledger, wherein recording the first update comprises recording the unique transaction group identifier in association with the first update and the VBAN container ledger account and final ledger account, and modifying the stored balance values of the VBAN container ledger account and final ledger account in the account ledger based on a transfer value associated with the transfer of resources;

receive a second network event corresponding to a second transaction associated with the transfer of resources between the resource account and the third party;

determine that a unique transaction group identifier assigned to the second network event matches the unique transaction group identifier associated with the first update and the VBAN container ledger account and final ledger account, wherein the determination of a match indicates that the stored balance values of the VBAN container ledger account and final ledger account have already been modified based on the transfer of resources; and record a second update in the account ledger, wherein recording the second update comprises recording the unique transaction group identifier in association with the second update without modifying the stored balance values of the VBAN container ledger account and final ledger account in the account ledger.

21. A method comprising, by one or more computing systems associated with a receiver processor:

receiving a first network event corresponding to an authorized transaction associated with a transfer of resources between a first resource account and a third party, wherein the first network event is assigned a unique transaction identifier associated with the first transaction by the receiver processor, wherein the first resource account is associated with a client entity and issued by a receiver institution, wherein the authorized transaction is associated with publicly routable account credentials of the first resource account, and wherein the unique transaction group identifier assigned by the receiver processor is associated with a plurality of network events;

identifying, from an account ledger stored in an account ledger data storage, a virtual bank account (VBAN) container ledger account and a final ledger account, wherein the VBAN container ledger account represents a parent program container corresponding to the first resource account on a hierarchical representation of accounts containing a plurality of final ledger accounts in the account ledger, wherein the final ledger account represents a leaf node on the hierarchical representation of accounts, wherein the final ledger account is issued by the receiver processor, and wherein the account ledger is configured as a privacy shield for financial data associated with the final ledger account;

identifying, from a privacy table stored in a privacy data storage separate from the account ledger data storage, a VBAN record for a first VBAN associated with the final ledger account;

authorizing the transfer of resources based at least in part on stored balance values of the VBAN container ledger account and the final ledger account and a transaction resource configuration for transactions associated with the first VBAN;

recording a first update in an account ledger, wherein recording the first update comprises recording the unique transaction identifier in association with the first update and the VBAN container ledger account and the final ledger account in the account ledger;

detecting, via an asynchronous data stream processing module, the modification to the stored balance values of the VBAN container ledger account and final ledger account in the account ledger;

identifying one or more second container ledger accounts associated with the final ledger account; and recording a second update in the account ledger, wherein recording the second update comprises, for each of the one or more second container ledger accounts, recording the unique transaction identifier in association with the second update and the second container ledger account, and modifying a stored balance value of the second container ledger account in the account ledger based on the modification to the stored balance value of the final ledger account.

* * * * *